United States Patent
Hodge et al.

(10) Patent No.: US 9,676,482 B2
(45) Date of Patent: Jun. 13, 2017

(54) RECONFIGURABLE PAYLOAD SYSTEMS (RPS) FOR AIRCRAFT AND METHODS RELATED THERETO

(71) Applicant: L-3 Communications Integrated Systems L.P., Greenville, TX (US)

(72) Inventors: Ben D. Hodge, Leonard, TX (US); Timothy W. Troup, Rockwall, TX (US); Richard D. Cropper, Greenville, TX (US); Brandy D. Stokes, Greenville, TX (US)

(73) Assignee: L-3 Communications Integrated Systems L.P., Greenville, TX (US)

( * ) Notice: Subject to any disclaimer, the term of this patent is extended or adjusted under 35 U.S.C. 154(b) by 111 days.

(21) Appl. No.: 14/604,618

(22) Filed: Jan. 23, 2015

(65) Prior Publication Data
US 2016/0272319 A1 Sep. 22, 2016

Related U.S. Application Data

(60) Provisional application No. 61/931,538, filed on Jan. 24, 2014.

(51) Int. Cl.
*B64C 1/20* (2006.01)
*B64C 1/22* (2006.01)
(Continued)

(52) U.S. Cl.
CPC ............... *B64D 9/00* (2013.01); *B64D 7/00* (2013.01); *B64C 2211/00* (2013.01)

(58) Field of Classification Search
CPC .... B64D 7/00; B64D 9/00; B64D 1/00; B64C 2211/00
See application file for complete search history.

(56) References Cited

U.S. PATENT DOCUMENTS

D149,555 S * 5/1948 Hibbard ................... 244/118.1
2,472,947 A * 6/1949 Hlobil .................... B64C 39/02
244/100 R
(Continued)

FOREIGN PATENT DOCUMENTS

CA 1172479 8/1984

OTHER PUBLICATIONS

Hodge et al., "Reconfigurable Payload Systems (RPS) With Operational Load Envelopes for Aircraft and Methods Related Thereto", U.S. Appl. No. 14/604,318, filed Jan. 23, 2015, Office Action mailed Sep. 8, 2016, 15 pgs.

(Continued)

*Primary Examiner* — Philip J Bonzell
(74) *Attorney, Agent, or Firm* — Egan, Peterman, Enders, Huston

(57) ABSTRACT

Reconfigurable payload systems (RPS) and methods of configuring and using the same are disclosed that may be employed to enable external aircraft payloads to be rapidly interchanged or swapped out together with associated internal equipment within a given aircraft so as to modify or change payload capability of the aircraft, e.g., to meet a particular mission and/or to enable use of future payload types as they are developed. The RPS and associated methods may be implemented to allow multiple different payload systems to be swapped in and out on a given aircraft as required based on needs for a given mission.

29 Claims, 35 Drawing Sheets

(51) Int. Cl.
*B64D 47/00* (2006.01)
*B64D 9/00* (2006.01)
*B64D 7/00* (2006.01)

(56) References Cited

U.S. PATENT DOCUMENTS

| | | | | |
|---|---|---|---|---|
| 4,318,328 | A * | 3/1982 | Rona | F41F 3/06 |
| | | | | 244/130 |
| 5,661,384 | A * | 8/1997 | Glibbery | H02H 7/0852 |
| | | | | 160/309 |
| 5,779,190 | A | 7/1998 | Rambo et al. | |
| 5,820,075 | A * | 10/1998 | Speakes | B64D 9/00 |
| | | | | 224/401 |
| 5,961,071 | A * | 10/1999 | Proctor | B64D 9/00 |
| | | | | 244/118.1 |
| 6,068,215 | A * | 5/2000 | Gruensfelder | B64C 1/1415 |
| | | | | 160/114 |
| 8,128,026 | B2 * | 3/2012 | Shelton | B64C 1/22 |
| | | | | 244/118.2 |
| 9,394,051 | B2 * | 7/2016 | Chun | B64C 7/00 |
| 2005/0204910 | A1 | 9/2005 | Padan | |
| 2007/0205327 | A1 * | 9/2007 | Gioffre | B64D 47/08 |
| | | | | 244/118.1 |
| 2009/0014583 | A1 * | 1/2009 | Shelton | B64C 1/22 |
| | | | | 244/118.2 |
| 2010/0243815 | A1 | 9/2010 | Wong et al. | |
| 2014/0110526 | A1 | 4/2014 | De Azevedo et al. | |
| 2015/0210392 | A1 | 7/2015 | Hodge | |
| 2015/0298807 | A1 * | 10/2015 | Chun | B64C 7/00 |
| | | | | 244/137.4 |

OTHER PUBLICATIONS

Hodge et al., "Reconfigurable Payload Systems (RPS) With Operational Load Envelopes for Aircraft and Methods Related Thereto", U.S. Appl. No. 14/604,318, filed Jan. 23, 2015, Response to Office Action filed mailed Feb. 8, 2017, 31 pgs.

Search Report, PCT/US15/12672, Apr. 15, 2015, 2 pgs.

* cited by examiner

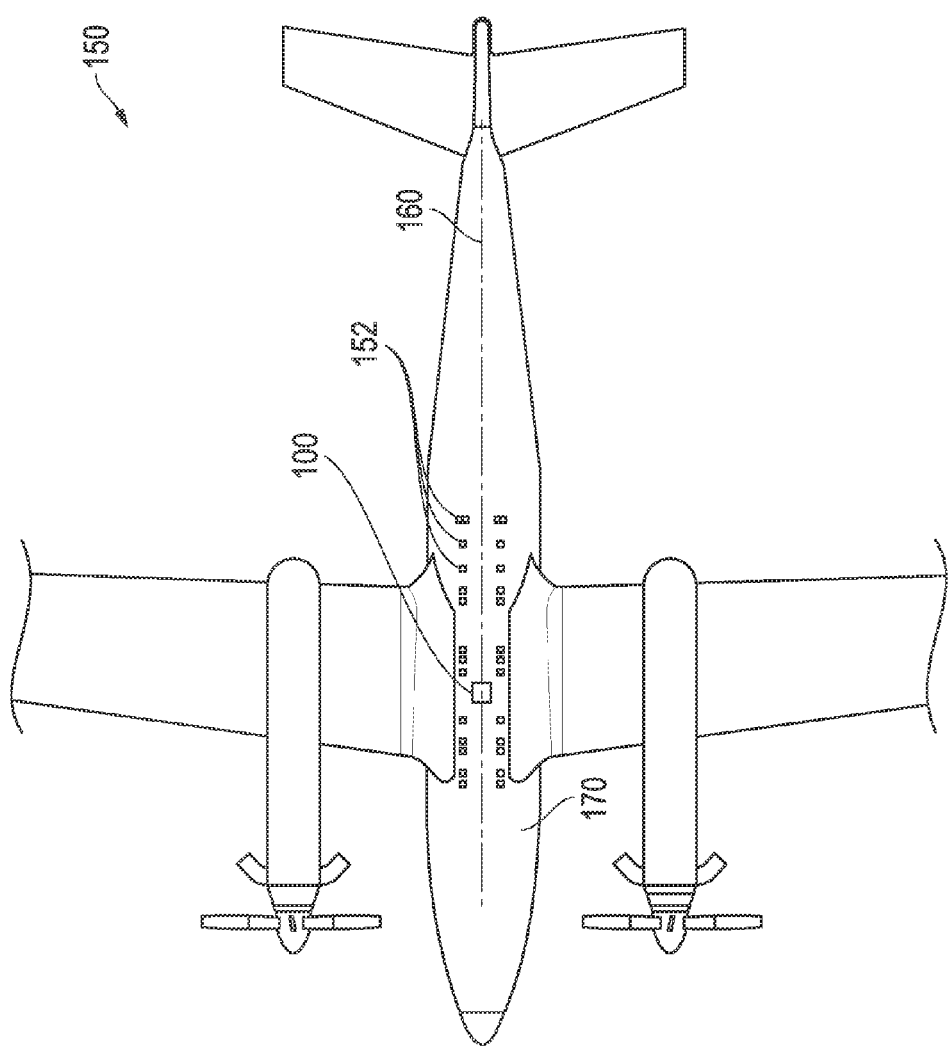

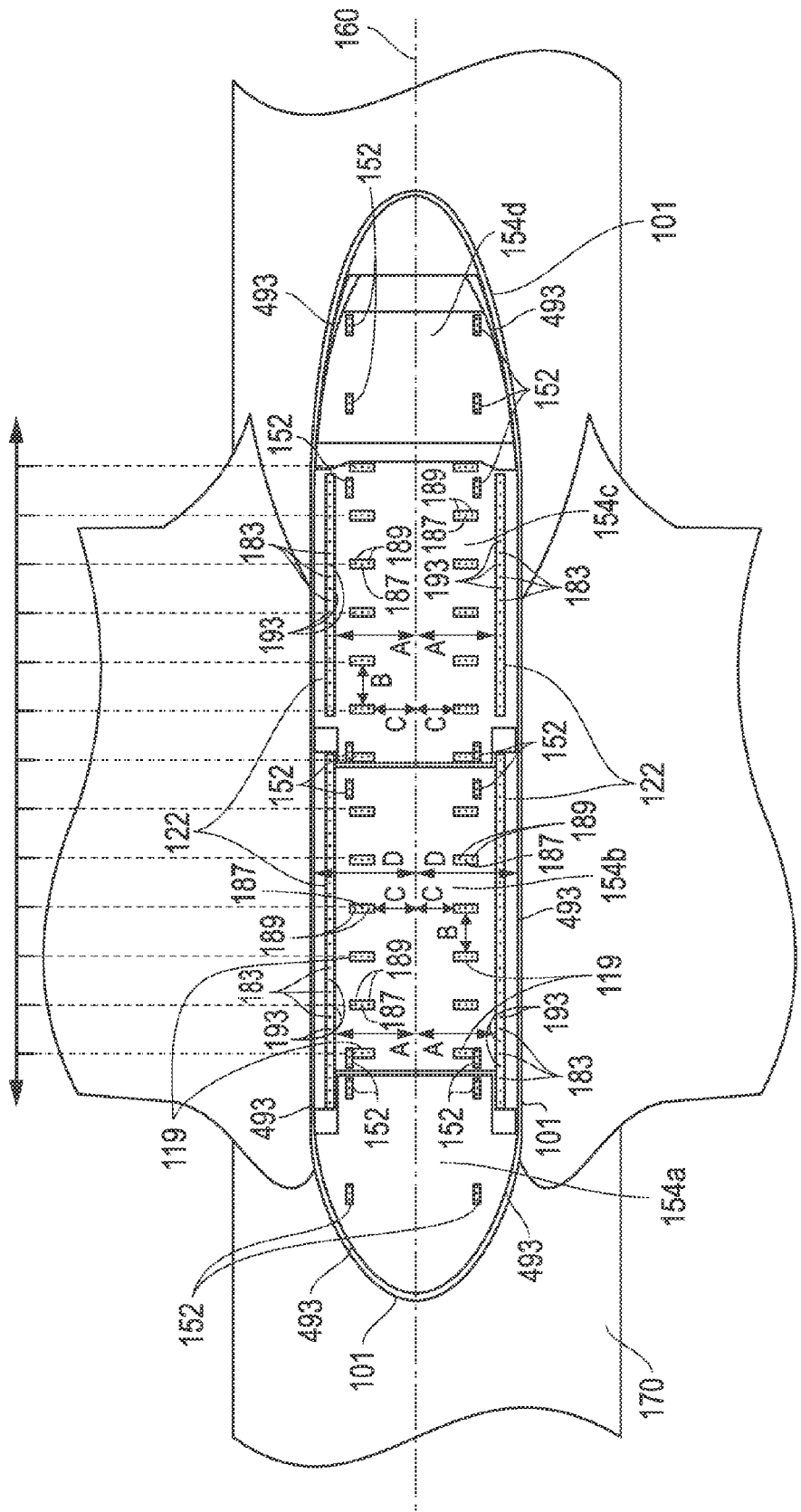
FIG. 1C1

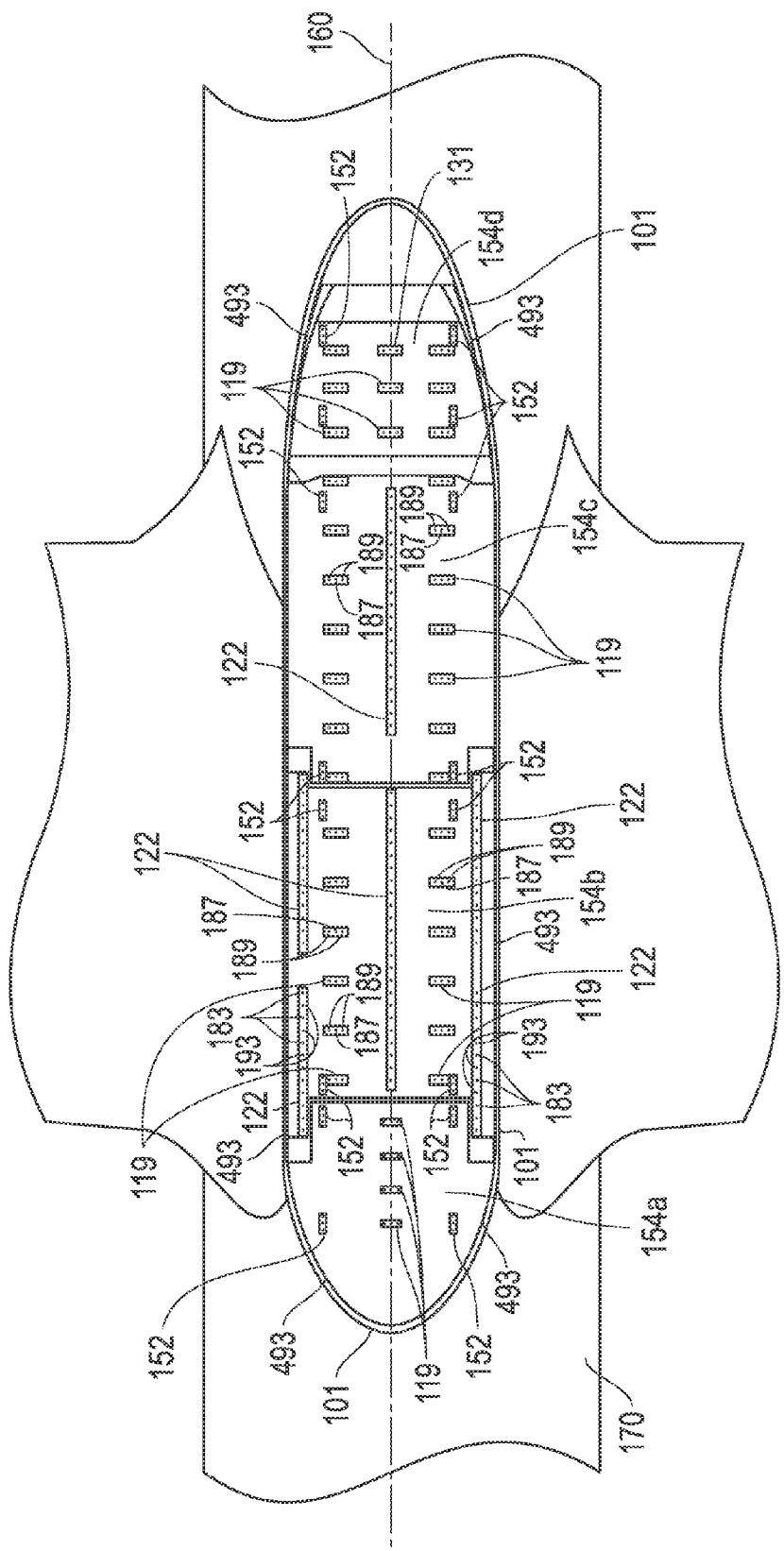
FIG. 1C2

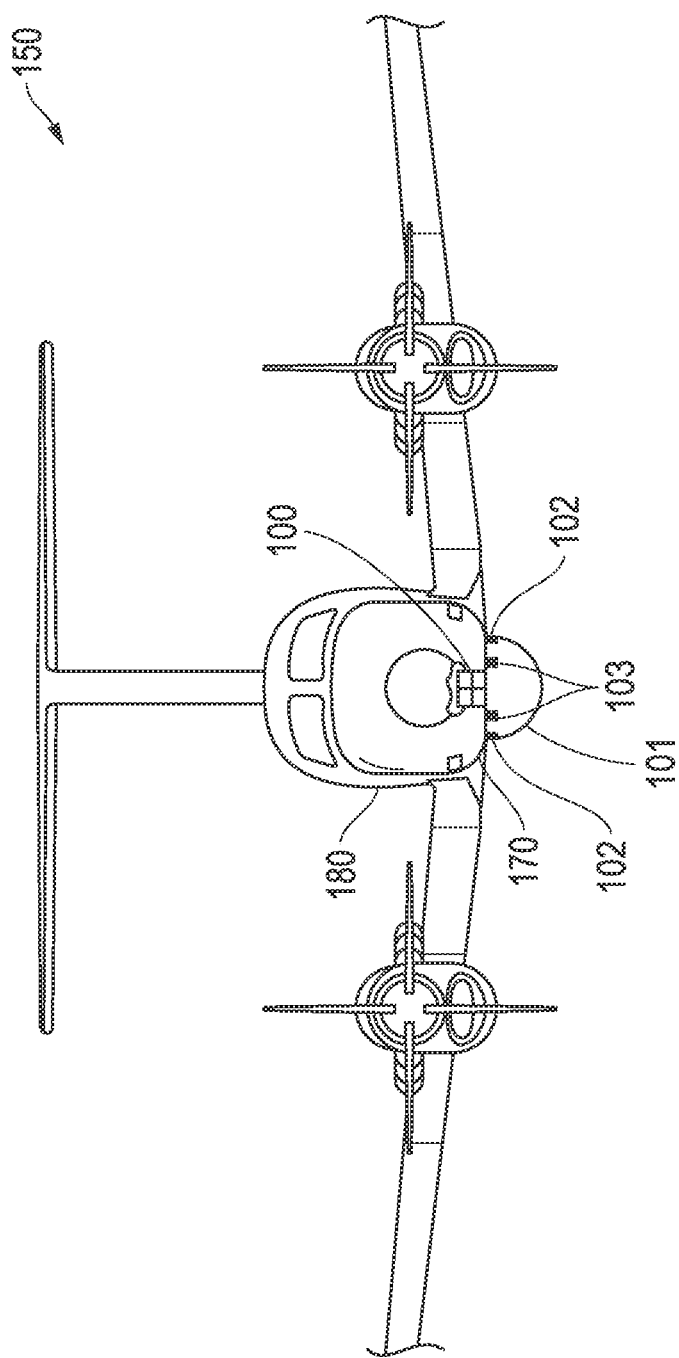

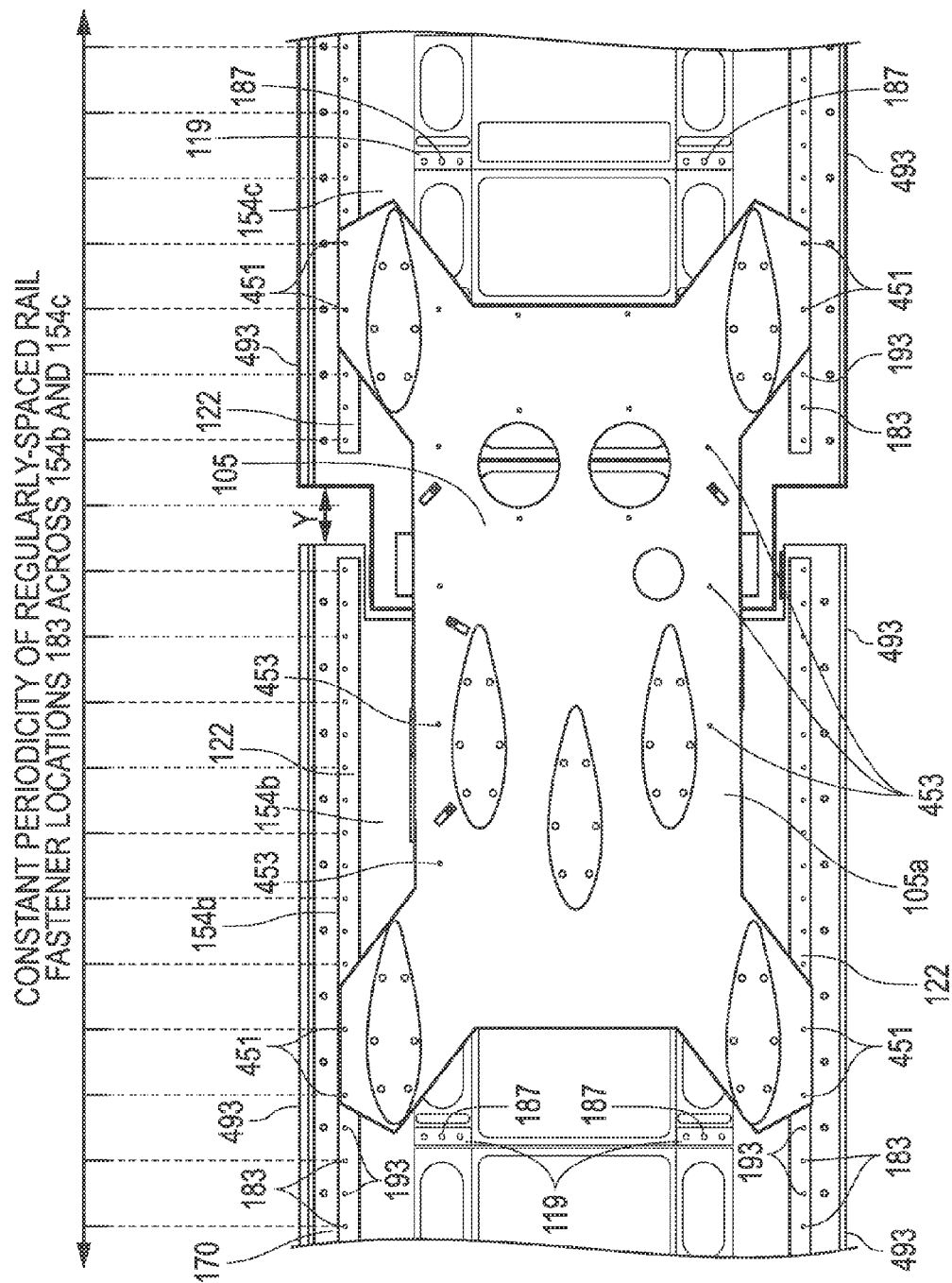

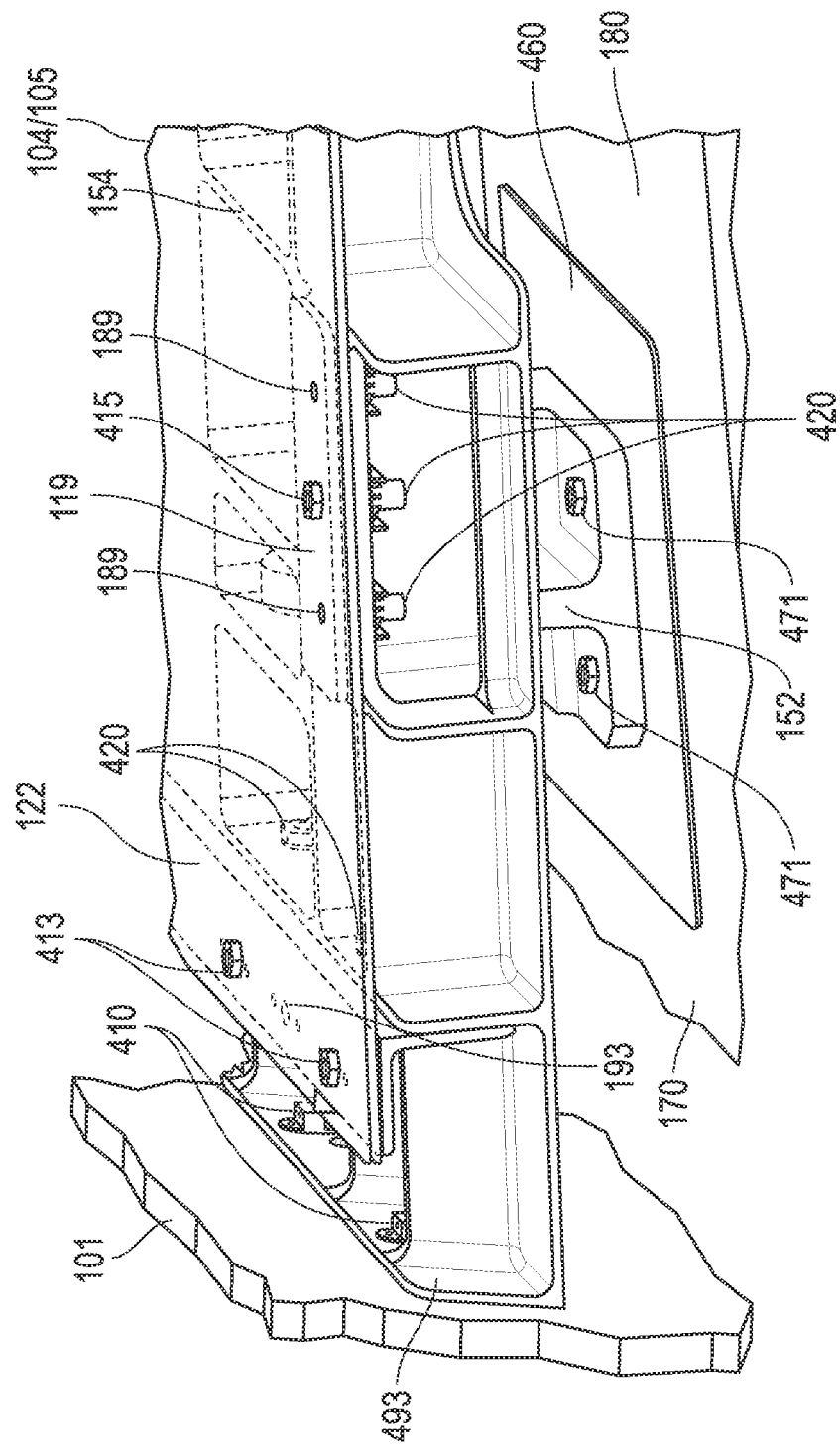

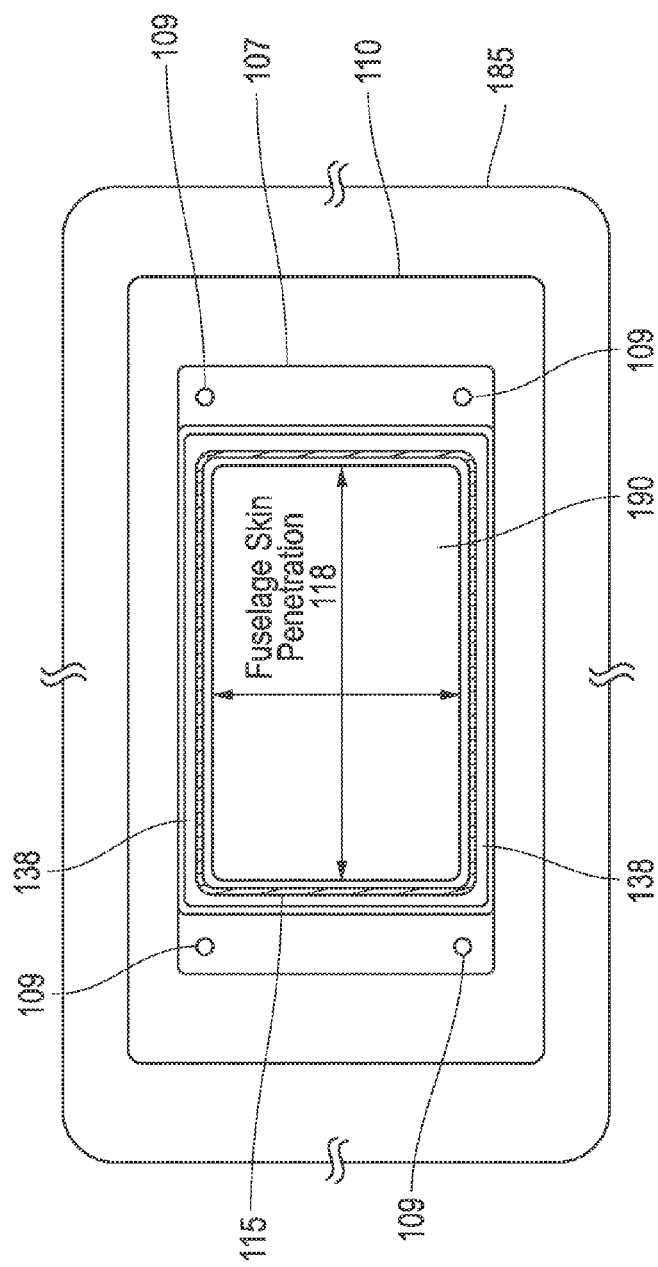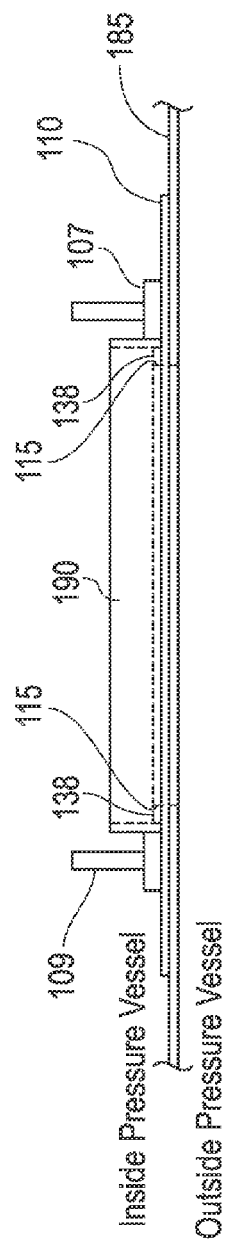

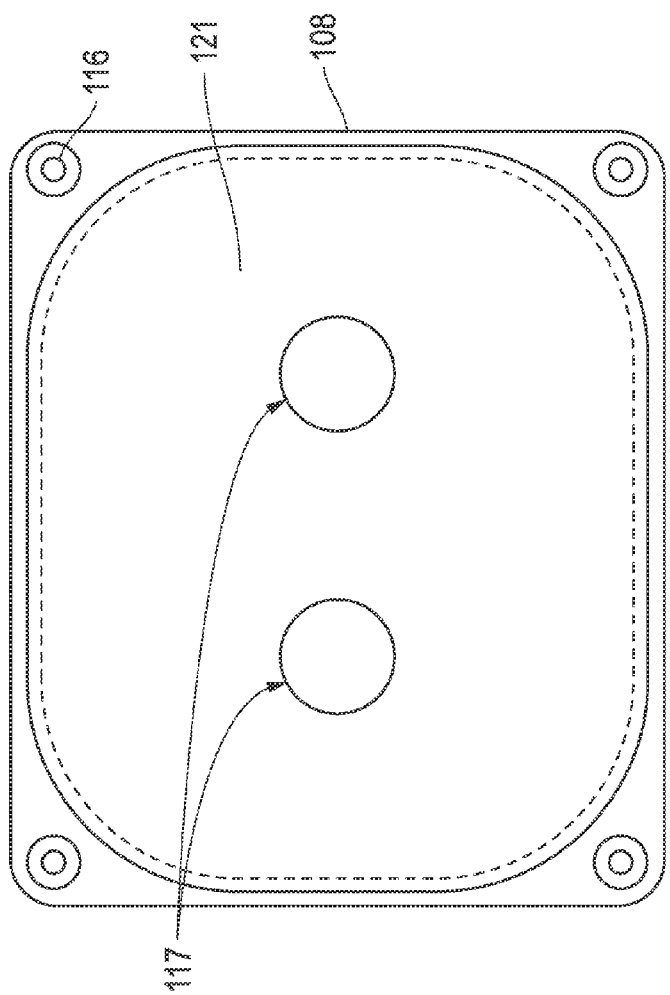
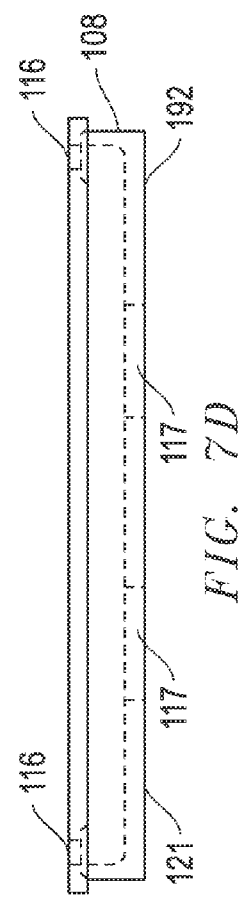

RECONFIGURABLE PAYLOAD SYSTEMS (RPS) FOR AIRCRAFT AND METHODS RELATED THERETO

This application claims the benefit of U.S. Provisional Patent Application Ser. No. 61/931,538, filed on Jan. 24, 2014 and entitled "Reconfigurable Payload Systems (RPS) For Aircraft and Methods Related Thereto", which is incorporated herein by reference in its entirety for all purposes.

The present application is related in subject matter to concurrently-filed PCT International Patent Application number PCT/US2015/012672 entitled "Reconfigurable Payload Systems (RPS) For Aircraft and Methods Related Thereto" by Hodge et al., and to concurrently-filed U.S. patent application Ser. No. 14/604,318 entitled "Reconfigurable Payload Systems (RPS) With Operational Load Envelopes For Aircraft and Methods Related Thereto" by Hodge et al., each of which is filed on the same date as the present application and which is incorporated herein by reference in its entirety for all purposes.

FIELD OF THE INVENTION

This application relates to aircraft and, more particularly, to reconfigurable payload systems (RPS) for aircraft.

BACKGROUND OF THE INVENTION

Electronic payloads are regularly attached to fixed wing and rotary wing aircraft for various civilian and military purposes. Examples of such payloads include visual and infrared sensors for law enforcement and fire fighting purposes, as well as intelligence gathering equipment such as signals intelligence, optical systems and multi-spectral sensors employed for purposes of conducting surveillance of targets, and protection of personnel. Conventional installations of such systems can be characterized as unique single-point design solutions that are single-purposed in that they are each built to satisfy a specific payload solution requirement, and are the current method for implementing aircraft modifications to install payloads. Such conventional solutions employ a point design solution design approach in which payload loads (inertial and aerodynamic) induced upon the aircraft (usually fuselage structure) are specifically defined by the characteristics of the payload and any associated aerodynamic fairing(s) and are specific to the payload(s) being attached to the aircraft. The Beechcraft King Air 350, as well as many other types of fixed wing and rotary wing aircraft types are frequently modified using such single-point solutions that only meet a specific solution intent for a customer, thus driving increased costs and extended time schedules when payload modifications are required, e.g., due to new technology and differing payload capability requirements that are ever evolving.

Payload point design loads are considered by Stress and Mechanical Structures Aerospace Engineers during conventional design methods to develop specific structural components uniquely designed and qualified to safely couple the loads into the aircraft during flight operations. These structural components are then manufactured and the aircraft is modified with these structural components to provide mounting provisions to accept the payload(s). The aircraft can then be safely operated under flight operations while carrying the payload(s). Such aircraft modifications are also often performed as part of an FAA Supplemental Type Certificate (STC) or Field Modification process. The analysis data and design details produced by the Stress and Mechanical Structures Aerospace Engineers is considered by FAA representatives such as a Designated Engineering Representative (DER), Aircraft Certification Office (ACO) or Organization Designation Authority (ODA) Unit Member in order to determine that the design is properly substantiated for airworthiness and determined to meet safety of flight criteria.

In a manner synonymous to the Stress and Mechanical Structure design, Electrical Aerospace Engineers typically consider the electrical interface requirements of the payload, and design a specific electrical interface design. The Aerospace Engineers apply common practice design methods to create a point design solution for fuselage penetrations for the required electrical interface connectors.

These structural and electrical interface designs are sufficient to meet the specific requirements of a specific payload installation. If there is a subsequent requirement to significantly alter the payload such that the current point design solution design no longer accommodates the mass, size, shape, or other characteristics of the altered payload; the method process previously described is repeated. Since the aircraft has already been modified with certain payload provisions, often is the case that the previously described design methodology will be complicated because of the impact of the currently installed aircraft modifications. In this regard, previously installed aircraft modifications may require removal and replacement with new structures in order to meet the altered payload requirements. Some previously installed aircraft modifications may be difficult to remove or remove, modify, and reinstall without placing the aircraft structure at additional risk for damage during hands-on work. In occurrence of such cases, the process can become unusually costly in expense and schedule.

A unique support structure has been attached using fittings to an aircraft fuselage to provide a "single point" solution for mounting a corresponding unique given payload to the aircraft. A differently configured custom support structure having custom mounting holes for a given sensor is required for each different type of sensor(s) or payload(s). A new stress analysis and engineering design of the support structure, payload mounting provisions, fuselage fittings, and fuselage structural reinforcement is required to obtain a new or amended STC from the FAA prior to allowed use of each different sensor and its corresponding aircraft support structure.

SUMMARY OF THE INVENTION

Disclosed herein are reconfigurable payload systems (RPS) and methods of configuring and using the same that may be employed in one embodiment to enable external aircraft payloads (e.g., such as environmental monitoring and intelligence gathering equipment, etc.) to be rapidly interchanged or swapped out together with associated internal equipment within a given aircraft so as to modify or change payload capability of the aircraft, e.g., to meet a particular mission and/or to enable use of future payload types for a fixed wing or rotary aircraft as they are developed. In such an embodiment, the disclosed systems and methods may be advantageously implemented on virtually any type of aircraft for a wide variety of applications external to the aircraft, allowing multiple different payload systems to be swapped in and out on a given aircraft as required based on needs for a given mission, saving time and expense over conventional single point design solutions. The disclosed reconfigurable payload systems and methods may be advantageously employed in one embodiment to rapidly configure and reconfigure aircraft mission technology based on changing per-mission requirements, allowing aircraft operators to share smaller quantities of sensor technology (i.e., sensors) and/or other types of payload devices since the payload devices may be distributed and changed (swapped) between RPS-equipped aircraft.

As described further herein, a Reconfigurable Payload System (RPS) may be provided in various embodiments that may include one or more of the following features (alone or in any combination): 1) a RPS may be manifested on the aircraft as an enveloped loads design solution method rather than as a single-purpose, point design loads design solution; 2) payload attachment features including a single-rail or parallel multi-rail mounting structure may be employed (e.g., with optional payload-to-rail mounting RPS payload adapters) to install various and interchangeable working payloads on a first set of rails (e.g., an inner set of rails) and to install interchangeable aerodynamic fairings on a second set of rails (e.g., an outer set of rails); 3) payload attachment features including a single or multi-section mounting adapter which has a payload rail, parallel rails and/or payload hardpoints may be employed (e.g., with optional payload-to-rail mounting RPS payload adapters) to install various and interchangeable working payloads on a rail or a set of rails (and/or a hardpoint or a set of hardpoints) and to install interchangeable aerodynamic fairings; and/or 4) a quick-disconnect electrical interface device that may be employed to interface external aircraft payloads to internal aircraft equipment.

In one exemplary embodiment, an RPS mounting adapter may have payload rails and hardpoints provided as a common feature. In such an embodiment, the rails and hardpoints may be further optionally configured with regularly-spaced fastener locations for attaching payloads to the RPS mounting adapter mounting structure. In one embodiment, a RPS mounting adapter (e.g., configured as a baseplate) may be configured with regularly-spaced rails and regularly-spaced rail fastener locations, as well as regularly-spaced hardpoints and hardpoint fastener locations, such that both rail and hardpoint spacing and rail and hardpoint fastener location spacing remains regular across a given baseplate section, as well as across multi-section baseplate components. Such a configuration allows a standardized rail and hardpoint fastener location spacing and a standardized rail and hardpoint spacing to be implemented in one exemplary embodiment, e.g., as an Interface Control Document (ICD) that defines and standardizes configuration (e.g., spacing and/or size of rail and hardpoint fasteners) of these rail and hardpoint mounting provisions. Such an ICD or other type of standardized spacing specification advantageously may be implemented to allow payload manufacturers and vendors to design and manufacture payload packages which comply with the standardized rail and hardpoint spacing specification, and therefore that will fit any aircraft provided with RPS mounting adapter component/s that are configured with mounting rail and hardpoint fastener location spacing as well as rail and hardpoint spacing according to the standardized specification defined in the ICD, e.g., to allow a payload package design effort that is deterministic and common for designing a payload package.

In one embodiment, a RPS may be uniquely configured using an enveloped loads design methodology which is largely agnostic to the specifics of the particular payload(s). In this embodiment, enveloped loads may be established that accommodate a breadth of payloads to include inertial and aerodynamic loads. Application of such an enveloped loads design methodology together with implementation of other mechanical and/or electrical aspects of a RPS may be employed to achieve significant advantages over conventional single point design solutions where point design loads for a specific payload alone are established. For example, RPS enveloped loads (e.g., inertial or aerodynamic) may in one exemplary embodiment be distributed on a single or multi-rail RPS structure (or single or multi-section RPS structure) in terms of loads per unit length to provide the Aerospace Engineer an additional advantage and means of distributing large loads (e.g., usually inertial loads from high density payloads) along a RPS rail or hardpoint structure thereby remaining within the established RPS envelope loads design. In one embodiment, RPS rail and hardpoint structures located on the mounting adapter may be configured to provide regularly spaced fastener provisions for mounting of payloads, e.g., with such spacing being specified by an ICD.

Advantageously, such an enveloped loads design method may be employed in conjunction with unique structural and/or electrical interface features of an RPS for a given aircraft or aircraft type to allow a multitude of payloads to be installed and/or interchanged on a given RPS-equipped aircraft with a substantial reduction in effort in analysis and design burden upon Stress, Mechanical Structures, and Electrical Aerospace Engineers. In this regard, a simplified verification of compliance with an established RPS loads envelope may be used to substantially reduce the effort required by Stress Aerospace Engineering to enable installation of new and/or different payloads. A relatively simple payload-to-rail or payload-to-hardpoint mounting RPS payload adapter design may also be provided to substantially reduce the design effort required by Mechanical Aerospace Engineering. A RPS quick-disconnect electrical interface device may be further provided to simplify design of specific payload electrical or other types of payload interface lines (e.g., hydraulic lines, liquid coolant lines for heat exchange cooling, etc.) associated with various payload/s, further reducing the required design effort by Mechanical and Electrical Aerospace Engineering. Moreover, in one exemplary embodiment, an RPS configured according to the enveloped design methodology and approved under an STC may be advantageously employed to allow multiple different payloads to be installed and/or interchanged on a given RPS-equipped aircraft without requiring a new or amended STC.

In one embodiment, a quick disconnect payload interface device (e.g., panel) may be employed to more easily modify the mechanical aspects of electrical interfaces when changing payloads, especially compared to the single-point solution method. In this regard, a RPS quick-disconnect payload interface device installed on an aircraft may be used to enable electrical and other types of payload interfaces associated with payloads to be relatively quickly and easily redefined for differing payloads. In one exemplary embodiment, a quick disconnect payload interface device may include a disconnect plug block that may be redefined to accommodate different harnesses without necessarily disturbing the aircraft structure and the body structure of the RPS quick-disconnect electrical interface device.

In one embodiment, a RPS may incorporate a parallel multi-rail (e.g., dual-rail pair) structural configuration which transfers the load of the payload and associated aerodynamic fairings to the aircraft structure. In another exemplary embodiment, a RPS may incorporate a single or multi-section mounting adapter which has a structural configuration of payload rail, parallel payload rails and/or payload hardpoints that transfers the load of the payload and associated aerodynamic fairings to the aircraft structure through fuselage fittings. In such an embodiment, the fuselage fittings may be designed and configured for load capability as part of the envelope load method. Fuselage fittings may be distributed on the belly of the aircraft fuselage individually and may be installed and removed individually. In one embodiment, the fuselage fittings may be grouped together in a modular manner for the purpose of supporting the single or multi-section mounting adapter. For example, four (4) fuselage fittings may be installed with a mounting adapter to complete a module.

In the practice of the disclosed systems and methods, an individual RPS payload rail, sets of parallel rails and/or payload hardpoints and sets of payload hardpoints may be employed and/or dedicated for different purposes (e.g., mounting payloads versus mounting fairings to the aircraft). In one embodiment, hardpoints, rails and parallel multi-rail structures (e.g., such as RPS single or multi-section mounting adapter with a payload rail, parallel payload rails and/or payload hardpoints) may be installed on an aircraft and used as a common structure for mechanically coupling various different payload/s and various fairings of different configuration to the aircraft. Advantageously, a variety of different payloads may be coupled to the aircraft via the same RPS hardpoint, rail or multi-rail structure (e.g., such as single or multi-section mounting adapter with a payload rail, parallel payload rails and/or payload hardpoints) despite having different payload weights, different payload dimensions, and/or having different payload purposes or functions. Moreover, individual payloads and fairings may be interchanged and/or different combinations of multiple payloads and fairings may be installed to the aircraft via the same RPS hardpoint, rail or multi-rail structure (e.g., such as single or multi-section mounting adapter with a payload rail, parallel payload rails and/or payload hardpoints), in one exemplary embodiment with substantially no further structure modification to the aircraft and/or without need for obtaining additional certification such as STC.

In one exemplary configuration, a RPS multi-rail structure may include a first set (e.g., pair) of parallel outer rails that surround a second set (e.g., pair) of parallel inner rails. The first set of inner parallel rails may be employed for attaching or otherwise mounting payloads to the aircraft, while the second and different set of outer parallel rails may be employed for mounting aerodynamic fairing/s of selected configuration to at least partially cover or enclose the payload/s mounted to the first set of inner rails. However, it will be understood that payloads are not limited to installation only on the first set of inner rails and that aerodynamic fairings are not limited to installation on the second set of outer rails. Additionally, certain payloads may not require an associated aerodynamic fairing for aircraft flight. In such cases, payloads may be mounted to the first set of inner rails and/or second set of outer rails, without installation of an aerodynamic fairing.

In another exemplary configuration, a RPS single or multi-section mounting adapter may include a payload rail, parallel payload rails and/or payload hardpoints. The payload rail, parallel payload rails and/or payload hardpoints may be employed for attaching or otherwise mounting payloads to the aircraft. The single or multi-section mounting adapter may be employed for mounting aerodynamic fairing/s of selected configuration to at least partially cover or enclose the payload/s. However, it will be understood that payloads are not limited to installation only on the single or multi-section mounting adapter. Payloads and/or aerodynamic fairings may also be installed, for example, directly to fuselage fittings. As described above, certain payloads may not require an associated aerodynamic fairing for aircraft flight. In such cases, payloads may be mounted to the single or multi-section mounting adapter of fuselage fittings, without installation of an aerodynamic fairing.

In addition to multi-rail RPS structural configurations (e.g., including multiple matching sets or pairs of rails), it will be understood that a RPS may be implemented in one embodiment using a single rail or with a single pair of rails. In the latter case, a first rail may employed for mounting payloads to an aircraft, while the second rail may be employed for mounting an aerodynamic fairing to the aircraft. Moreover, odd numbers of rails may also be employed (e.g., for a total of three rails, a total of five rails, etc.). Moreover, in addition to a single mounting adapter, it will be understood that a RPS may be implemented in one embodiment using a single mounting adapter or a multi-section mounting adapter. It will also be understood that a payload may be mounted to a single payload rail or to a pair of payload rails, or to a payload hardpoint or to multiple payload hardpoints, or to a combination of payload rails or payload hardpoints or to any combination of payload rails and/or hardpoints.

Thus, it will be understood that an RPS may be implemented using any number of rails and/or hardpoints that are suitable for allowing aircraft payloads to be installed and interchanged in the manner described herein. Moreover, it will also be understood that all rails and/or mounting adapters of a given RPS solution do not need to have the same configuration, but may have different lengths, different mounting profiles, different forward and aft mounting positions, etc. differing mechanical mounting configurations/requirements. Additionally, individual RPS rails and rails of a RPS mounting adapter are not required to be monolithic at aircraft installation, e.g., certain payload requirements may only require a sub-section length of one or more RPS rails, and shorter sub-sections may be employed as long as the payload induced loads during flight operations fall within the established design loads envelope.

In a further embodiment, one or more payload adapter apparatus may be provided to mechanically interface between a common RPS rail (e.g., multi-rails), mounting adapter (e.g., including a payload rail, parallel payload rails and/or payload hardpoints) structure and specific payloads (or particular specific types or classes of payloads) that have different mechanical mounting configurations/requirements. Such payload adapters may in one embodiment be design-specific to a given payload having particular (unique) mounting configuration/requirements, and combinations of such payload adapters may be employed during a given aircraft configuration (e.g., to meet specifics of a mission flight) to allow mounting of various different types of payloads simultaneously on a common RPS mounting adapter component and to allow replacement or interchange with a second different payload having differing mechanical mounting configurations/requirements, e.g., between back-to-back missions. Alternatively such payload adapters may be configured in another embodiment to allow mounting of various different types of payloads simultaneously on a common RPS rail structure for the given mission even though the different payloads have differing mechanical mounting configurations/requirements. Further, such payload adapters may be employed to allow a first given installed payload to be removed from a RPS rail structure and replaced or interchanged with a second different payload having differing mechanical mounting configurations/requirements, e.g., between back-to-back missions.

Thus, installation of a RPS may be common to a given aircraft or aircraft type such that the structure of a particular aircraft no longer requires a uniquely-designed aircraft structure modification's for compatibility with differing payload/s. For example, a given RPS may be designed in consideration of a desirable loads envelope resulting in a rail structure or fittings and mounting adapter that are configured to be installed on a given aircraft fuselage type such as a Beechcraft King Air 350. In similar manner, a RPS may be designed with a different loads envelope that is developed to address other aircraft types resulting in a different rail structure, or fittings and mounting adapter. In this regard, differing loads envelopes for other aircraft may be established and one or more components of an RPS subsequently designed, installed, and employed. Moreover, in one embodiment, once a given RPS design is created for installation on a given aircraft or aircraft type, corresponding installation tooling for RPS components may also be designed and manufactured to reduce cost and enhance ease of installation. This is possible since the given RPS design is common from aircraft-to-aircraft of the same type even though the working payloads may vary greatly. This in turn allows modification of the aircraft structure to become well known when implementing installation tooling which reduces touch labor and risk of damage during aircraft modification.

In one respect, disclosed herein is a reconfigurable payload system (RPS), including one or more external payload attachment features mechanically coupled to extend across a given section of a fuselage of an aircraft, the one or more external payload attachment features being configured to be attached to external payload components, external fairings, or a combination thereof. The one or more external payload attachment features may be configured with an available operational envelope of total permissible aircraft load at given locations within the section. The external payload attachment features may include one or more payload rails, one or more fairing rails, one or more hard points, or a combination thereof.

In another respect, disclosed herein is a RPS disconnect panel assembly, including: a disconnect receptacle block configured for attachment to the interior of an aircraft fuselage, the disconnect receptacle block including a receptacle body having a receptacle opening defined to extend through the block and to be at least partially aligned with an aperture defined in an outer skin of the aircraft fuselage when attached to the interior of the aircraft fuselage; and a disconnect plug block having a plug body, the plug body having outer dimensions that are complementary in shape to inner dimensions of the receptacle opening defined through the receptacle body of the disconnect receptacle block such that the plug body is configured to be received in the receptacle opening in mated relationship inside the aircraft fuselage opposite the aperture defined in the outer skin of the aircraft fuselage. The plug body of the disconnection plug block may include a bottom plate configured to extend across and adjacent to the receptacle opening when the disconnection plug block is matingly received in the receptacle opening of the disconnect receptacle block; and where one or more through-holes are defined to extend through the bottom plate of the plug body to allow respective payload interfaces line to extend via coupled connectors through the though-holes from an interior of the fuselage to an exterior of the fuselage. The one or more through-holes may be defined to extend through the bottom plate of the plug body to allow different types of payload interfaces lines to be interchangeably connected through the though-hole from an interior of the fuselage to an exterior of the fuselage. The payload interface lines may in one embodiment include different types of interchangeable electrical harnesses, although other types are possible.

In another respect, disclosed herein is a method of modifying an aircraft fuselage, including: defining a baseline reconfigurable payload system (RPS) configuration configured to support a given survey of selected interchangeable external payload components, interchangeable internal payload components, and/or interchangeable external aerodynamic fairings; determining an operational envelope of total permissible aircraft loads by fuselage locations for the baseline reconfigurable payload system (RPS) configuration, the total permissible aircraft loads including the sum of unmodified aircraft loads for the aircraft with RPS aerodynamic loads, RPS internal payload loads, and RPS external payload component loads by fuselage location; and modifying the aircraft fuselage with the baseline RPS configuration. The method may further include coupling a RPS disconnect panel assembly to the interior of the aircraft fuselage adjacent a location of the external payload attachment features.

In another respect, disclosed herein is a reconfigurable payload system (RPS), including one or more external payload attachment features mechanically coupled to extend across a given section of a fuselage of an aircraft, the one or more external payload attachment features being configured to be attached to external payload components, external fairings, or a combination thereof, where the external payload attachment features include at least one mounting adapter section mechanically coupled to the aircraft fuselage across the given section of the aircraft fuselage; where the mounting adapter section includes at least one of: one or more payload rails having multiple regularly-spaced rail fastener locations provided on each rail that are configured to align with and be selectably attached to mating payload fastener locations of an interchangeable external payload component that has a payload fastener location spacing that is complementary to the regular spacing of the rail fastener locations; and/or multiple payload hardpoints having regularly-spaced hardpoint fastener locations provided on each payload hardpoint that are configured to align with and be selectably attached to mating payload fastener locations of an interchangeable external payload component that has a payload fastener location spacing that is complementary to the regular spacing of the hardpoint fastener locations. The mounting adapter section may be mechanically coupled to extend across the given section of the aircraft fuselage such that such that: the rail fastener location spacing remains regular across the payload rail of the mounting adapter section so as to allow the mating payload fastener locations of the interchangeable external payload component to align with and simultaneously attach to mating regularly-spaced rail fastener locations on the mounting adapter section to mechanically couple the interchangeable external payload component to the aircraft fuselage, and/or such that the hardpoint fastener location spacing remains regular across the payload hardpoints of the mounting adapter section so as to allow the mating payload fastener locations of the interchangeable external payload component to align with and simultaneously attach to mating regularly-spaced hardpoint fastener locations on the mounting adapter section to mechanically couple the interchangeable external payload component to the aircraft fuselage.

In another respect, disclosed herein is a method of operating an aircraft, including: providing one or more external payload attachment features mechanically coupled to extend across a given section of a fuselage of the aircraft; and attaching external payload components, external fairings, or a combination thereof to the one or more external payload attachment features. The external payload attachment features may include at least one mounting adapter section mechanically coupled to the aircraft fuselage across the given section of the aircraft fuselage, the mounting adapter section including at least one of: one or more payload rails having multiple regularly-spaced rail fastener locations provided on each rail that are configured to align with and be selectably attached to mating payload fastener locations of an interchangeable external payload component that has a payload fastener location spacing that is complementary to the regular spacing of the rail fastener locations, and/or multiple payload hardpoints having regularly-spaced hardpoint fastener locations provided on each payload hardpoint that are configured to align with and be selectably attached to mating payload fastener locations of an interchangeable external payload component that has a payload fastener location spacing that is complementary to the regular spacing of the hardpoint fastener locations. The mounting adapter section may be mechanically coupled to extend across the given section of the aircraft fuselage such that such that: the rail fastener location spacing remains regular across the payload rail of the mounting adapter section so as to allow the mating payload fastener locations of the interchangeable external payload component to align with and simultaneously attach to mating regularly-spaced rail fastener locations on the mounting adapter section to mechanically couple the interchangeable external payload component to the aircraft fuselage, and/or such that the hardpoint fastener location spacing remains regular across the payload hardpoints of the mounting adapter section so as to allow the mating payload fastener locations of the interchangeable external payload component to align with and simultaneously attach to mating regularly-spaced hardpoint fastener locations on the mounting adapter section to mechanically couple the interchangeable external payload component to the aircraft fuselage. In one embodiment, the method may further include: selecting a first set of one or more interchangeable external payload components; aligning and attaching payload fastener locations of the first set of interchangeable external payload components simultaneously to mating regularly-spaced rail fastener locations on two or more of the multiple separate mounting adapter sections to mechanically couple the first set of interchangeable external payload components to the aircraft fuselage, or aligning and attaching payload fastener locations of the first set of interchangeable external payload components simultaneously to mating regularly-spaced hardpoint fastener locations on two or more of the multiple separate mounting adapter sections to mechanically couple the first set of interchangeable external payload component to the aircraft fuselage; and then using the aircraft to fly a first mission with the mechanically coupled first set of one or more external payload components. The method may further include: then selecting a second and different set of one or more external payload components; aligning and attaching payload fastener locations of the second set of interchangeable external payload components simultaneously to mating regularly-spaced rail fastener locations on two or more of the multiple separate mounting adapter sections to mechanically couple the second set of interchangeable external payload components to the aircraft fuselage, or aligning and attaching payload fastener locations of the second set of interchangeable external payload components simultaneously to mating regularly-spaced hardpoint fastener locations on two or more of the multiple separate mounting adapter sections to mechanically couple the second set of interchangeable external payload component to the aircraft fuselage; and then using the aircraft to fly a second mission with the mechanically coupled second set of one or more external payload components after flying the first mission. Additionally or alternatively, the method may further include: then removing the first set of one or more external payload components from aircraft after flying the first mission; aligning and attaching payload fastener locations of the first set of interchangeable external payload components simultaneously to mating regularly-spaced rail fastener locations on two or more multiple separate mounting adapter sections mounted on a second and different aircraft to mechanically couple the first set of interchangeable external payload components to a fuselage of the second aircraft, or aligning and attaching payload fastener locations of the first set of interchangeable external payload components simultaneously to mating regularly-spaced hardpoint fastener locations on two or more multiple separate mounting adapter sections mounted on the second and different aircraft to mechanically couple the second set of interchangeable external payload components to the fuselage of the second aircraft; and then using the second and different aircraft to fly a second mission with the mechanically coupled first set of one or more external payload components after flying the first mission.

BRIEF DESCRIPTION OF THE DRAWINGS

FIG. 1B illustrates a simplified bottom sectional view of an aircraft and RPS according to one exemplary embodiment of the disclosed systems and methods.

FIG. 1C1 illustrates a simplified partial bottom view of an aircraft and RPS according to one exemplary embodiment of the disclosed systems and methods.

FIG. 1C2 illustrates a simplified partial bottom view of an aircraft and RPS according to one exemplary embodiment of the disclosed systems and methods.

FIG. 1I illustrates example modularity of fittings according to one exemplary embodiment of the disclosed systems and methods.

FIG. 2A illustrates a simplified front sectional view of an aircraft and RPS according to one exemplary embodiment of the disclosed systems and methods.

FIG. 6A illustrates a simplified overhead view of a receptacle block portion of a RPS quick disconnect panel according to one exemplary embodiment of the disclosed systems and methods.

FIG. 6B illustrates a simplified side view of the receptacle block portion of FIG. 6A according to one exemplary embodiment of the disclosed systems and methods.

FIG. 7C illustrates a simplified underside view of a plug block portion of a RPS quick disconnect panel according to one exemplary embodiment of the disclosed systems and methods.

FIG. 7D illustrates a simplified side view of the plug block portion of FIG. 7A according to one exemplary embodiment of the disclosed systems and methods.

DESCRIPTION OF ILLUSTRATIVE EMBODIMENTS

Figure 1A:
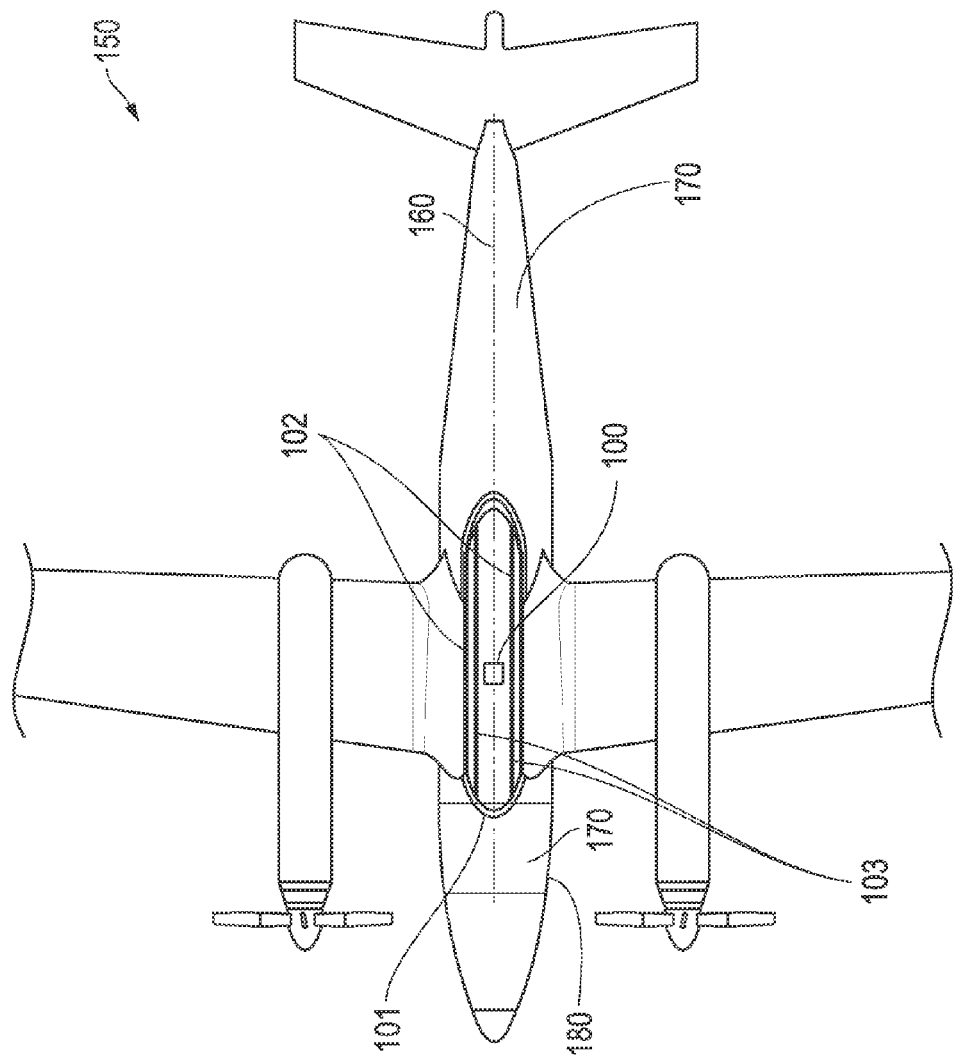
FIG. 1A illustrates a simplified bottom sectional view of an aircraft and RPS according to one exemplary embodiment of the disclosed systems and methods.

FIG. 1A illustrates a simplified bottom sectional view of a fixed winged aircraft 150 and installed components of a RPS according to one exemplary embodiment of the disclosed systems and methods. Although a fixed wing aircraft is illustrated, it will be understood that the disclosed systems and methods are equally applicable to rotary aircraft installations and configurations. In this particular embodiment, the installed components include a pair of substantially parallel inner payload rails 103 coupled to the structure of the aircraft 150, a pair of substantially parallel outer fairing rails 102 coupled to the structure of the aircraft 150, a quick disconnect panel 100, and an exemplary aerodynamic modular fairing 101 coupled to the outer fairing rails 102. In the illustrated embodiment, RPS is shown installed and oriented along and substantially parallel to the longitudinal axis 160 of aircraft 150 on the bottom side 170 of the aircraft fuselage 180. In one exemplary embodiment, location and lateral spacing between adjacent inner payload rails 103 and/or between adjacent outer fairing rails 102 (as well as size and rail attachment configuration or profile) may be standardized and set (e.g., with location, size/configuration and spacing specified by ICD).

In the embodiment of FIG. 1A, dual RPS outer fairing rails 102 are provided as payload attachment features and installed to mechanically couple an aerodynamic and/or protective fairing 101 to the aircraft exterior, and may be sectioned or monolithic, e.g., based on user defined payload desires or requirements. Additional payload attachment features in the embodiment of FIG. 1A include dual RPS inner payload rails 103 that are provided and installed to mechanically couple the payloads to the aircraft 150 through a payload adapter 104 that is described further herein. The loads-supporting purpose of the parallel rails 102 and 103 may be varied as dictated by the specifics of the payload components or combination of payload components. Moreover, rails 102 and 103 may be constructed of any materials (e.g., aluminum, steel, composite such as carbon fiber, etc.) suitable for providing adequate strength for supporting desired payload components and payload component combinations. In this regard, the type of payload components and/or combination of payload components may be varied for a given aircraft 150 by the aircraft operator, while the design and installation of rails 102 and 103 do not vary for the given aircraft 150 and associated design envelope, except in the case that a full length rail installation (i.e., meaning all rail sections of a multi-rail section design) are not required to meet the payload requirements for a given mission. However, even when installing less than the full length of aggregate rail sections 102 and/or 103, the design of the rails and the associated loads envelope need not change.

RPS inner payload rails 103 and/or outer rails 102 may also be coupled to the fuselage structure in one embodiment using fuselage hardpoints in order to accommodate certain payloads, although it is possible that any other suitable ways of coupling rails 102 and 103 to the fuselage 180 may be employed in other embodiments. Where hardpoints are employed for coupling rails 102 and 103 to fuselage 180, they may be distributed in a manner (e.g., usually a uniform manner with some regularity in placement) along the bottom 170 of fuselage 180. In this regard, hardpoint locations may be dictated by existing aircraft structure and access to fuselage skin (e.g., for hardpoint penetration and/or fastener penetration) as well as practicalities of designing and installing structure modifications used to couple a hardpoint to the existing fuselage structure. Each hardpoint may be tied into more substantial fuselage structure such as frames, longerons, stringers, and skin reinforcement (e.g., doublers, triplers, etc.) may be employed where necessary or desired to recover strength due to skin penetrations.

It will be understood that the particular configuration and number of rails 103 and 102 is exemplary, and that the number of payload rails may vary from as few as one payload rail to more than two payload rails. Moreover, provision of one or more fairing rails is optional, and in some embodiments no fairing rails may be provided. Additionally, the illustrated configuration and relative length of payload rails 103 and fairing rails 102 is exemplary only, with shorter or longer rails being possible. Thus, the length and number of payload and fairing rails may vary according to the characteristics and/or needs of a particular application/aircraft structure, and/or according to a particular payload envelope configured for the same. In the illustrated embodiment, rails 102 and 103 are oriented parallel to the aircraft fuselage longitudinal axis 160 in order to provide for more payload foot print while minimizing aerodynamic loads, although other rail orientations are possible where desired or needed to fit the characteristics of a given RPS application. In one exemplary embodiment, one or more spaced-apart cross beams or cross pieces may be mechanically coupled to extend in perpendicular relationship between the individual payload rails 103 of a given payload rail pair (e.g., in a ladder rung-like configuration) to allow payload components to be mechanically coupled to the rails 103 via the cross-beams rather than directly to the rails 103 themselves.

Still referring to the embodiment of FIG. 1A, a quick disconnect panel 100 may be provided in one embodiment as shown to allow exterior and interior electrical harnesses (or other types of payload interface lines including fluid conduits such as hydraulic lines, liquid coolant lines for heat exchange cooling, etc.) associated with various payload/s that may be mounted to inner payload rails 103 and later removed from inner payload rails 103 to be quickly connected and disconnected using the quick disconnect panel 100. In such an embodiment, quick disconnect panel 100 enables the aircraft operator to rapidly swap or interchange different payload/s and their associated electrical interface harnesses without having to modify the aircraft fuselage 180 at each payload change. The particular illustrated location and configuration of quick disconnect panel 100 is exemplary only, it being understood that more than one disconnect panel 100 may be provided in a variety of suitable locations on an aircraft, depending on size and complexity of the aircraft and/or payloads. In one exemplary embodiment, disconnect panels 100 may distributed at various locations on fuselage 180 (e.g., in locations adjacent to different sections of payload rails 103), and then optionally employed in various combinations to fit the requirements of given missions and payload combinations or when an adjacent rail section is used for a given mission. In one example, one or more of multiple installed disconnect panels 100 may be blanked off (with no openings or interface lines extending there through) for future use when needed. Further information regarding an exemplary quick disconnect panel 100 is provide in relation to FIGS. 5-7 herein.

Still referring to FIG. 1A, one or more monolithic or modular fairings 101 may be optionally mechanically coupled to outer fairing rails 102 as required to at least partially surround all or part of payload components that may be mechanically coupled to inner payload rails 103. In this regard, some types of payload components are designed for direct airstream exposure while other types of payload components require enclosure within an aerodynamic fairing 101 to at least partially shield the payload components from airstream exposure. In this regard, the illustrated RPS parallel dual rail design is capable of supporting a monolithic or modular aerodynamic fairing as needed for a given payload configuration, it being understood that an aircraft operator may require differing aircraft mission capabilities under normal concepts of operation and that differing payloads may require differing types and configurations of aerodynamic fairings 101. In the illustrated embodiment, all (monolithic) or a portion (modular) of an aerodynamic fairing 101 may be installed using the unique configuration of the RPS parallel dual rail design.

FIGS. 1B and 1C1 illustrate simplified bottom sectional views of a fixed winged aircraft 150 and installed components of a RPS according to one exemplary embodiment of the disclosed systems and methods. In this exemplary embodiment, the installed payload attachment features are components that include multiple fuselage fittings 152 coupled to the aircraft 150, multi-section mounting adapter 154 coupled to the fuselage fittings 152, a pair of payload rails 122 provided as integral parts of a mounting adapter 154, multiple payload hardpoints 119 provided as integral parts of the mounting adapter 154, a quick disconnect panel 100, and an exemplary aerodynamic modular fairing 101 that may be coupled to the mounting adapter 154 via fairing interface/s 493. In the illustrated embodiment, RPS is shown installed and oriented along and substantially parallel to the longitudinal axis 160 of aircraft 150 on the bottom side 170 of the aircraft fuselage 180.

In the exemplary embodiment of FIGS. 1B and 1C1, a RPS mounting adapter 154 is provided and installed to mechanically couple an aerodynamic and/or protective fairing 101 to the aircraft exterior. Such a RPS mounting adapter 154 may be multi-sectioned as shown (e.g., sections 154a, 154b, 154c and 154d) or may be monolithic in other embodiments, e.g., based on user defined payload desires or requirements. In one embodiment, a RPS mounting adapter 154 may be a baseplate, e.g., such as a detailed structure (e.g. 1 to 5 inches thick or any greater or lesser thickness needed or desired to suitably support the external loads of a given application) that is machined from metal plate, molded from resin-impregnated composite materials such as fiberglass, carbon fiber, etc.

In the illustrated embodiment, dual parallel longitudinal RPS payload rails 122 and multiple payload hardpoints 119 are provided as structural components or features to mechanically couple payloads to the mounting adapter 154 as described further herein. Hardpoints 119 may be present as short structural pads or attachment areas in one embodiment as shown herein where needed to provide greater load-carrying capacity than is provided by the elongated (e.g., longitudinal-running) rails 122. Although RPS mounting adapter 154 of FIGS. 1B and 1C1 is provided with both payload rails 122 and payload hardpoints 119, it will be understood that a mounting adapter 154 may be provided in one alternative embodiment with payload rails 122 only (and provided with no payload hardpoints 119), and may be provided in another embodiment with payload hardpoints 119 only (and provided with no payload rails 122).

As shown in FIG. 1C1, location and lateral spacing distance "A" between parallel longitudinal payload rails 122 may be standardized and set (e.g., with location, size and spacing specified by ICD) to be the same for each of RPS mounting adapter sections 154a, 154b, 154c and 154d, i.e., such that individual rails 122 are longitudinally aligned across different installed sections 154 as shown. Similarly, lateral spacing "C" between payload hardpoints 119 may be standardized (e.g., with location, size and spacing specified by ICD) as the same for each of RPS mounting adapter sections 154a, 154b, 154c and 154d, i.e., such that hardpoints 119 are longitudinally aligned across different installed sections 154 as shown. As further shown a standardized spacing "D" (e.g., specified by ICD) may be provided between opposing outside surfaces of fairing interfaces 493, as well as specified standardized variance in this spacing (e.g., narrowing spacing between fairing interfaces 493 as shown for nose mounting adapter section 154a and tail mounting adapter section 154d).

Still referring to FIGS. 1B and 1C1, hardpoints 119 may also be longitudinally spaced apart from each other by a standardized spacing distance "B" (e.g., with location, size and spacing specified by ICD) that is the same for each section 154, and with individual hardpoints 119 being laterally aligned with each other (e.g., in two parallel longitudinal-running rows) as shown. In one embodiment hardpoints 119 may be longitudinally spaced apart from each other on 8 inch centers, although values of distance "B" may be greater or lesser in other embodiments as may be suitable for fitting load requirements of different given applications. It will be understood that the particular number of parallel payload rails 122 may be greater or less than two, and/or that the number of longitudinal rows of hardpoints 119 may be more or less than two. Additionally, in other embodiments one or more individual sections of payload rails 122 and/or individual hardpoints 119 may be located in a standardized location (e.g., with location, size and spacing specified by ICD) that is non-parallel in nature. Moreover a given mounting adapter 154 may be configured with payload rails 122 and/or rows of hardpoints 119 that have a length substantially equal to, or alternatively less than, the longitudinal length of the given mounting adapter 154, e.g., less than half the length of the given mounting adapter 154. Nor does a payload rail 122 of a given mounting adapter 154 need to be continuous, but rather may be made up of two or more individual sections of payload rails 122 that are longitudinally aligned in end-to-end relation with an optional space or gap in-between the sections as illustrated on mounting adapter 154b of FIG. 1C2, it being understood that the constant periodicity of the rail fastener location spacing may continue and be maintained across the separate rail sections. Similarly, a payload rail 122 may include blank section/s (i.e., where rail fastener locations 183 are absent) as illustrated on mounting adapter 154b of FIG. 1C2, it being understood that the constant periodicity of the rail fastener location spacing may continue and be maintained across the blank section of the rail section.

For example, FIG. 1C2 illustrates an alternative embodiment in which a mounting adapter section 154a is configured with a single center row of hardpoints 119, a mounting adapter 154b is configured with three parallel payload rails 122 and two rows of hardpoints 119, a mounting adapter 154c is configured with one payload rail 122 and two rows of hardpoints 119, and a mounting adapter 154d is configured with three rows of hardpoints 119.

Any combination of standardized spacing values may be selected for each of distances "A", "B", "C" and "D" that is suitable for implementing a given RPS installation on a given aircraft, e.g., to fit the needs of anticipated missions including support of anticipated external payload loads and/or dimensions, etc. Moreover, such distances may be further selected to be compatible with RPS installations on different types of aircraft, e.g., such that RPS components having the same spacings "A", "B", "C" and "D" may be implemented on different types of aircraft, allowing interchangeability of mounting adapters 154 and payloads 105 between different aircraft. In one exemplary embodiment, the following combination of standardized RPS spacing distances may be implemented for a RPS installed on the underside of a Beechcraft King Air 350 (it being understood that these values are provided for purposes of illustration and are exemplary only, and that individual spacing values may be greater or lesser in other embodiments as desired or needed): Spacing "A" may be about 28 inches, or about 14 inches displaced each side from the longitudinal axis 160 which is also known as butt line 0 (zero or BL0). Spacing "B" may be about 8 inches as measured between the centers of the mounting fastener provisions and, in one embodiment, this spacing may be constant across adjacent sections of 154(a-d). Spacing "C" measured from the lateral center of each hardpoint 119 may be about 17 inches, or about 8.5 inches displaced each side from the BL0 or longitudinal axis 160. Spacing D may be about 16.25 inches from BL0 or axis 160 on each side.

It will be understood that fairing interface/s 493 of a given mounting adapter section's 154 may be tailored in configuration and shape to mate with and support the shape of the given fairing/s 101 that are selected or required to contain payload(s) 105 for given mission/s. In one embodiment fairing interface/s 493 may be a machined surface (e.g., recess) in at least a portion of the peripheral surface/s of mounting adapter 154. In this regard, configuration and shape of fairings 101 may be selected and/or varied as needed to enable swap capability between different payload/s 105 located under the fairing section/s 101. In one embodiment, even if width of fairing/s 101 needs to grow in lateral dimensions (meaning width of the needed mounting adapter 154 and spacing "E" are increased), the interior spacing of the below-described provisional rail fastener locations 183 and hardpoint fastener location 187 may remain constant (e.g., as defined in an ICD) for a given design. In this regard, an ICD may specify multiple different mounting adapter 154 configurations and/or dimensions (e.g., that are accumulated over time), while spacing of provisional rail fastener locations 183 and hardpoint fastener location 187 remains the same.

As shown, each of payload rails 122 of any given section 154 may further include multiple regularly-spaced rail fastener locations 183 (e.g., with location, size and spacing specified by ICD) for attaching payloads to a RPS mounting adapter 154. By "regularly-spaced" it is meant that the spacing distance between a first pair of different (e.g., adjacent) rail fastener locations 183 or hardpoint fastener locations 187 is the same distance as the spacing distance between a second pair of different (e.g., adjacent) rail fastener locations 183. Although described herein with regard to regularly-spaced rail and hardpoint fastener locations, it will be understood that non-regularly-spaced rail and/or hardpoint fastener locations may be employed in another embodiment, e.g., such as non-regularly-spaced rail and/or hardpoint fastener locations having pre-defined spacing and locations that are configured for alignment with and attachment to matching pre-defined non-regularly-spaced payload fastener locations of a payload 105.

Each of rail fastener locations 183 may be, for example, machine-threaded openings defined in a given rail 122 that is configured to accept a threaded fastener such as a bolt, screw, etc. As shown optional alternating wiring mounting fastener locations 193 may be provided in the rail 122 between the rail fastener locations 183. In one embodiment, a standardized regular rail fastener spacing distance pattern (e.g., 4 inch spacing or any other suitable greater or lesser distance) between adjacent rail fastener locations 183 of a given section 154 may repeat or carry over across multiple (e.g., from two to all) installed sections 154 on a common aircraft 180 such that each mounting adapter section 154 has rails 122 with the same standardized regular rail fastener spacing distance pattern, e.g., such that mating payload fastener locations 451 provided on a payload component 105 (FIG. 4A-4F) will align with rail fastener location 183 for mounting whether the payload component 105 is mounted only to payload rails 122 of a single section 154 or is mounted to payload rails 122 of more than one section 154 (e.g., in the case of a payload section 105 that is mounted across multiple sections 154b and 154c of FIG. 1C1). A similar standardized regular spacing distance pattern (e.g., 4 inch spacing or any other suitable greater or lesser distance) may also be provided between adjacent wiring mounting fastener locations 193 of a given section 154 (e.g., such that spacing between adjacent fastener locations 183 and 193 may be 2 inches in the above-described example). In this regard, mating payload fastener locations may be provided on a given payload 105 with standardized spacing and location to match spacing and location of rail fastener locations 183 so as to align with fastener locations 183 when the payload 105 is mated with the RPS mounting adapter section's 154.

When payload fastener locations 451 and 453 are aligned with corresponding rail fastener locations 183 and hardpoint fastener locations 187, respectively, payload 105 may be mechanically coupled to mounting adapter section/s 154, e.g., with a suitable fastener at each aligned fastener location in a manner as described further herein. In this regard, each of locations 183, 187, 451 and 453 may be threaded or non-threaded openings for receiving a fastener (bolt, screw, etc.) to mechanically couple a payload 105 to the mounting adapter 154. In another embodiment, a given fastener location 183, 187, 451 and 453 may be a threaded stud that is configured to be received and fastened (e.g., by a nut) to a corresponding mating fastener location to mechanically couple a payload 105 to the mounting adapter 154. Thus, any combination of fastener location and fastener type may be employed that is suitable for to mechanically coupling a payload 105 to the mounting adapter 154.

Similarly, each of hardpoints 119 of any given section 154 may further include multiple regularly-spaced hardpoint fastener locations 187 (e.g., with location, size and spacing specified by ICD) for attaching payloads to the RPS mounting adapter mounting structure. Other optional fastener locations 189 may be provided as illustrated in configuration and/or number for a given purpose, e.g., such as to attach an optional payload spacer that may be used as part of a mounting adapter 154, and which may be removed to provide clearance to a payload 105 at an attachment location that is not used or replaced with a taller structure to offset the payload 105 from the mounting adapter 154 if required or desired. Therefore each hardpoint fastener location 187 is just one hole in this particular design and has the lateral dimension of C noted below of 8.5" from BL0. Each of hardpoint fastener locations 187 may be, for example, machine-threaded openings defined in a given hardpoint 119 that is configured to accept a threaded fastener such as a bolt, screw, etc. In one embodiment, the standardized spacing between adjacent hardpoint fastener locations 187 of a given section 154 may carry over to an adjacent installed section 154, e.g., such that mating payload fastener locations provided on a payload component 105 will align with hardpoint fastener locations 187 for mounting whether the payload component is mounted only to payload hardpoints of a single section 154 or is mounted to payload hardpoints 119 of more than one section 154 (e.g., in the case of a payload section 105 that is mounted across multiple sections 154b and 154c of FIG. 1C1). Once again, mating payload fastener locations may be provided on a given payload 105 with standardized spacing and location to match spacing and location of hardpoint fastener locations 187 so as to align with fastener locations 187 when the payload 105 is mated with the RPS mounting adapter section/s 154.

In the exemplary embodiment of FIG. 1C1, RPS mounting adapter section 154a is optionally configured as a "nose" or forward end section having no payload rails 122 or hardpoints 119, and RPS mounting adapter 154d is optionally configured as a "tail" or aft end section having no payload rails 122 or hardpoints 119. Such a configuration may be optionally implemented in one embodiment due to the narrowed aerodynamic shape requirements of the corresponding nose and tail sections of a fairing 101 that does not allow for the standard spacing and location of rails 122 and/or hardpoints 119 at each end of the RPS installation, whereas the inner mounting adapter sections 154b and 154c are provided with such standardized payload rails 122 and hardpoints 119 as shown in FIG. 1C1. It will be understood, however, that additional payload mounting provisions such as rails and/or hardpoints may be defined and provided in one exemplary embodiment for such narrowed mounting adapter nose and tail sections (e.g., 154a and 154d) as shown in FIG. 1C2, in a manner that provides commonality across aircraft RPS installations if desired. In such an embodiment, the spacing of the additional nose and tail mounting adapter rails and/or hardpoints may not in one embodiment be provided with the same standardized spacing as rails 122 of mounting adapter sections 154*b-c*. Rather an alternate standardized configuration of rails and/or hardpoints configured for narrowed mounting adapter sections may be provided and documented (e.g., with a suitably narrowed spacing to fit the narrowed mounting adapter section) in an ICD. Additionally, payload mounting provisions of any other type as required or desired may be provided for a nose mounting adapter section 154*a* and/or tail mounting adapter section 154*d* to enable payloads 105 to be mounted in these narrowed mounting adapter sections. In another exemplary embodiment, RPS mounting adapter section 154*a* and 154*d* may optionally include location of rails 122 and/or hardpoints 119 (e.g., located concentric with aircraft fuselage centerline 160) with standard spacing and location of rails 122 and/or hardpoints 119 but of different dimensions than those rails 122 and/or hardpoints 119 shown in inner mounting adapter sections 154*b* and 154*c* (e.g., narrow spacing with fewer fastener holes for mounting payloads). It will be understood that payload installation to mounting adapter 154*a* and mounting adapter 154*d* is also possible.

The loads-supporting purpose of the parallel rails 122 and payload hardpoints 119 may be varied as dictated by the specifics of the payload components or combination of payload components. Moreover, fuselage fittings 152, mounting adapter section/s 154, and integral or attached rails 122 and/or hardpoints 119 may each be constructed of any material/s (e.g., aluminum, steel, composite such as carbon fiber, etc.) suitable for providing adequate strength for supporting desired payload components and payload component combinations. In this regard, the type of payload components and/or combination of payload components may be varied for a given aircraft 150 by the aircraft operator, while the design and installation are not required to vary for the given aircraft 150 and associated design envelope to meet the payload requirements for a given mission. Moreover, in one exemplary embodiment, all or a portion of fuselage fittings 152 may be configured to be temporarily removable (e.g., with removable connectors such as bolts or screws) from aircraft 150, for example, in the event that it is desired to fly the aircraft 150 to a location with a "slick" belly having no fittings 152 or any other RPS components protruding outward beyond the aircraft skin. The removed fittings 152 may then be reinstalled at the destination so as to allow attachment of mounting adapter section's 154 and payloads 105. In another example, only a portion of the total number of fittings 152 may be installed (e.g., either originally or for a given mission) as is shown by the fitting modularity examples of FIG. 1I.

With regard to embodiment of FIGS. 1B and 1C1, it will be understood that number and locations of a full complement of individual fuselage fittings 152 may be designed or otherwise selected and identified to meet a desired loads envelope capability for a given type of aircraft 150, e.g., such as a Beechcraft King Air 350. It will be understood that the entire RPS design instantiation may be installed in whole, or in part, depending on the needs of a given aircraft instantiation or aircraft operator. Thus, where full payload capability (e.g., payload weight and/or payload location options) is desired or needed, the full complement of designed fuselage fittings 152 may be installed on a given aircraft 150 together with all required internal aircraft structure frame modifications needed to reinforce the fuselage for accommodation of the desired loads envelope. However, where less than the full payload capability is needed or desired, it is alternatively possible that only a portion of the full complement of designed fuselage fittings 152 may be selected for installation on a given aircraft 150. In the latter case, only a portion of the number of internal aircraft structure frame modifications associated with the full complement of fuselage fittings 152 may be advantageously required. In one example, this fuselage fitting installation flexibility provides well for point solutions where an aircraft operator requires only a very specific payload capability which only requires a partial installation of the full complement of RPS structural modifications, while at the same time those aircraft modifications that are required may be expedited because much of the non-recurring engineering (NRE) is already in hand. In this regard, when installing less than the full complement of fuselage fittings 152, the design of a mounting adapter 154 (e.g., with its rails 122 and/or hardpoints 119) and the associated loads envelope need not change.

Although RPS mounting adapter section/s 154 (e.g., with rails 122 and/or hardpoints 119) may in one embodiment be coupled to the aircraft fuselage structure 180 using fuselage fittings 152 as shown, it is also possible to employ any other suitable technique for coupling mounting adapter 154 to the fuselage 180, e.g., such as rails, fuselage hardpoints, skate angles, or any combination of these items. Where fuselage fittings 152 are employed for coupling mounting adapter section/s 154 to fuselage 180, the fittings 152 may be distributed in any suitable manner (e.g., usually a uniform manner with some regularity in placement) along the bottom 170 of fuselage 180. In this regard, locations for fuselage fittings 152 may be dictated by existing aircraft structure and access to fuselage skin (e.g., for hardpoint penetration and/or fastener penetration) as well as practicalities of designing and installing structure modifications used to couple a fuselage fitting 152 to the existing fuselage structure. Each fuselage fitting 152 may be tied into more substantial fuselage structure such as frames, intercostals, longerons, stringers, and skin doublers may be employed where necessary or desired to enhance strength or recover strength due to skin penetrations.

It will be understood that the particular configuration (e.g., size and footprint) and number of mounting adapter section's 154 (e.g., with rails 122 and hardpoints 119) of the RPS design illustrated and described herein is exemplary only, and that the number of mounting adapter section/s 154 included in a RPS design for a given aircraft 150 may vary from as few as one mounting adapter section 154 to more than two mounting adapter sections 154, e.g., that are cooperatively employed to mount payload and/or fairing components as illustrated in FIG. 1C 1. Moreover, provision of one or more mounting adapter sections 154 is optional, and in some embodiments no mounting adapter section 154 may be provided. Additionally, the illustrated configuration, relative length and relative width of a mounting adapter section/s 154 (e.g., with rails 122 and hardpoints 119) is exemplary only, with shorter or longer mounting adapter sections 154 and mounting adapter sections 154 having different footprint shape and/or size being possible. Thus, the length, footprint and/or number of mounting adapter sections 154 included in a RPS design for given aircraft 150 may vary (e.g., together with configuration of associated rails 122 and/or hardpoints 119) according to the characteristics and/or needs of a particular application/aircraft structure, and/or according to a particular payload envelope configured for the same. Further, the number and locations of fuselage fittings 152 illustrated herein is exemplary only, with more or less fuselage fittings 152 being possible as needed or desired.

FIGS. 1D-1I illustrate how different numbers and configurations of different modular mounting adapter sections 154 (e.g., baseplates) may be interchangeably mounted to a standardized pattern and number of removable fuselage fittings 152 (e.g., with location, size and spacing specified by ICD) that are installed on the bottom side 170 of an aircraft fuselage 180. For simplicity of illustration, no mounting rails 122 or hardpoints 119 are shown in FIGS. 1D-H, it being understood that each of modular mounting adapters 154 illustrated in these Figures may be configured in one embodiment as a module having mounting rails 122 and/or hardpoints 119 in a manner as described elsewhere herein.

In the illustrated embodiment of FIGS. 1D-1I, a total of 26 fittings 152 are provided with location of each of the 26 fittings selected to fit the characteristics of the given aircraft structure (e.g., Beechcraft King Air 350) together with particular payload envelope established for the given aircraft using methodology described elsewhere herein. For example, an FAA STC may be established that provides required fuselage reinforcements to support the external fittings 152, to support the internal fuselage static and inertial loads, and external aerodynamic and inertial loads of the design loads envelope described elsewhere herein. In such a case, not all fuselage reinforcements of the STC must be present on an aircraft for a given RPS installation, only the number and location of reinforcements and fittings 152 that are needed to meet the given application are required. In each case, before installation the loads of the given application are first considered and verified to be compliant to the designed loads envelope for a given embodiment of an RPS, and thus also compliant with the STC for the RPS for the given aircraft as a full or partial instantiation of an RPS as described elsewhere herein. As such RPS fittings 152 and mounting adapter/s 154 may also be employed for point-solution designs since much of the non-reoccurring engineering (NRE) has already been created.

Figure 1D:
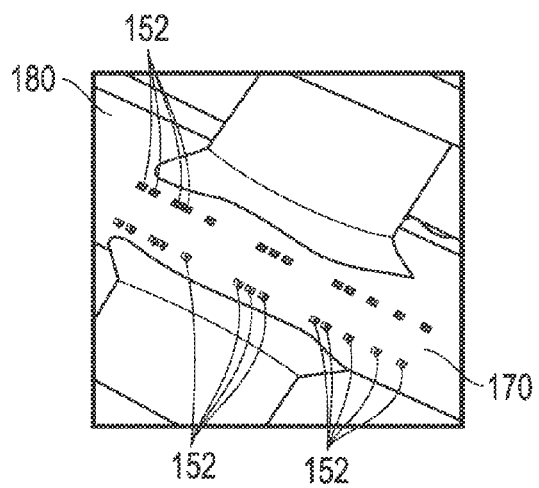
FIG. 1D illustrates a simplified bottom sectional view of an aircraft and RPS according to one exemplary embodiment of the disclosed systems and methods.
Figure 1E:
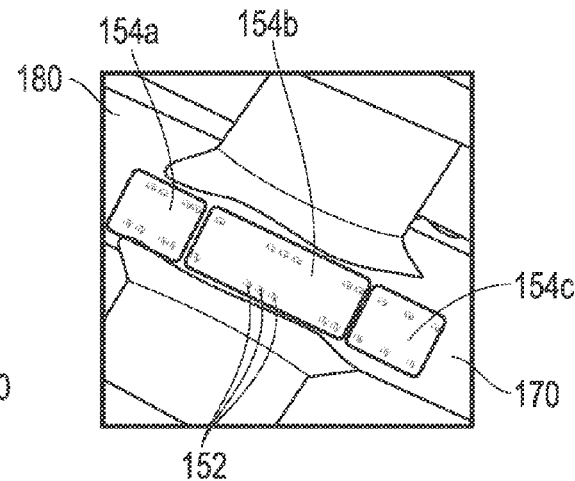
FIG. 1E illustrates a simplified partial bottom sectional view of an aircraft and RPS according to one exemplary embodiment of the disclosed systems and methods.
Figure 1F:
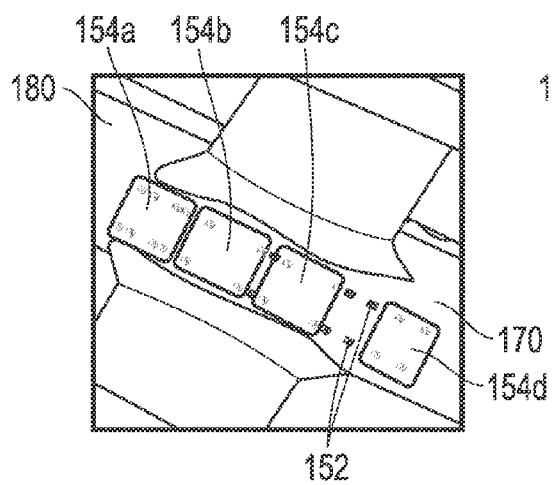
FIG. 1F illustrates a simplified partial bottom sectional view of an aircraft and RPS according to one exemplary embodiment of the disclosed systems and methods.
Figure 1G:
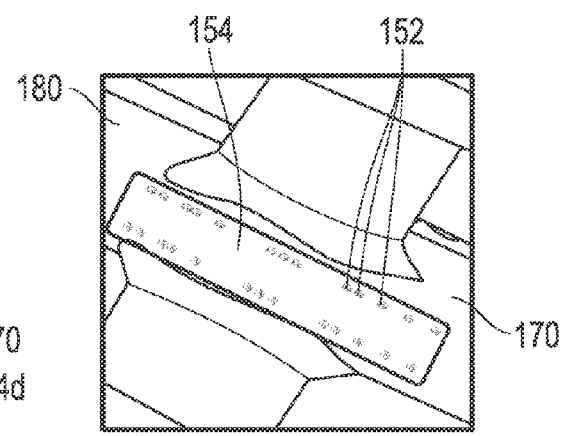
FIG. 1G illustrates a simplified partial bottom sectional view of an aircraft and RPS according to one exemplary embodiment of the disclosed systems and methods.
Figure 1H:
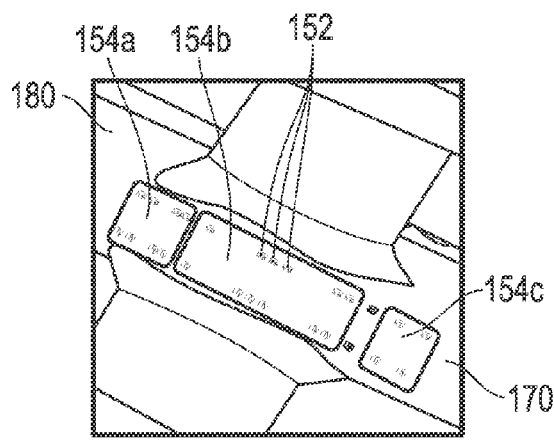
FIG. 1H illustrates a simplified partial bottom sectional view of an aircraft and RPS according to one exemplary embodiment of the disclosed systems and methods.

As shown in FIG. 1G, a single section 154 may be coupled to and mounted across all installed fittings 152 for one application (e.g., mission), while multiple sections 154 (e.g., three sections 154 in FIGS. 1E and 1H, and four sections 154 in FIG. 1F) may be coupled to and mounted for other applications (e.g., missions) across some or all of the same installed fittings 152. As shown in each of the illustrated embodiments of FIGS. 1E, 1F and 1H, multiple mounting adapter sections 154 are mechanically coupled to the aircraft fuselage 180 in adjacent end-to-end manner to extend longitudinally across the given section of the aircraft fuselage 180. As shown in FIGS. 1F and 1H, a portion of the installed fittings 152 may be left exposed and uncoupled to any section for a given installation or removed, and retained for future reinstallation, with a minimum of four fittings 152 used in this embodiment to secure each mounting adapter 154 to the fuselage bottom 170. As shown in FIG. 1D, all sections 154 may be removed from fitting 152 as may be the case, for example, on the ground during interchange of mounting adapters 152 or during installation or removal of fittings. Not shown in FIGS. 1E-1I are payload rails 122 and payload hardpoints 119 that may be installed on each of sections 154 in manner as described elsewhere herein.

FIG. 1I illustrates how number and location of installed fuselage fittings 152 and installed mounting adapter sections 154 on the bottom side 170 of an aircraft fuselage 180 may vary according to the anticipated loads of attached payload component/s 105 and/or fairing component/s 101. As shown in FIG. 1I, the individual locations of a given number of fuselage fittings 152 may be standardized (e.g., for a given type of aircraft such as Beechcraft King Air 350), and then only as many fittings 152 installed on a given aircraft as needed for the loads of the given application (e.g., mission) for that aircraft.

Returning to the illustrated embodiment of FIG. 1C1, the mounting adapter rails 122 are oriented parallel to the aircraft fuselage longitudinal axis 160 in order to provide for more payload attachment provisions. However, other rail orientations are possible where desired or needed to fit the characteristics of a given RPS application. Further, in one alternative embodiment, a RPS mounting adapter may be configured as one or more spaced-apart cross beams or cross pieces that are mechanically coupled to fuselage fittings 152 to allow payload components to be mechanically coupled to the fuselage via the cross-beams and fuselage fittings 152, i.e., rather than via a mounting adapter 154 (i.e., with its respective rails 122 and/or hardpoints 119).

Still referring to FIGS. 1B and 1C1, one or more monolithic or modular fairings 101 may be optionally mechanically coupled to mounting adapter section's 154 as required to at least partially surround all or part of payload components that may be mechanically coupled to mounting adapter section/s 154 with rails 122 and/or hardpoints 119. As previously described, some types of payload components are designed for direct airstream exposure while other types of payload components require enclosure within an aerodynamic fairing 101 to at least partially shield the payload components from airstream exposure. In this regard, the illustrated RPS design is capable of supporting a monolithic or modular aerodynamic fairing as needed for a given payload configuration, it being understood that an aircraft operator may require differing aircraft mission capabilities under normal concepts of operation and that differing payloads may require differing types and configurations of aerodynamic fairings 101. In the illustrated embodiment, all (monolithic) or a portion (modular) of an aerodynamic fairing 101 may be installed using the unique configuration of the RPS mounting adapter section/s 154 design.

As described herein in relation to FIGS. 1D-1H and FIGS. 4D-4G, all components of a RPS may be removable from a given aircraft fuselage 180 (e.g., including fittings 152, mounting adapter section/s 154 together with corresponding payload rails 122 and/or hardpoints 119, payloads 105, and fairing/s 101) such that the belly of the aircraft fuselage 180 may be reconfigured with differing swappable (i.e., interchangeable) payloads 105 and differing combinations of the above-listed RPS components. For example, anything from a full length mounting adapter section/s 154 to only one partial length mounting adapter section/s 154 may be installed, removed, and reinstalled as part of a RPS for a given aircraft 150. In one embodiment, different quantities of fittings 152 may be installed on one aircraft 150 versus another aircraft 150 having the same RPS installed. The aircraft operator may elect to install different quantities of fittings 152 and mounting adapters 154 as dictated by the payload 105 requirements of the anticipated flight operations. However, once fittings 152 are installed, a given mounting adapter section/s 154 (e.g., such as a baseplate) is configured to pin up to the fittings 152, and these mounting adapter sections 154 (e.g., baseplates) are portable from one aircraft 150 to a different aircraft 150. In this regard, since mounting adapter sections 154 (e.g., baseplates) may be configured with regularly-spaced and standardized payload mounting provisions in the form of payload rail/s 122 and hardpoints 119, a sensor payload 105 may be also portable from one aircraft 150 to different aircraft 150. Moreover, in one embodiment, multiple different types of payloads 105 may be physically interchanged or swapped on a given aircraft 150 using the same configuration of RPS fuselage fittings 152 and mounting adapters 154 having standardized rails 122 and/or hardpoints 119, i.e., without requiring removing, adding to, or otherwise changing the configuration of fittings 152 and adapter sections 154 currently installed on the aircraft 150. In a further embodiment, the aircraft may be operated with these different interchanged payload components under the same RPS FAA STC(s) for the current RPS design payload envelope.

In one embodiment, the defined pattern of fittings 152 of a given RPS design for a given aircraft 150 may not change although the quantity installed at any given time may change according to mission. As an example, a RPS defined for a Beechcraft King Air 350 may provide for a maximum of 26 fittings 152 for the defined load envelope, and provisions for all 26 fittings may be installed on the aircraft 150, together with required structural modifications to the aircraft 150. However, in a given mission case, installation and load of the baseline RPS baseplates 154a-d may require only a portion of the full pattern of installed fittings (e.g., 16 of the available 26 fittings). In such a case, 10 of the existing fittings 152 may be removed from the aircraft 150 (e.g., unbolted and taken off), although all of the structural provisions for the full pattern of 26 fittings 152 remain installed on the aircraft 150. Thus, in this embodiment all fittings 152 of the given RPS design may be initially installed (together with corresponding required structural modifications to aircraft 150), and then the number of installed fittings 152 varied from mission to mission to meet the payload requirements of each mission.

In another embodiment involving installation of the same RPS design as described in the preceding paragraph for another aircraft of the exact same type (e.g., Beechcraft King Air 350), a user may anticipate from the outset only ever needing a portion (e.g., 16 or 12 or 8 or 4, etc.) of the maximum possible number of 26 fittings for this same RPS design. In such a case, an aircraft 150 may be modified to include provision for only the anticipated maximum number of fittings (e.g., 16 or 12 or 8 or 4, etc.) at the time the given aircraft 150 is modified and the RPS installed. For example, a user only requiring a point solution payload capability (and not a swappable payload capability) may save money by only installing those fittings 152 required to enable the point solution. Whether or not an aircraft 150 is modified to support the full number of fittings 152 (or only a portion thereof) the RPS design is complete and either all or just a portion of the RPS fittings of the approved STC design are installed.

It will be understood that in one exemplary embodiment, mounting adapters 154 may be configured to be exchangeable between different aircraft. In this regard, RPS design, including load envelope and fitting pattern, may be standardized (e.g., per ICD) across different aircraft 150 of the same type so that once an RPS is installed on a given aircraft 150, mounting adapters 154 should pin up to fittings 152 even if individual mounting adapters 154 has some optional customization such as for a different fairing 101 for example. In this regard, fittings 152 of a given RPS design for a given aircraft type may be installed in the same locations on different aircraft 150 of the same aircraft type so as to allow mounting adapters 154 to be transferred between different aircraft 150, i.e., with mounting adapter 154-to-fitting 152 interfaces remaining constant.

With regard to the embodiments of FIGS. 1A-1C2, a quick disconnect panel 100 may be provided in one embodiment as shown in FIGS. 1A and 1B to allow exterior and interior electrical harnesses (or other types of payload interface lines including fluid conduits such as hydraulic lines, liquid coolant lines for heat exchange cooling, etc.) associated with various RPS payload/s (e.g., that may be mounted to payload rails 103 in FIG. 1A or to rails 122 and/or hardpoints 119 of mounting adapter 154 of FIGS. 1B and 1C1) which may be later removed from payload rails 103 or rails 122/hardpoints 119 to be quickly connected and disconnected using the quick disconnect panel 100. In such an embodiment, quick disconnect panel 100 enables the aircraft operator to rapidly swap or interchange different payload/s and their associated interface harnesses without having to modify the aircraft fuselage 180 at each payload change. The particular illustrated location and configuration of quick disconnect panel 100 is exemplary only, it being understood that more than one disconnect panel 100 may be provided in a variety of suitable locations on an aircraft, depending on size and complexity of the aircraft and/or payloads. In one exemplary embodiment, disconnect panels 100 may be distributed at various locations on fuselage 180 (e.g., in locations adjacent to different sections of payload rails 103 or different sections of rails 122 and/or hardpoints 119 of mounting adapter section's 154), and then optionally employed in various combinations to fit the requirements of given missions and payload combinations or when an adjacent rail or mounting adapter section is used for a given mission. In one example, one or more of multiple installed disconnect panels 100 may be blanked off (with no openings or interface lines extending there through) for future use when needed. Further information regarding an exemplary quick disconnect panel 100 is provide in relation to FIGS. 5-7 herein.

Figure 2B:
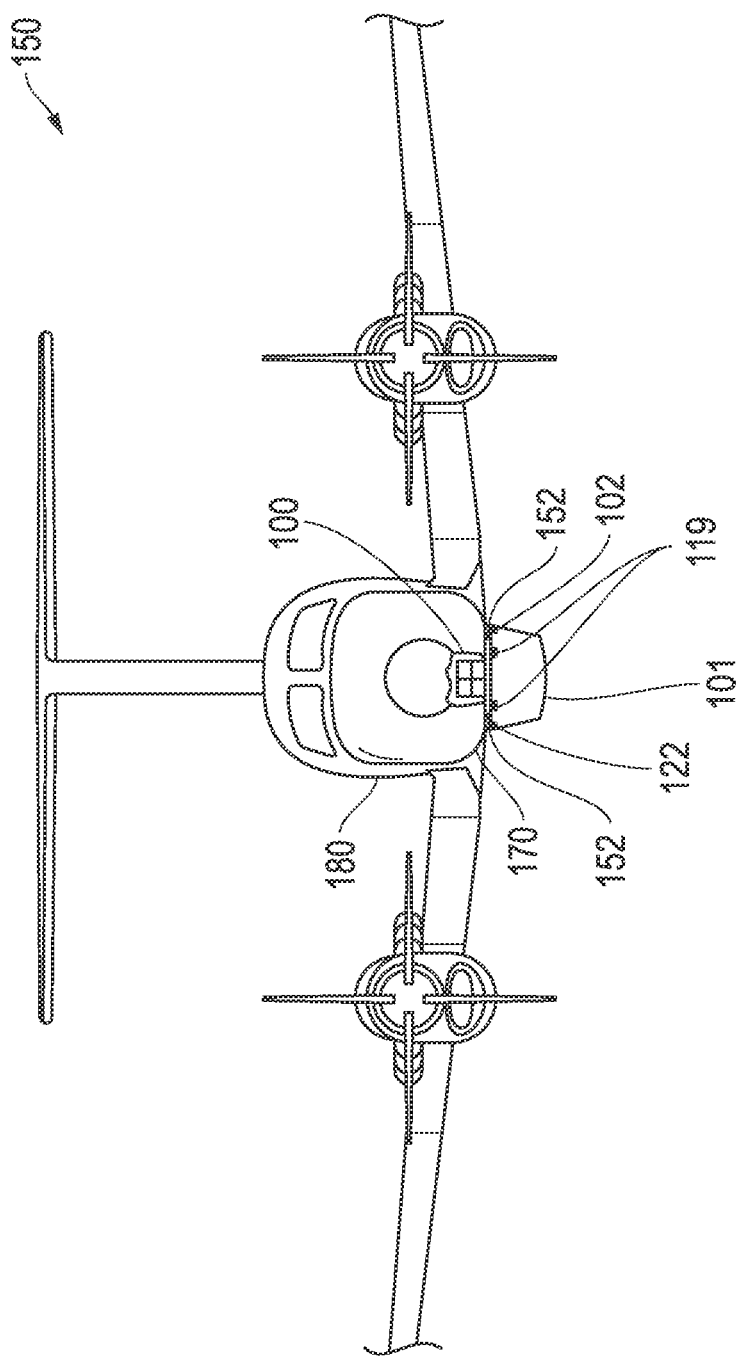
FIG. 2B illustrates a simplified front sectional view of an aircraft and RPS according to one exemplary embodiment of the disclosed systems and methods.
Figure 3:
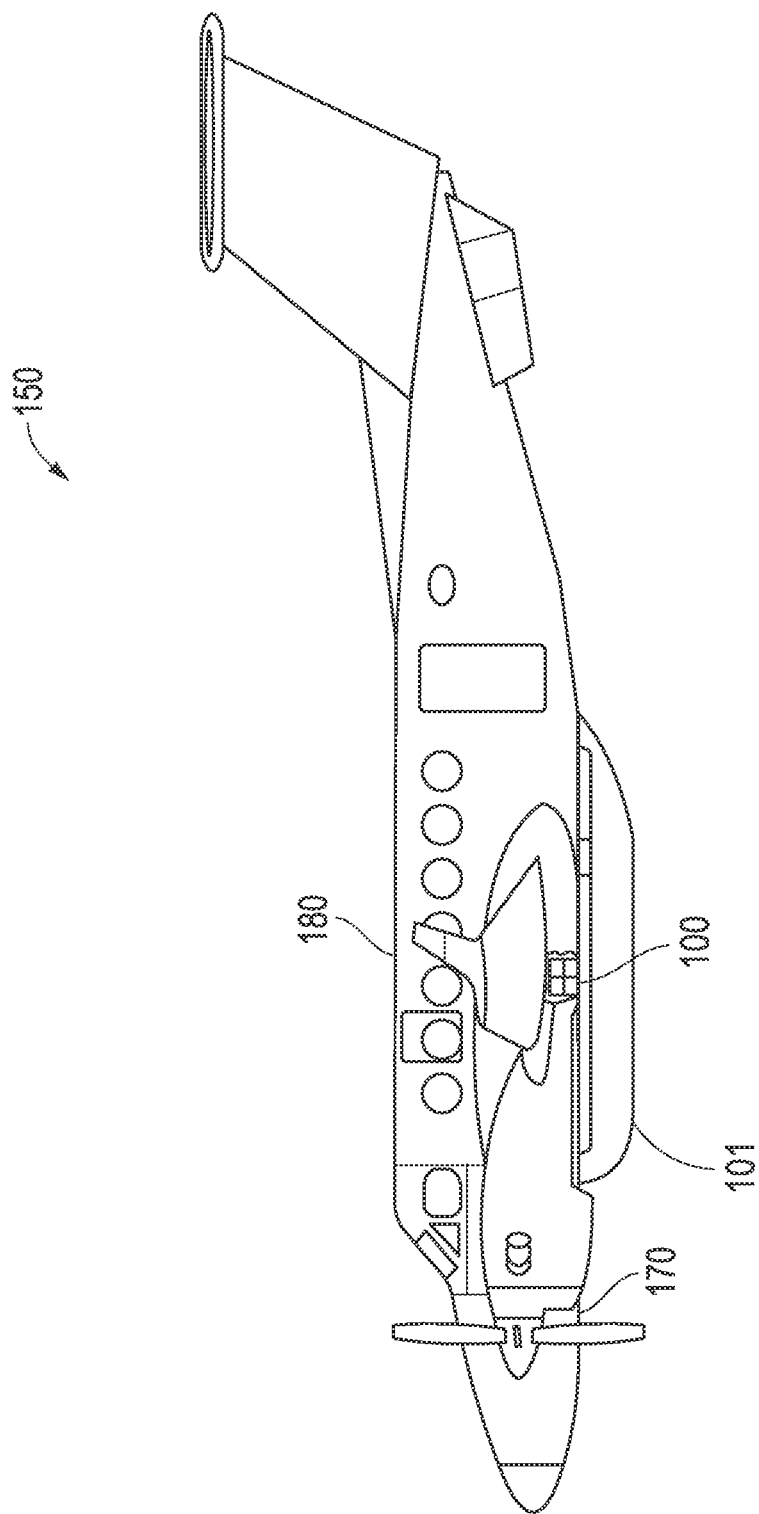
FIG. 3 illustrates a simplified side sectional view of an aircraft and RPS according to one exemplary embodiment of the disclosed systems and methods.

FIGS. 2A-2B and 3 illustrate alternate views of the fixed winged aircraft 150 and installed RPS embodiments of FIGS. 1A-1C1. As shown in FIGS. 2A-2B and 3, quick disconnect panel 100 may be recessed within the aircraft fuselage 180 to provide external access for connecting and disconnecting signal conductors (e.g., electrical and/or optical signal conductors) or other type/s of payload operation support harnesses for various payload components that may be installed and removed from RPS inner payload rails 103, or installed and removed from RPS mounting adapter 154 (e.g., with rails 122 and/or hardpoints 119), as further described herein in relation to FIGS. 5-7.

Figure 4A:
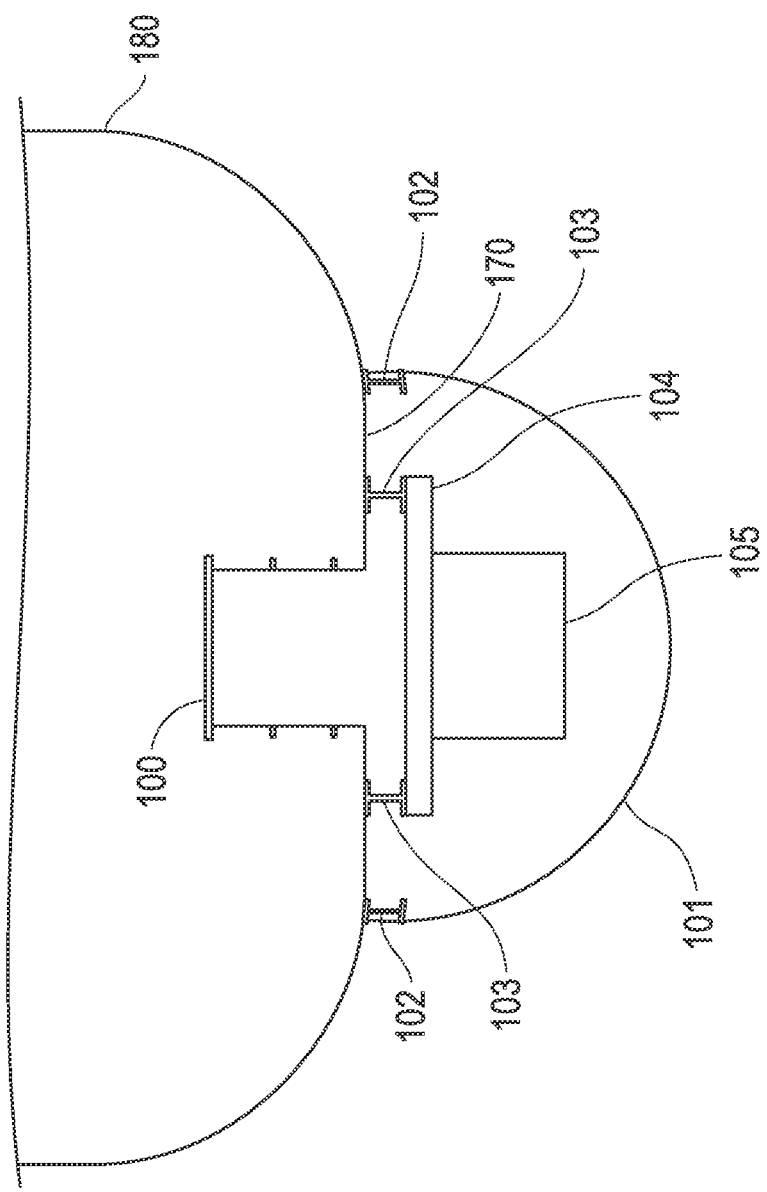
FIG. 4A illustrates a simplified partial front view of an aircraft fuselage and RPS according to one exemplary embodiment of the disclosed systems and methods.
Figure 4B:
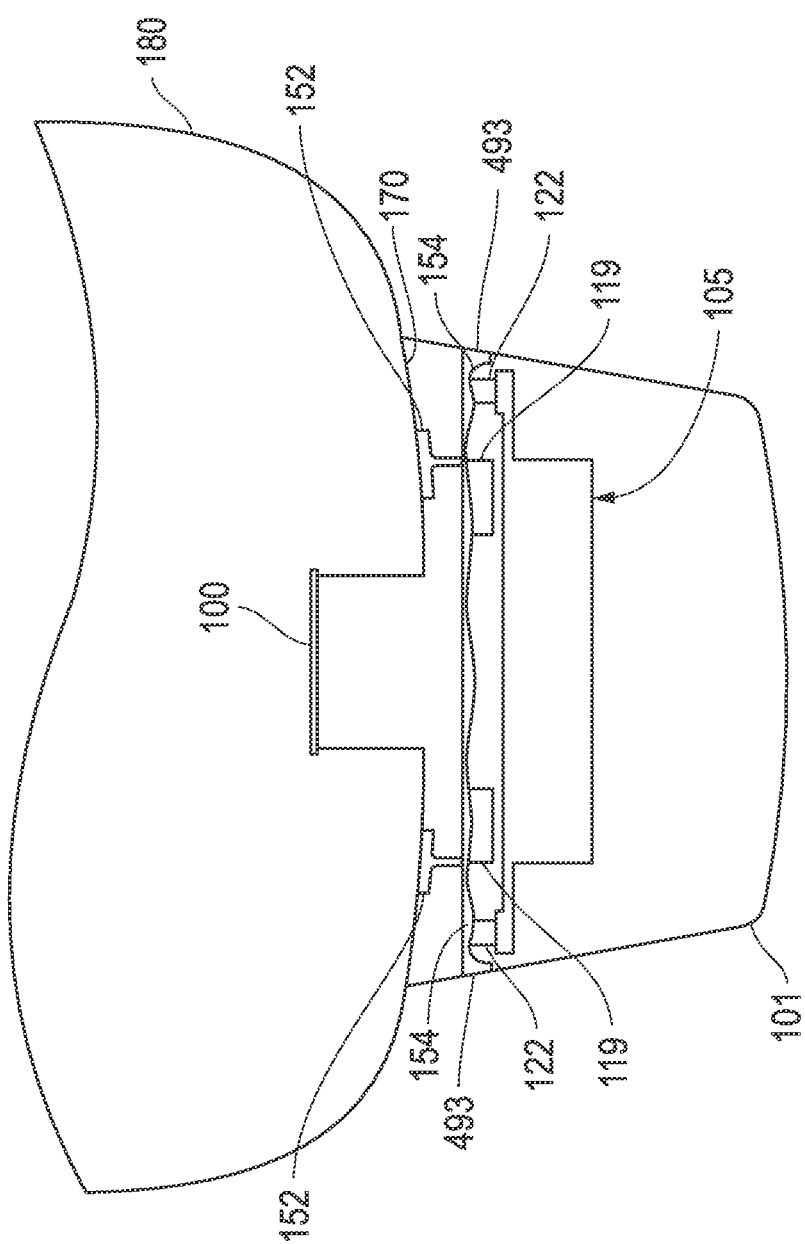
FIG. 4B illustrates a simplified partial front view of an aircraft fuselage and RPS according to one exemplary embodiment of the disclosed systems and methods.
Figure 4C:
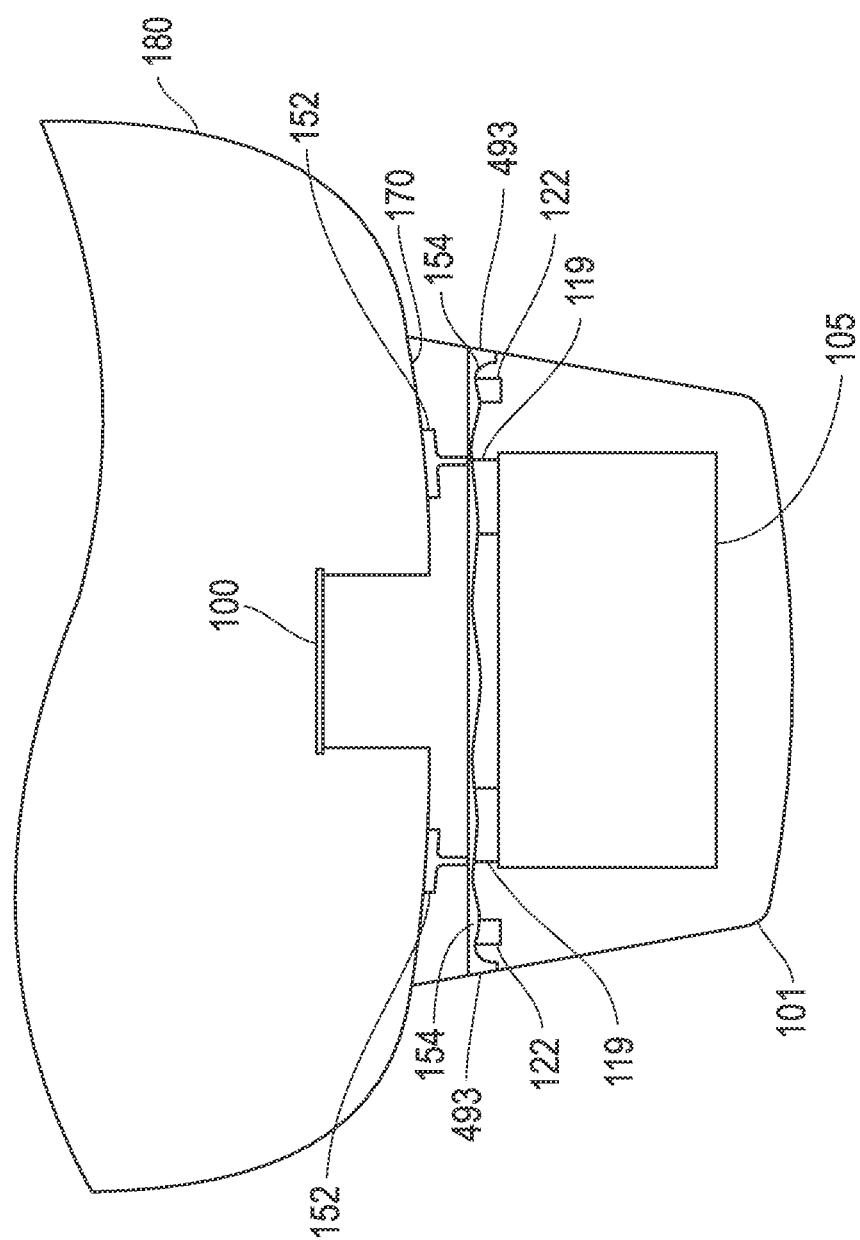
FIG. 4C illustrates a simplified partial front view of an aircraft fuselage and RPS according to one exemplary embodiment of the disclosed systems and methods.

FIG. 4A illustrates a simplified front view of aircraft fuselage 180 and installed RPS embodiment of FIG. 1A. In FIG. 4A, an exemplary swappable (or interchangeable) payload component 105 is illustrated mechanically coupled to inner payload rails 103 by payload adapter 104 and surrounding by a payload fairing 101. It will be understood that external payload component 105 of FIG. 4A may be any type of device or object that is suitable for mounting externally to fuselage 180 of aircraft 150 via payload rails 103. FIG. 4B illustrates a simplified front view of aircraft fuselage 180 and installed RPS embodiment of FIGS. 1B-1C1. In FIG. 4B, an exemplary swappable (or interchangeable) external payload component 105 is illustrated mechanically coupled to the mounting adapter 154 with rails 122 externally to (or outside) the fuselage 180 and surrounded by a payload fairing 101. In FIG. 4C, an exemplary swappable (or interchangeable) payload component 105 is illustrated mechanically coupled to the mounting adapter 154 with hardpoints 119 and surrounding by a payload fairing 101. It will be understood that payload component 105 of FIGS. 4B and 4C may be any type of device or object that is suitable for mounting to aircraft 150 via payload mounting adapter 154 with rails 122 and/or hardpoints 119. It will be understood that payload component 105 of FIGS. 4B and 4C not designed to directly mount mounting adapter 154 with rails 122 and/or hardpoints 119 may use a payload adapter 104 between payload component 105 and mounting adapter 154.

It will be understood that a given payload component 105 of the embodiments of FIGS. 4A-4C may be configured to be electrically coupled to other equipment contained within fuselage 180 (e.g., such as active or passive electrical or electronic component/s), or may be configured to be mounted on payload rails 103 (i.e., in the case of FIG. 4A embodiment) or mounted to mounting adapter 154 with rails 122 and/or hardpoints 119 (i.e., in the case of FIG. 4B or 4C embodiment) with no electrical or other connection to equipment contained within fuselage 180 (e.g., such as cargo or supplies, self-contained sensors or other battery or, etc.). In one exemplary embodiment, active or passive electronic payload components may be electrically and/or optically coupled via quick disconnect panel 100 to associated internal component/s of payload equipment located within the fuselage of aircraft 150, e.g., such as power generating equipment, signal monitoring equipment, signal recording equipment, signal transmitting equipment, control signal generating equipment, transceiver equipment, etc. Other types of payload components may be self-contained (e.g., having self-contained power supply, self-contained recording or monitoring equipment, self-contained wireless communication capability, etc.) and therefore not require electrical or optical connection to other components or equipment internal to fuselage 180. In the latter case, quick disconnect panel 100 need not be used, and optionally may not be present at all.

Examples of suitable types of payload components 105 that may installed and interchanged in a given RPS include, but are not limited to, optic/electro-optic sensors, infrared sensors, antennas (passive and active), antenna arrays (passive and active), self-protect or countermeasure sensors, self-protect or countermeasure dispensers, radar (of various types and capabilities) sensors, light direction and ranging (LIDAR) sensors, foliage penetration (FOPEN) sensors, weapons, dispensers (e.g., such as for leaflets), laser emitters, laser detectors, environmental sensors (e.g., such as pollution, radiation, airborne particle, thermal, gaseous, weather, etc.), data links, multi-intelligence (of which many of the above payload types are related), deployable provisions (e.g., such as life sustaining supplies), communication jamming, etc.

Referring to the embodiment illustrated in FIG. 4A, payload fairing 101 is shown coupled to the outer fairing rails 102 in position to surround payload component 105. In this embodiment, outer fairing rails 102 are configured to mechanically couple the aerodynamic and inertial loads of the fairing 101 to the aircraft fuselage. As shown, swappable payload component 105 may be mechanically coupled to an optional payload adapter as shown, which is in turn coupled to inner payload rails 103. In such an embodiment, payload adapter 104 is configured to provide a mounting interface (where needed) between unique mounting provisions of a swappable payload and the common (or standardized) mounting features of inner payload rail 103. Inner payload rail 103 in turn couples the inertial load of the swappable payload component 105 to the aircraft fuselage 180. In an embodiment where swappable payload component 105 is mounted in the airstream without the presence of a payload fairing 101, inner payload rails 103 are configured to couple the inertial and aerodynamic loads of the swappable payload component 105 to the aircraft fuselage 180.

In one exemplary alternative embodiment of FIG. 4A, inner payload rail 103 may be a hybrid section with optional hardpoints to enable a multitude of user defined solutions. One or more of such hardpoints may be made available between rail sections to provide the ability to install heavier or larger dimension payloads that may require hardpoints for mounting rather than a rail due to weight or clearance requirements. Thus, inner rails 103 may in one embodiment each be a series of rail sections, or may be a hybrid configuration of rail sections that are separated by hardpoints that mount directly to the aircraft fuselage 180, e.g., with sections of inner payload rail 103 installed (e.g., to other hardpoints) between hardpoints. In either case, the disclosed RPS enveloped loads design and enveloped payload installation methodologies may be employed for mounting of payloads to the hardpoints as since the loads envelope established for that section of the rail apply to the positional related hardpoints. Thus, the disclosed RPS enveloped loads design and enveloped payload installation methodologies are applicable for mounting of external payload components and fairings to a given aircraft fuselage using different types of external payload attachment features (e.g., such as payload rails, fairing rails, hardpoints of the embodiment of FIG. 1A, mounting adapters having integral payload rails and/or payload hardpoints such as the embodiment of FIG. 1B, etc.), as well as combinations of such external payload attachment features.

Referring now to the embodiment illustrated in FIG. 4B, payload fairing 101 is shown coupled to the mounting adapter 154 in position to surround payload component 105. In this embodiment, mounting adapter 154 is configured to mechanically couple the aerodynamic and inertial loads of the fairing 101 to the aircraft fuselage via fuselage fittings 152. As shown, swappable payload component 105 may be mechanically coupled to payload rails 122 of mounting adapter 154. It will be understood that payload component 105 of FIG. 4B may additionally or alternatively coupled to hardpoints 119 of mounting adapter 154. In either case, it will be understood that an optional adapter component (e.g., similar to payload adapter 104 of FIG. 4A) may be configured to provide a mounting interface (where needed) between unique mounting provisions of a swappable payload 105 and the common (e.g., standardized) mounting features 122 and/or 119 of mounting adapter 154. As shown in FIG. 4B, mounting adapter 154 in turn couples the inertial load of the swappable payload component 105 to the aircraft fuselage 180 via fuselage fittings 152.

As with the embodiment of FIG. 4A, a swappable payload component 105 may be mounted in the airstream without the presence of a payload fairing 101. In such an embodiment, payload rails 122 and/or payload hardpoints 119 of the mounting adapter 154 may be used to couple the inertial and aerodynamic loads of the removable/swappable payload component 105 to the aircraft fuselage 180 via fuselage fittings 152. In another alternative embodiment, a mounting adapter 154 may be configured as needed to meet the specific needs (e.g., required spacing, required number and/or location of rails and/or hardpoints, etc.) of a payload component 105 that does not have a common (or standardized) mounting configuration of payload rails 122 and payload hardpoints 119. In such an alternative embodiment, a mounting adapter 154 may be configured with any required or otherwise suitable specific and non-standard configuration of rails, hardpoints or other type payload attachment provisions to fit the needs of a given payload attachment application.

Figure 4D:
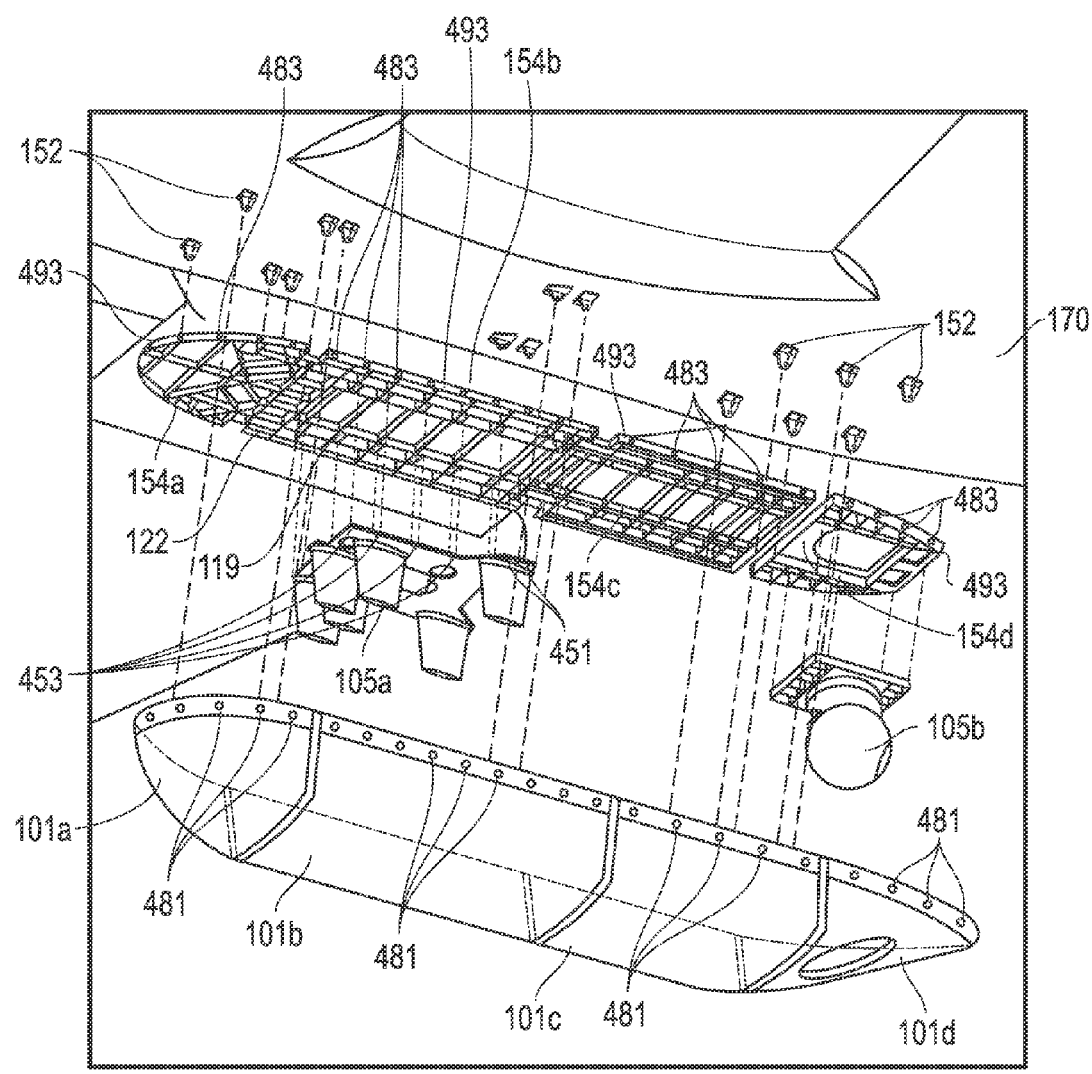
FIG. 4D illustrates an expanded perspective view of components of an RPS installation according to one exemplary embodiment of the disclosed systems and methods.
Figure 4H:
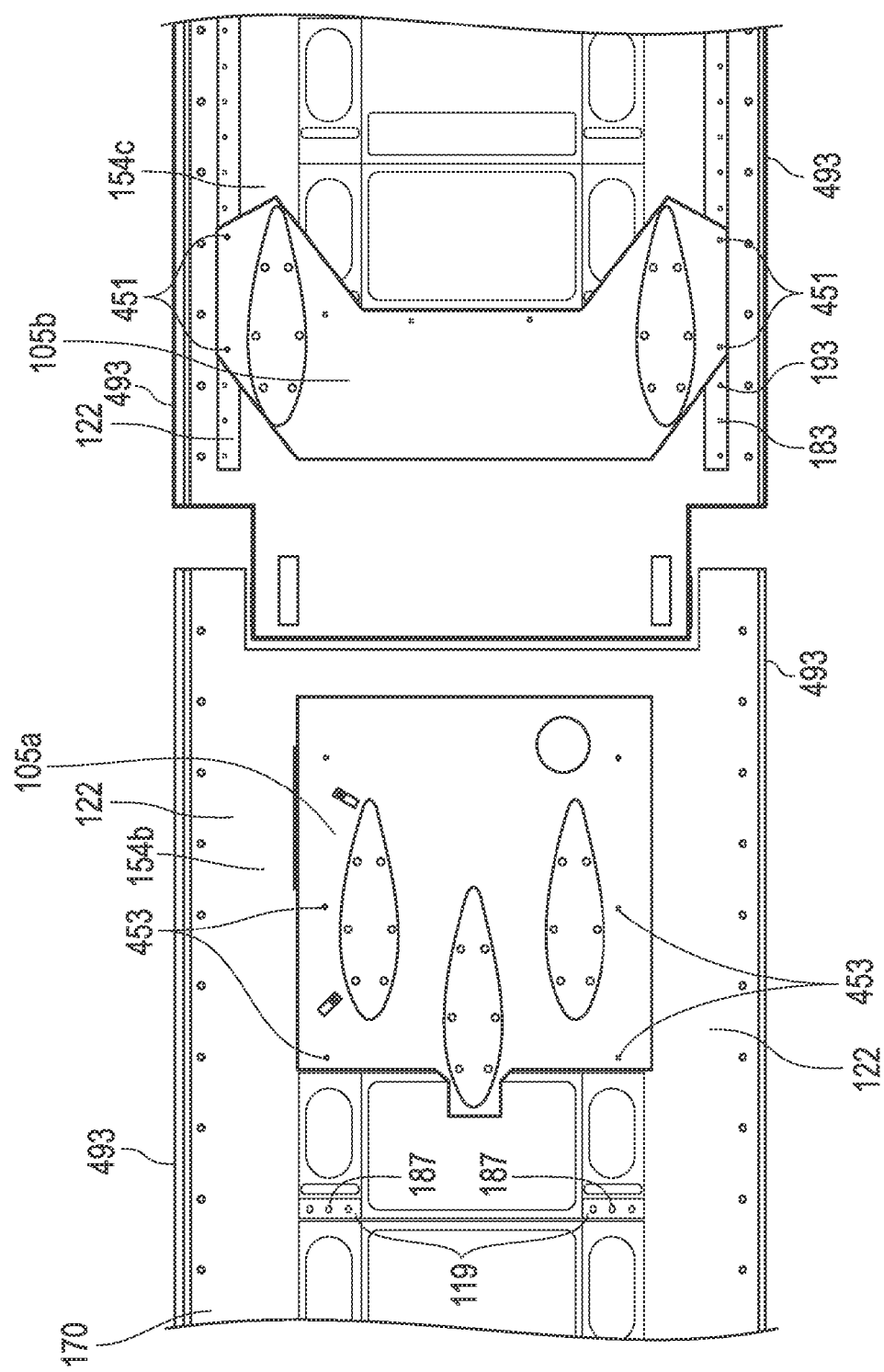
FIG. 4E illustrates a partial bottom sectional view of an aircraft and RPS according to one exemplary embodiment of the disclosed systems and methods.
FIG. 4F illustrates a partial bottom sectional view of an aircraft and RPS according to one exemplary embodiment of the disclosed systems and methods.
FIG. 4G illustrates a simplified partial perspective view of components of an RPS installation according to one exemplary embodiment of the disclosed systems and methods.

FIG. 4D illustrates how various components of an exemplary RPS installation (e.g., including sixteen fittings 152, four mounting adapter section's 154, two payloads 105 and four fairing section/s 101) may be configured to be assembled and removed from the bottom side 170 of a given aircraft fuselage 180 as needed, i.e., in this case with each mounting adapter section 154 being mounted to fuselage bottom 170 with four fittings 152. As shown, peripheral fairing interface area of each mounting adapter section 154 includes fairing interface fastener locations 483 that are defined in fairing interface 493 with standardized spacing and location (e.g., with location, size and spacing specified by ICD) so as to align and mate with corresponding fairing fastener locations 481 defined around the mating perimeter of fairing section/s 101. Each of faring interface fastener locations 483 may be, for example, machine-threaded openings defined in fairing interface area of a given mounting adapter 154 that is configured to accept a threaded fastener such as a bolt, screw, etc. After installation on an aircraft 150, all RPS components (including fuselage fittings 152) may then be temporarily removed in one embodiment from aircraft fuselage 180 to result in a "slick" airframe, e.g., to allow the aircraft 150 to be flown between airports or other locations with no RPS components attached to the bottom side 170 of fuselage 180. In any case, screws or other suitable fasteners may be threaded into holes in fuselage bottom 170 where unused fittings 152 are mounted when used. After arrival at a new location with a slick airframe, the RPS components may then be reassembled to the bottom side 170 of the aircraft fuselage 180 in the manner illustrated in FIG. 4D.

FIG. 4E illustrates in cross section one exemplary embodiment of an assembled mounting adapter 154 such as shown in FIG. 4D. As illustrated in FIG. 4E, an exemplary payload 105 is provided with rail payload fastener locations 451 and hardpoint payload fastener locations 453 that each may have standardized spacing and location on payload 105 (e.g., with location, size and spacing specified by ICD). Also as illustrated in FIG. 4E, payload 105 is mounted across adjacent mounting adapter 154c and 154d using the standardized rail payload fastener locations 451 and standardized hardpoint payload fastener locations 453. Payloads 105 may be mounted to a single or multiple mounting adapters 154 depending on the size of the payload and desired location of payload 105 along the longitudinal axis 160. As shown in FIG. 4E, rail payload fastener locations 451 are spaced and located so as to align and mate with rail fastener locations 183 on each mounting adapter 154b and 154c at the same time that hardpoint payload fastener locations 453 are aligned and mated with hardpoint fastener locations 187 on each mounting adapter 154b and 154c, it being understood that any given payload 105 may only be provided with one of rail payload fastener locations 451 or hardpoint payload fastener locations 453, and/or that any given mounting adapter 154 may only be provided with one of payload rails 122 or payload hardpoints 119 as illustrated in FIG. 4F.

In the embodiment of FIG. 4E, mounting adapters are mounted to fuselage bottom 170 in relative position to each other (e.g., suitably spaced apart) by fasteners 152 such that the longitudinal periodicity between standardized rail fastener locations 183 (constant rail fastener periodicity annotated in FIG. 4E) and longitudinal periodicity between standardized hardpoint fastener locations 187 (constant hardpoint fastener periodicity annotated in FIG. 1C1 but also present in FIG. 4E) is maintained constant across different mounting adapters 154 of a RPS such that a payload 105 may be mounted as shown in FIG. 4E across two or more mounting adapter sections of the same RPS using the standardized rail payload fastener locations 451 and standardized hardpoint payload fastener locations 453 of the payload 105. In one exemplary embodiment, spacing "Y" between adjacent mounting adapters 154 may be selected or adjusted (e.g., from no space to an optional gap of suitable dimension) as needed to maintain the periodicity of both the rail fastener locations 183 and hardpoint fasteners 187 across sections 154 for a given RPS installation.

In the embodiment of FIG. 4F, a payload 105a is only configured with hardpoint payload fastener locations 453 that mechanically couple payload 105a to a mounting adapter 154a that itself is only provided with payload hardpoints 119 (and not payload rails 122) via corresponding hardpoint fastener locations 187. Also as shown in FIG. 4F, a payload 105b is only configured with rail payload fastener locations 451 that mechanically couple payload 105b to a separate mounting adapter 154b that is only provided with payload rails 122 (and not payload hardpoints 119) via corresponding rail fastener locations 183.

It will be understood that multiple different types of swappable or interchangeable payloads other than payload 105 of FIG. 4E (e.g., such as 105b of FIG. 4D, payloads 105a and 105b of FIG. 4F, and the different illustrated interchangeable payloads 850 of FIG. 8B) may all be provided with rail payload fastener locations 451 and/or hardpoint payload fastener locations 453 that are spaced and located so as to similarly align and mate with the same rail fastener locations 183 and/or hardpoint payload fastener locations 187 in the same manner as payload 105 in FIG. 4E and payloads 105a and 105b in FIG. 4F, i.e., so as to allow a given payload 105 to be removed and replaced with one or more different types of payloads 105 using the same rail payload fastener locations 451 and/or hardpoint payload fastener locations 453.

Fairing 101 is mechanically coupled to peripheral fairing interface 493 of mounting adapter 154 by suitable fairing fasteners 410 (e.g., machine screws, latches, attachment hardware, etc.) received through fairing fastener locations 481 that are aligned with fairing interface fastener locations 483 as further illustrated and described in relation to FIG. 4G. In one exemplary embodiment, each of fastener locations 451, 453, 183, and 187 may be fastener openings defined to receive suitable respective fasteners (e.g., such as machine screws, attachment hardware, etc.) that extend through each pair of aligned and mated fastener openings 451 and 183, and that extend through each pair of aligned and mated fastener openings 453 and 187, so as to securely mechanically couple the payload component 105 to the mounting adapter section 154. It will be understood that in one exemplary embodiment, fairing interface fastener locations 483 may be defined on each of mounting adapters 154 with a standardized regular spacing such that the spacing of fairing interface fastener locations 483 remains regular across the faring interfaces 493 of different mounting adapter sections 154 so as to allow the mating fairing fastener locations 481 of an interchangeable fairing component 101 to align with and simultaneously attach to mating regularly-spaced faring interface fastener locations 483 on two or more of the multiple separate mounting adapter sections 154 to mechanically couple the interchangeable fairing component 101 to the aircraft fuselage 180, e.g., in a manner similar to that illustrated and described in relation to FIG. 4F for mounting a payload 105 across multiple mounting adapter sections 154.

FIG. 4G illustrates relationship between an exemplary embodiment of mated RPS components, such as the RPS components illustrated in FIGS. 4D-4F. As shown in FIG. 4G, fuselage fittings 152 may be mechanically coupled to bottom side 170 of an aircraft fuselage 180 by fitting fasteners (attachment hardware (e.g., such as bolts, screws, etc.) 471 which extend through a skin reinforcement 460 (e.g., structural doubler, structural tripler, etc.) that is positioned between each fitting 152 and fuselage 180. Fuselage fittings 152 are in turn coupled to mounting adapter 154 by attachment hardware. In the illustrated embodiment, each of rails 122 are coupled to mounting adapter 154 by suitable fasteners (e.g., bolts, screws, attachment hardware, etc.). As further illustrated fairing 101 is mechanically coupled to fairing interface 493 by suitable fairing fasteners (e.g., bolts, screws, latches, attachment hardware, etc.) received through aligned fairing fastener locations 481 that are aligned with fairing interface fastener locations 483.

In the exemplary embodiment of FIG. 4G, rails 122 may be separate components attached to mounting adapter 154 using any suitable common fastener (e.g., machine bolt-nut, etc.), but in another embodiment may be machined as integral parts of mounting adapter 154. In the embodiment of FIG. 4G, hardpoints 119 are machined as integral parts of mounting adapter 154, but in an alternate embodiment may be separate components attached to mounting adapter 154 using common fasteners (e.g., machine bolt-nut, etc.). Also in FIG. 4G, captive nuts 410 may be provided in one exemplary embodiment as shown for coupling fairing 101 to mounting adapter 154, and captive nuts 420 may be provided as shown for coupling interchangeable payload 105 (or optional payload spacer or adapter 104) to mounting adapter 154 and for coupling rails 122 to mounting adapter 154, respectively (e.g., using machine screws). Where optionally employed, payload adapter such as described in relation to FIG. 4A may be mechanically coupled between payload rails 122 and/or hardpoints 119 of mounting adapter 154 and a given payload 105, which may then be coupled to the payload adapter 104 as illustrated and described in relation to FIG. 4A.

It will be understood in one embodiment that the pattern, spacing and/or number of fuselage fittings 152 may vary by aircraft type and/or may vary between different given aircraft 150 (e.g., a different number and/or pattern of fittings 152 may be employed on different aircraft to match the particular structure of the given aircraft 150) while the location and spacing of hardpoints 119, rails 122, and fairing interfaces 493 (together with their associated fastener locations for payloads 105 and fairings 101) may be standardized (e.g., by ICD specification) and the same for all mounting adapter section/s 154, regardless of any difference in the pattern, spacing and/or number of fittings 152 employed on a given aircraft 150. In such a case, different mounting adapter section/s 154 may be configured to have the same standardized location and spacing of hardpoints 119, rails 122, and fairing interfaces 493 (together with their associated fastener locations for payloads 105 and fairings 101), while having different patterns, spacing and/or number of fittings 152 for mounting adapter section/s 154 to the fuselage 180 of different aircraft 150. Thus, a given payload 105 or fairing 101 (having standardized fastener locations 451, 453, and 481) may be easily installed, removed, transferred and re-installed on aircraft having different pattern, spacing and/or number of fuselage fittings 152 using differently configured mounting adapters 154 but without any modification to the fastener locations of the payload 105 or fairing 101.

Figure 5A:
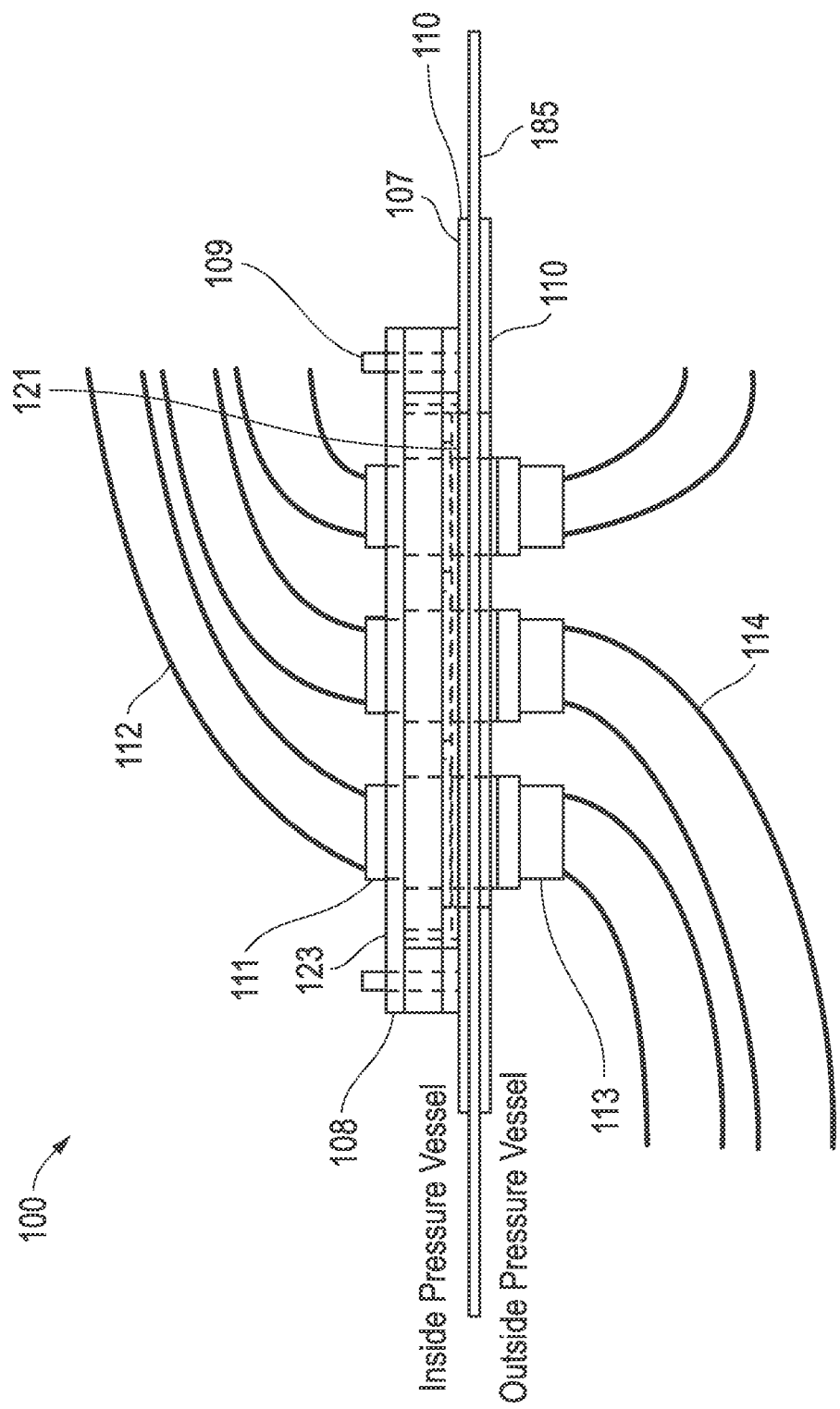
FIG. 5A illustrates a simplified side view of an RPS quick disconnect panel according to one exemplary embodiment of the disclosed systems and methods.
Figure 5B:
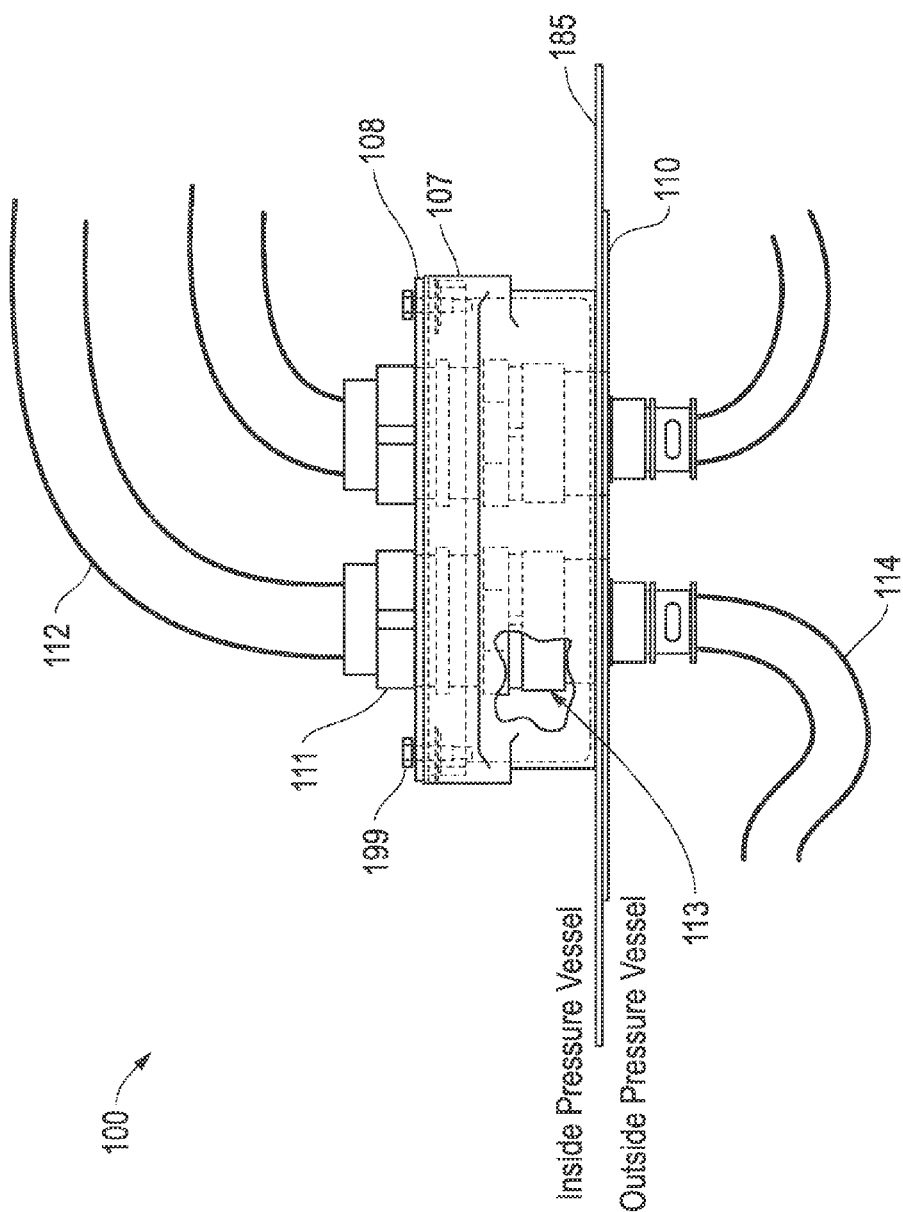
FIG. 5B illustrates a simplified side view of an RPS quick disconnect panel according to one exemplary embodiment of the disclosed systems and methods.
Figure 6C:
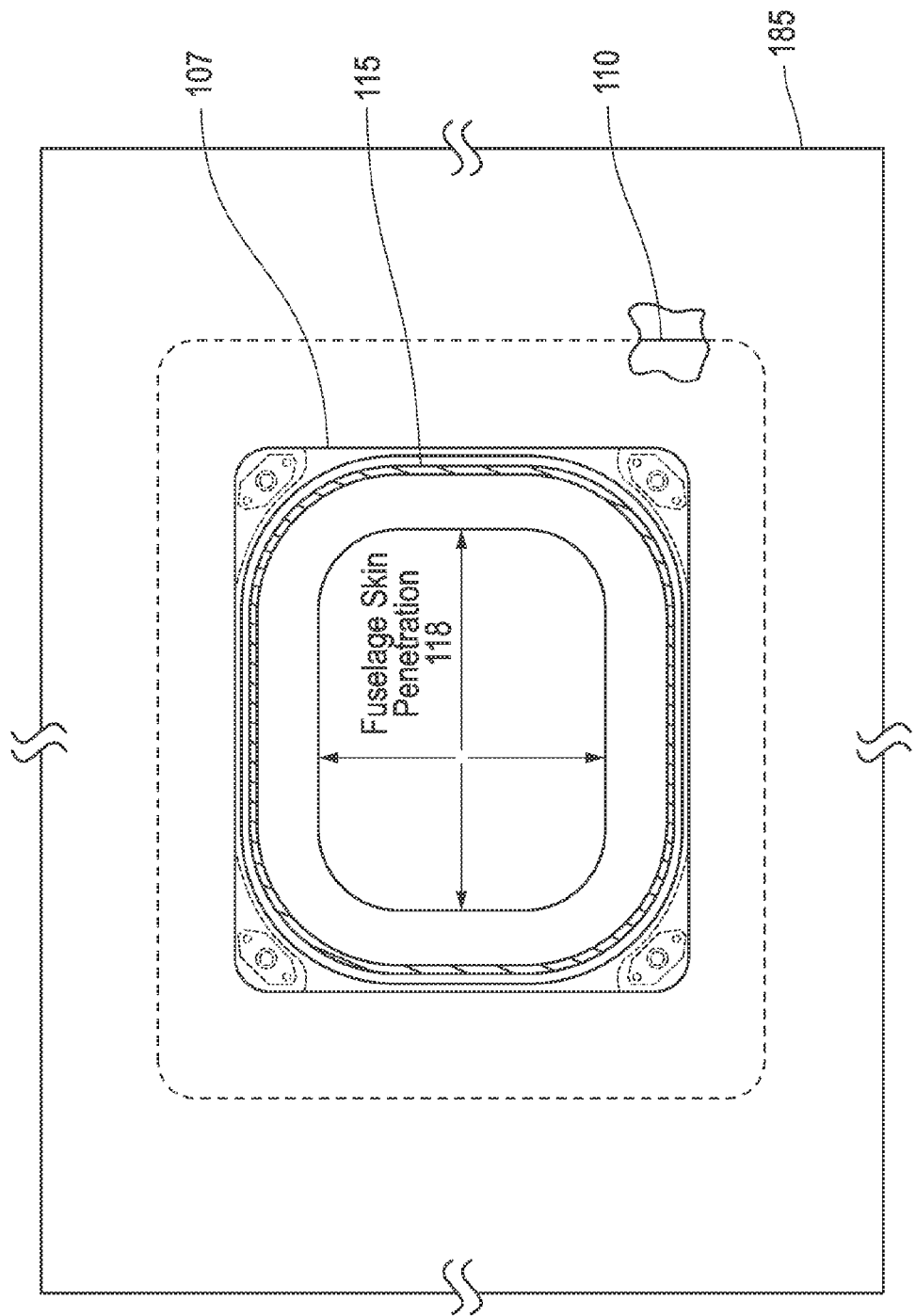
FIG. 6C illustrates a simplified overhead view of a receptacle block portion of a RPS quick disconnect panel according to one exemplary embodiment of the disclosed systems and methods.
Figure 6D:
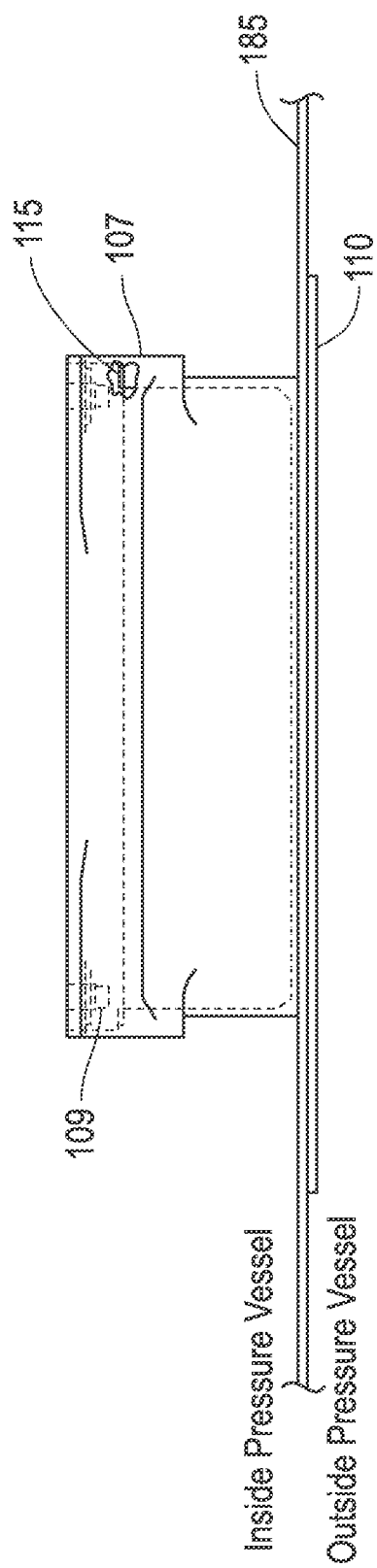
FIG. 6D illustrates a simplified side view of the receptacle block portion of FIG. 6A according to one exemplary embodiment of the disclosed systems and methods.

FIG. 5A illustrates a simplified side view of a RPS quick disconnect panel 100 as it may be configured and installed on aircraft 150 according to one exemplary embodiment of the disclosed systems and methods. FIG. 5B illustrates a simplified side view of an alternative embodiment of a RPS quick disconnect panel 100. As previously described, one or more of such RPS quick disconnect panels 100 may be optionally provided as part of a RPS installation where payload components 105 are used (or anticipated to be used) that will require connection via payload interface lines to internal aircraft components (e.g., such as for signal connection to electrical and/or optical signal processing and/or control signal-generating components, fluid circulation lines for circulating hydraulic actuation fluid or coolant fluids such as air or water, etc.). In the practice of the disclosed systems and methods, a disconnect panel 100 may have any configuration that is suitable for providing temporary payload interface connection (e.g., pluggable and unpluggable fluid line interconnection, electrical or optical signal interconnection, etc.) between one or more external payload components 105 and internal equipment within aircraft 150 during a given mission's. In the particular illustrated embodiment, disconnect panel 100 incorporates a two-piece structural design that includes a disconnect receptacle block 107 with structural reinforcement 110 and disconnect plug block 108. In the illustrated embodiment, structural reinforcement 110 is provided as a structural doubler. However, it will be understood that in other embodiments any other type of structural reinforcement 110 may be optionally employed as desired or needed to fit the characteristics of a given application including, for example, doubler, tripler, or any other type of structural reinforcement known in the art or otherwise suitable for aircraft structural reinforcement practices). It will also be understood that presence of structural reinforcement 110 is optional, and may not be needed in some applications.

As shown in FIGS. 5A and 5B, disconnect receptacle block 107 may be installed with a structural reinforcement 110 on aircraft fuselage skin 185 around an aperture 118 in the form of a fuselage skin penetration defined through skin 185 (shown in FIGS. 6A and 6C), and is configured to be structural in design as further detailed herein so to retain the structural integrity of aircraft fuselage 180 around the fuselage skin penetration of aperture 118. Disconnect plug block 108 may be configured as a structural member which interfaces and mates with (e.g., mechanically couples to) receptacle block 107 on the interior side of the aircraft fuselage skin 185. As shown in the embodiment of FIG. 5A, disconnect plug block 108 may incorporate a plate 121 which provides a surface and structure to mount one or more cabin equipment harness connector/s 111 to the internal fuselage (e.g., cabin) side of disconnect receptacle block 107.

As further shown in FIGS. 5A and 5B, cabin equipment harness connector/s 111 are each attached to a terminal end of a respective cabin equipment harness 112 which is internal to the aircraft fuselage 180 and connected to internal payload equipment located in the aircraft cabin interior. Also shown are payload harness connectors 113 that are each are each attached to a terminal end of a respective payload equipment harness 114 located exterior to the aircraft and coupled to one or more payload components 105 or other payload equipment within the proximity of the RPS. Each of harnesses 112 and 114 may contain electrical and/or optical signal conductor/s (e.g., for communicating electrical and/or optical signals) or fluid circulation lines (e.g., for circulating hydraulic actuation fluid or coolant fluids such as air or water, etc.) between internal payload equipment and one or more passive or active payload components 105 that are mechanically coupled to payload rails 103 of the embodiment of FIGS. 1A and 2A or to payload rails 122 and/or hardpoints 119 of the embodiment of FIGS. 1B, 1C1 and 2B.

Still referring to FIGS. 5A and 5B, structural reinforcement 110 may be installed along with the disconnect receptacle block 107 where additional fuselage skin support is needed or otherwise desired around fuselage skin penetration of aperture 118 illustrated in FIGS. 6A and 6B. The installed combination of structural reinforcement 110 with disconnect receptacle block 107 effectively forms a structurally reinforced aperture (hole) 118 in the skin 185 of aircraft fuselage 180 through which the payload equipment harness connectors 113 can pass and be connected to the mating payload harness connectors 111. As shown for the embodiment of FIG. 5A, alignment features in the form of one or more alignment/retention pins 109 may be provided to extend from disconnect receptacle block 107 to align and mate with corresponding alignment/retention pin thru-holes 116 of FIG. 7B defined through mating flanges 123 and mating collars 125 of FIG. 7B of disconnect plug block 108 so as to align the disconnect plug block 108 to the disconnect receptacle block 107 during installation. Optional retention provisions such as threaded ends defined on the terminal ends of alignment/retention pins 109 (e.g., with common aircraft hardware) may be used to retain the disconnect plug block 108 in assembled form with the disconnect receptacle block 107 of FIG. 5A. It will be understood that the particular illustrated alignment features of FIG. 5A are optional and exemplary, i.e., no alignment features may be provided or alignment features of different configuration may be provided.

In the alternate embodiment of FIG. 5B, no alignment features 109 are provided. Rather, in the embodiment of FIG. 5B, disconnect receptacle block 107 and disconnect plug block 108 are configured (e.g., designed and machined) to self-align as shown. In such an alternate embodiment, retention hardware provisions 199 such as threaded ends and nutplates (e.g., with common aircraft hardware) may be used to retain the disconnect plug block 108 in assembled form with the disconnect receptacle block 107.

FIGS. 6A-6B and 6C-6D illustrate respective overhead and side views of a receptacle block 107 with associated structural doubler reinforcement 110 of the corresponding different exemplary embodiments of RPS quick disconnect panel 100 of respective FIGS. 5A and 5B as each may be installed on an aircraft 150. In each case, receptacle block 107 may be constructed of any one or more pieces of material/s that are sufficiently lightweight and strong to fit the needs of a given RPS installation, e.g., such as block aluminum, carbon fiber composite, etc. Similarly, one or both of structural reinforcement features 110 may be constructed of materials such as sheet aluminum, carbon fiber composite sheet, etc. suitable for providing structural reinforcement to fuselage skin 185. In one exemplary embodiment, upper (interior) structural reinforcement feature 110 may be an integrally formed component of receptacle block 107 while lower (exterior) structural reinforcement 110 may be a separate discrete component. Each of receptacle block 107 and structural reinforcement feature/s 110 may have an opening 190 defined therein that is complementary shape and size to the fuselage skin penetration of aperture 118. In this regard, an exemplary shape and size of fuselage skin penetration and resulting aperture 118 is shown in the top down view of FIG. 6A, it being understood that any other suitable shape and/or relative size of fuselage skin penetration of aperture 118 may be employed to fit the characteristics or needs of a given RPS installation. In the exemplary embodiment of FIGS. 6A and 6B, a recessed opening 190 may be defined as shown through the bottom surface of receptacle block 107 to form a receptacle recess for receiving disconnect receptacle plug 108.

Also illustrated in both embodiments of FIGS. 6A-6B and 6C-6D is an optional pressurization seal 115 (e.g., synthetic rubber, etc.) that may be, for example, installed in a machined boss in peripheral floor surface (e.g., inward extending peripheral shelf) 138 of disconnect receptacle block 107 that surrounds the recessed opening 190 that is configured to be aligned with aperture 118 during RPS installation. Such a pressurization seal 115 may be optionally provided to form an airtight seal with a complementary mating machined surface in the disconnect plug block 108 for RPS installations on pressurized aircraft. In non-pressurized applications, such as RPS installations on drone aircraft, no such pressurization seal may be provided.

Figure 7A:
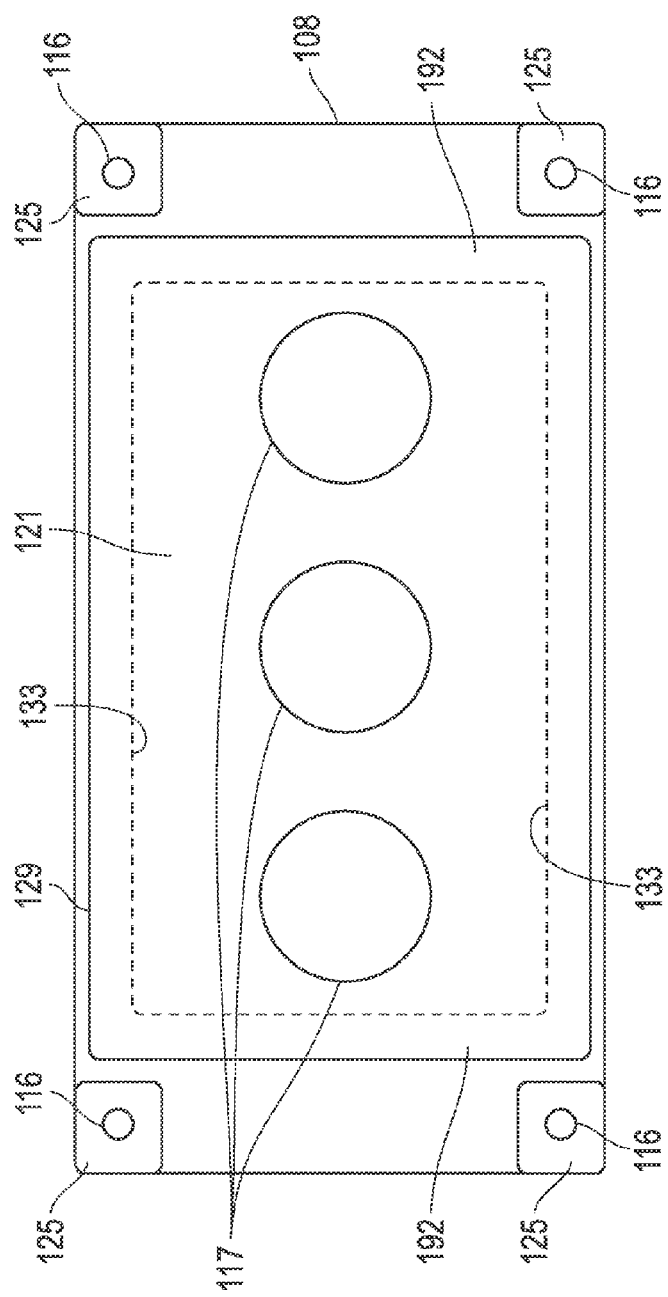
FIG. 7A illustrates a simplified underside view of a plug block portion of a RPS quick disconnect panel according to one exemplary embodiment of the disclosed systems and methods.
Figure 7B:
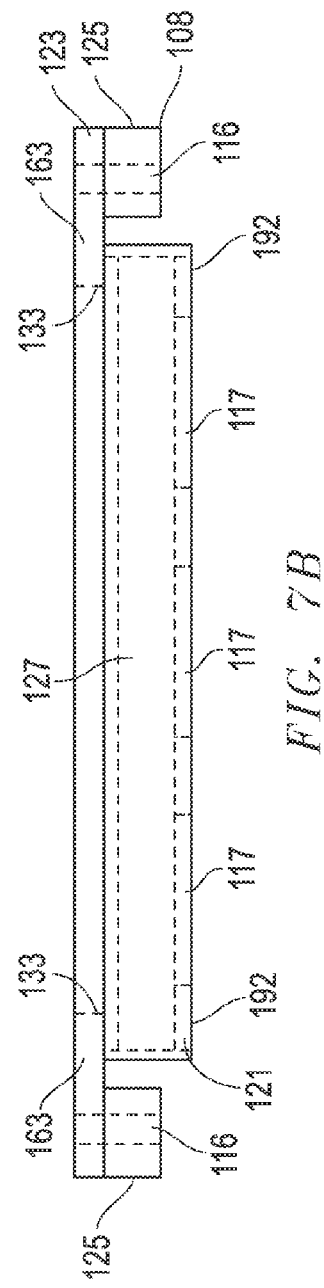
FIG. 7B illustrates a simplified side view of the plug block portion of FIG. 7A according to one exemplary embodiment of the disclosed systems and methods.

FIGS. 7A-7B and 7C-7D illustrate respective underside and side views of a disconnect plug block 108 of respective different exemplary embodiments of RPS quick disconnect panel 100 of the corresponding respective embodiments of FIGS. 5A and 5B as each may be installed on an aircraft 150. In each case, plug block 108 may be constructed of any one or more pieces of material/s that are sufficiently lightweight and strong to fit the needs of a given RPS installation, e.g., such as block aluminum, carbon fiber composite, etc. In one exemplary embodiment, a disconnect plug block 108 may be machined from a single monolithic piece of aluminum. As previously described, alignment/retention pin thru-holes 116 of FIGS. 7A-7B are dimensioned and configured to accept the corresponding alignment/retention pins 109 located extending upward from the disconnect receptacle block 107, while retention hardware thru-holes 116 of FIGS. 7C-7D are dimensioned and configured to accept the corresponding retention hardware 109 when connecting plug block 108 onto disconnect receptacle block 107. In each case, a peripheral mating machined surface 192 may be provided as shown on the underside of disconnect plug block 108 for mating and forming an airtight seal with pressurization seal 115 provided on peripheral floor/bottom surface 138 of disconnect receptacle block 107 for RPS installations on pressurized aircraft.

In the embodiment of FIGS. 7A-7B, an exemplary pattern of three connector thru-holes 117 are shown defined in plate 121 (e.g., an integral plate) of disconnect plug block 108 through which three corresponding cabin equipment harness connector/s 111 may be mounted and installed, e.g., via threaded connectors or other types of connectors that may be provided on the upper (cabin) side of plate 121. In this regard, disconnect plug block 108 may be designed to accept a variety of cabin equipment harness connector/s 111 quantities and types, e.g., by providing different types of connectors on the upper side of plate 121 or by utilizing mating environmental connectors having flanges that form a seal around plate 121. In the exemplary embodiment of FIGS. 7A and 7B, an outer peripheral dimension of a block portion 129 of disconnect plug block 108 may be dimensioned to be received within recessed opening 190 of disconnect receptacle block 107 such that peripheral mating edge surface 192 of bottom plate 121 of disconnect plug block 108 mates with peripheral floor surface 138 of disconnect receptacle block 107 to form an airtight seal using pressurization seal 115. A recessed interior cavity 127 may be provided within block portion 108 to extend between an opening 133 defined in upper plate of disconnect plug block 108 and connector thru-holes 117 defined in bottom plate 121 of disconnect plug block 108. Cabin equipment harness connector/s 111 may be inserted through opening 133 in a top plate 163 of disconnect plug block 108 from cabin side of disconnect plug block 108 so as to be received and positioned within recessed interior 127 for connection to corresponding connector/s on top surface of bottom plate 121 of disconnect plug block 108.

In the alternate embodiment of FIGS. 7C-7D, an exemplary pattern of two connector thru-holes 117 are shown defined in surface area of plate 121 (e.g., integral plate) of disconnect plug block 108 through which two corresponding cabin equipment harness connector/s 111 may be mounted and installed, e.g., via threaded connectors or other types of connectors that may be provided on the upper (cabin) side of surface area 121. In this regard, disconnect plug block 108 may be designed to accept a variety of cabin equipment harness connector/s 111 quantities and types, e.g., by providing different types of connectors on the upper side of surface area 121 or by utilizing mating environmental connectors having flanges that form a seal around surface area of plate 121. In the exemplary embodiment of FIGS. 7C and 7D, an outer peripheral dimension of a block portion 192 of disconnect plug block 108 may be dimensioned to be received within recessed opening 190 (see FIGS. 6A-6B) of disconnect receptacle block 107 such that peripheral mating edge surface 192 of bottom surface area 121 of disconnect plug block 108 mates with peripheral floor surface 138 of disconnect receptacle block 107.

It will be understood that either of the embodiment of FIGS. 5A/6A/6B and the embodiment of FIGS. 5B/6C/6D may be employed. In each embodiment disconnect receptacle block 107 may be employed to provide a basis for a structural penetration in the fuselage skin. In the embodiment of 5B, 6C and 6D, the exterior side harnesses 114 and connectors 113 are brought up into a deeper cavity interior to the aircraft 150 compared to the embodiment of FIGS. 5A, 6A and 6B, which provides more clearance for connectors 113 and harnesses 114 from payloads 105 and mounting adapters 154 in order to reduce overall vertical dimension stack-up of components mounted on the exterior of the aircraft 150. In either case a disconnect plug block 108 may be employed that may be quickly swapped with another disconnect plug block 108 having a different design definition with different interior harnesses 112 and connectors 111.

With regard to each of the embodiments of FIGS. 7A-7B and 7C-7D, it will be understood that the particular size, number and pattern of connector thru holes 117 is exemplary only and that any size and/or pattern of one or more connector thru holes 117 may be defined within bottom plate 121. Thus, different disconnect plug blocks 108 (having different numbers, configuration and/or types of connector thru holes) may be interchanged as needed or desired to fit the characteristics of a current payload type and/or combination for each mission. Additionally, in one embodiment bottom plate 121 or surface area 191 of a disconnect plug block 108 installed in a mating disconnect receptacle block 107 may be blank (with no thru holes 117 provided in plate 121 or surface area 191), while at the same time allowing for future installation of a disconnect plug block 108 having one or more thru-holes 117 (or modification of the existing blank plug block 108 to have thru-hole/s 117) when needed for a payload mission. Moreover, it will be understood that the particular illustrated embodiment of RPS quick disconnect panel 100 is exemplary only, and that other types and configurations of disconnect panels may be employed (including one piece panels that are installed through the fuselage skin 185) together with one or more of the RPS features described herein.

Figure 8A:
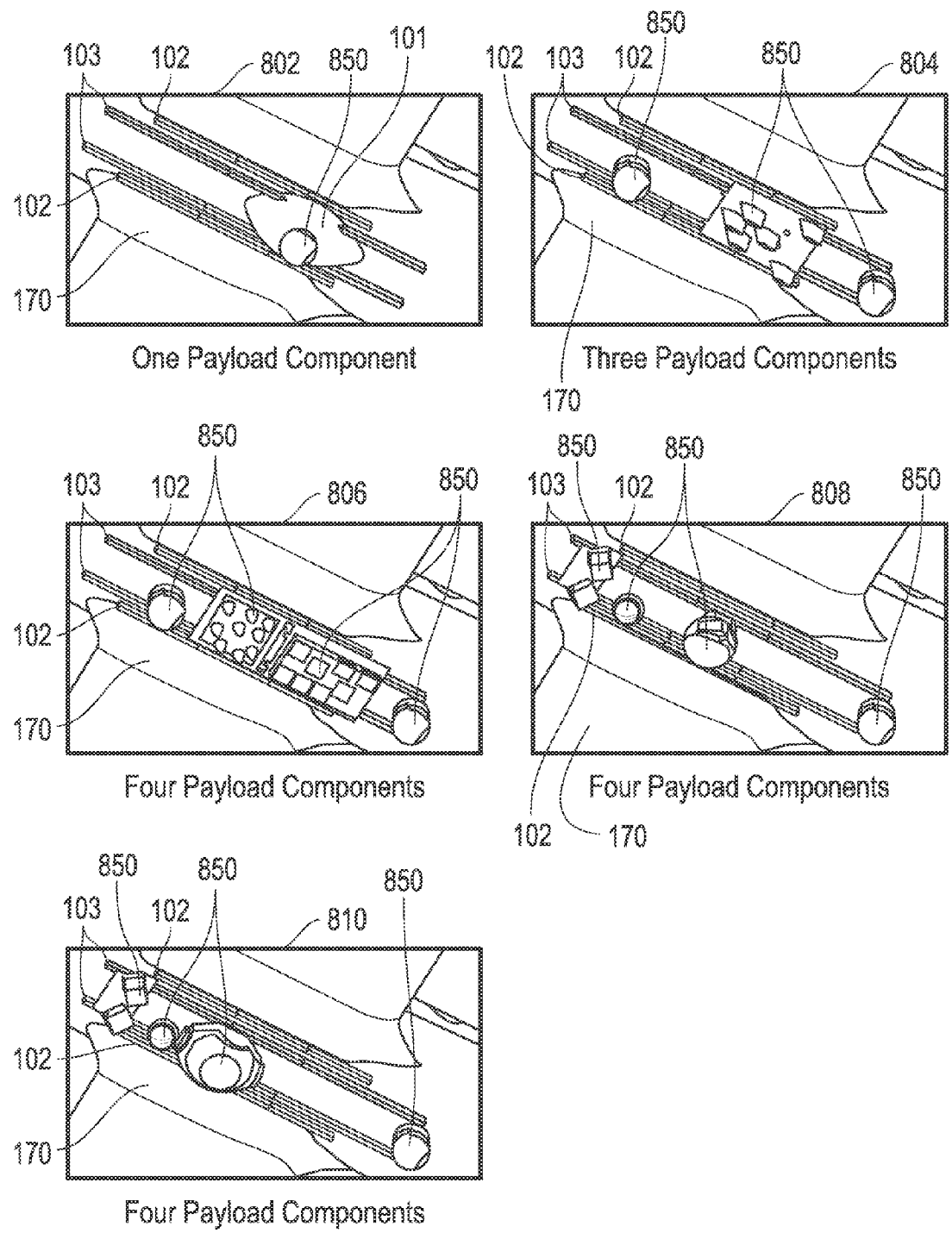
FIG. 8A illustrates a simplified partial underside view of a RPS-equipped aircraft and different example payloads according to one exemplary embodiment of the disclosed systems and methods.

FIG. 8A illustrates a simplified underside view of an exemplary embodiment of a given RPS-equipped aircraft 150 of FIGS. 1A, 2A and 4A having different payload combinations that each include different number and types of payload components 850 as they may be installed and interchanged (swapped) on the same set of inner payload rails 103 using the provisions of the RPS installed on the same aircraft 150, and while at the same time each payload combination remains within the same acceptable RPS load envelope for the given aircraft 150. As shown, payload combination 802 includes one payload component (e.g., sensor) 850 and payload combination 804 includes three payload components (e.g., sensors) 850. Each of payload combinations 806, 808 and 810 includes four payload components (e.g., sensors) 850, but each different combination includes different types of payload components 850 that are mounted in different longitudinal locations along payload rails 103. It will be understood that these and other payload combinations may be advantageously interchanged between each other using the RPS according to the needs of each different mission for the same aircraft 150. For purpose of visibility, no aerodynamic fairings are shown installed on fairing rails 102 in any of the payload combinations of FIG. 8A except 802. However, it will be understood that a variety of different fairings 101 may be installed with any one or more of the illustrated payload combinations of FIG. 8A.

Figure 8B:
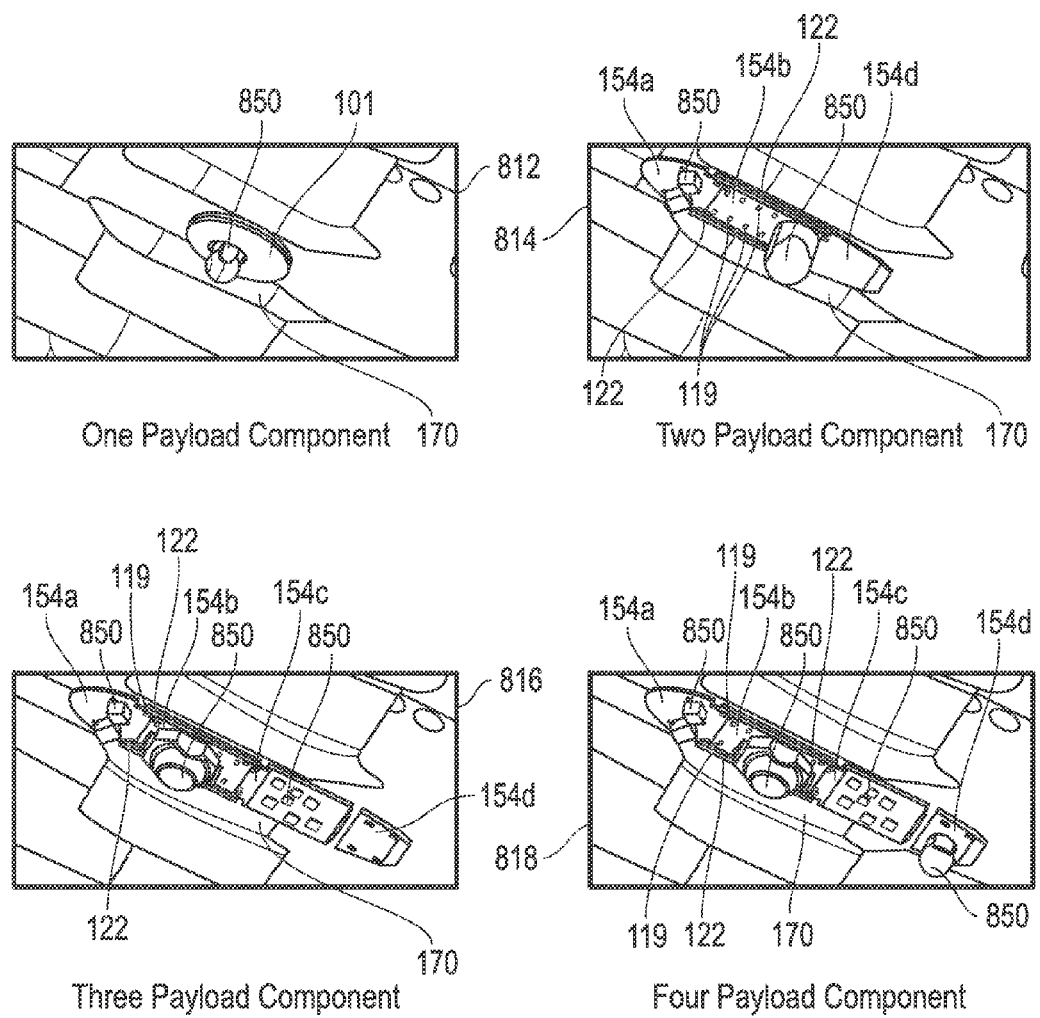
FIG. 8B illustrates a simplified partial underside view of a RPS-equipped aircraft and different example payloads according to one exemplary embodiment of the disclosed systems and methods.

FIG. 8B illustrates a simplified underside view of an exemplary embodiment of a given RPS-equipped aircraft 150 of FIGS. 1B-1C2, 2B and 4B-4C having different swappable payload combinations that each include different number and types of payload components 850 as they may be installed and interchanged (swapped) on the same set of payload rails 122 and/or hardpoints 119 using the standardized fastener locations and rail and/or hardpoint spacing provisions such as illustrated and described in relation to FIGS. 1C1 and 1C2 (e.g., as may be set by ICD) of the RPS installed on the same aircraft 150, and while at the same time each payload combination remains within the same acceptable RPS load envelope for the given aircraft 150. As shown, payload combination 812 includes one payload component (e.g., sensor) 850. Payload combination 814 includes two payload components (e.g., sensors) 850. Payload combination 816 includes three payload components (e.g., sensors) 850. Payload combination 818 includes four payload components (e.g., sensors) 850. As shown, each different payload combination may include different number and/or types of payload components 850 that are mounted in different (e.g., and selectable) longitudinal locations along payload rails 122 and/or hardpoints 119.

For example, payload combination 814 of FIG. 8B includes a payload 850 that is selectably mounted by standardized payload rails 122 and/or payload hardpoints 119 in a rightmost position on mounting adapter 154*b*, and that may be interchanged with a different (center) payload 850 that is shown selectably mounted by standardized payload rails 122 and/or payload hardpoints 119 in a different (leftmost) longitudinal location on the same mounting adapter 154*b* in the payload combination 816 of FIG. 8B. In payload combination 818 of FIG. 8B, the same payload 850 of payload combination 816 has been moved and selectably mounted by standardized payload rails 122 and/or payload hardpoints 119 in a new (centermost) location on the same mounting adapter 154b. Thus, the same or a different payload 850 (or 105) may be selectably mounted (and relocated and remounted) as needed or desired in different locations on the same given mounting adapter 154 using standardized payload fastener locations 451 and/or 453 that are mated with corresponding respective standardized rail fastener locations 183 and/or hardpoint fastener locations 187 of the respective payload rails 122 and/or payload hardpoints 119 of the given mounting adapter 154.

With regard to FIG. 8B, it will be understood that these and other payload combinations may be advantageously interchanged between each other using the RPS according to the needs of each different mission for the same aircraft 150. For purpose of visibility, no aerodynamic fairings are shown installed on mounting adapter 154 in the payload combinations 814, 816, and 818 of FIG. 8B. An aerodynamic fairing 101 is shown installed on mounting adapter 154 (not visible) in the payload combinations 812 of FIG. 8B. It will be understood that a variety of different fairings 101 may be installed with any one or more of the illustrated payload combinations of FIG. 8B.

Figure 9:
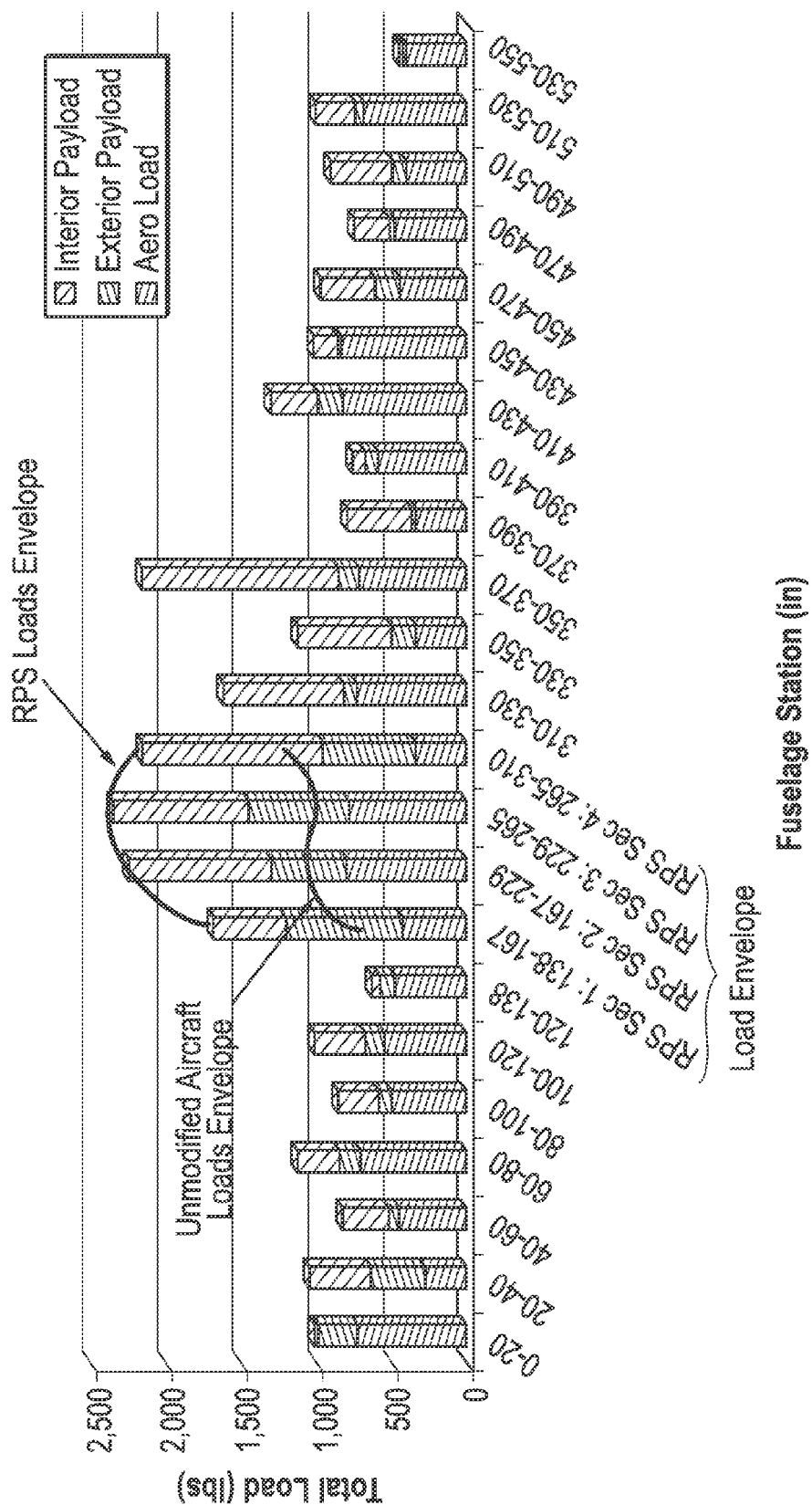
FIG. 9 illustrates aircraft loads by fuselage section according to one exemplary embodiment of the disclosed systems and methods.

FIG. 9 illustrates aircraft loads by fuselage section according to one exemplary embodiment of the disclosed systems and methods. In particular, FIG. 9 shows an exemplary summation of hypothetical fuselage loads by fuselage station along the longitudinal axis 160 of an aircraft 150. In the case of the embodiment of FIGS. 1A, 2A and 4A, the loads shown are the applied limit aerodynamic loads which are resulting from fairings 101 coupled to outer fairing rails 102, interior 1G inertial payloads, and exterior 1G inertial payloads which are resulting from fairings 101 coupled to outer fairing rails 102 and from swappable payload 105 and payload adapter 104 coupled to payload rails 103. Exterior inertial payloads in the case of embodiment of FIGS. 1A, 2A and 4A also include fasteners, harnesses, connectors, etc. associated with the exterior components of fairings, payloads, and payload adapters. In the case of the embodiment of FIGS. 1B-1C1, 2B and 4B-4C, the loads shown in FIG. 9 are the applied limit aerodynamic loads which are resulting from fairings 101, 1G interior inertial payloads, and 1G exterior inertial payloads which are resulting from fairings 101, swappable payload 105, and payload adapter 104 (if required) coupled to mounting adapter 154 and fuselage fittings 152. Exterior inertial payloads in the case of embodiment of FIGS. 1B-1C1, 2B and 4B-4C also include fasteners, harnesses, connectors, etc. associated with the exterior components of fairings 101, payloads 105, and payload adapters 104, mounting adapter(s) 154, and fuselage fittings 152.

The summation of the loads by fuselage station as shown in FIG. 9 represent the total allowable loads for a given fuselage station which establishes an RPS envelope limit for the RPS modified aircraft 150 and for a given fuselage station. It will be understood that the summation of the three components of loads provided in FIG. 9 for a given fuselage represents the limit loads at that fuselage station which are used in the design flow described in FIG. 11A to establish RPS envelope loads. Note that FIG. 9 also notes exemplary breakdown of RPS sections (shown as RPS Sections 1-4 in FIG. 9) as they positionally relate to fuselage station. The loads are used as input to the stress analysis models and determine the local modification required to the existing aircraft structure such as floors, intercostals, and frames for example.

In one respect, FIG. 9 illustrates an available operational envelope (RPS Loads Envelope curve) of total permissible aircraft loads by cabin or fuselage section locations for a RPS installation configured according to one exemplary embodiment of the disclosed systems and methods. Although illustrated in this embodiment distributed on a sectionalized fuselage station basis from forward to aft of an aircraft 150, it will be understood that a loads envelope may alternatively be defined or otherwise characterized as a continuous (e.g., X-Y) function of aircraft position between forward and aft location of a given aircraft 150. In the illustrated embodiment, the uppermost value of each separate vertical bar represents the total permissible load for a given fuselage station. Within each fuselage station, total load may be distributed between interior fuselage payload, exterior payload (e.g., payload components 850), and aerodynamic load under flight conditions. This distribution may vary according to changing internal payload components, external payload components and/or external fairing components, such that the total load (height) of the vertical bars of FIG. 9 (which represents the summation of the three internal and external loads components) does not exceed the RPS Loads Envelope (e.g., as a user interchanges or swaps out various internal and/or external components to cause the relative distribution between interior fuselage payload, exterior payload, and aerodynamic load to change). A given RPS loads envelope such as illustrated in FIG. 9 may be defined by characteristics of a RPS as it may be configured and installed on a given aircraft 150, for example, using the RPS configuration methodology of FIG. 11A based on a survey of possible different desired payload components 850.

Figure 11:
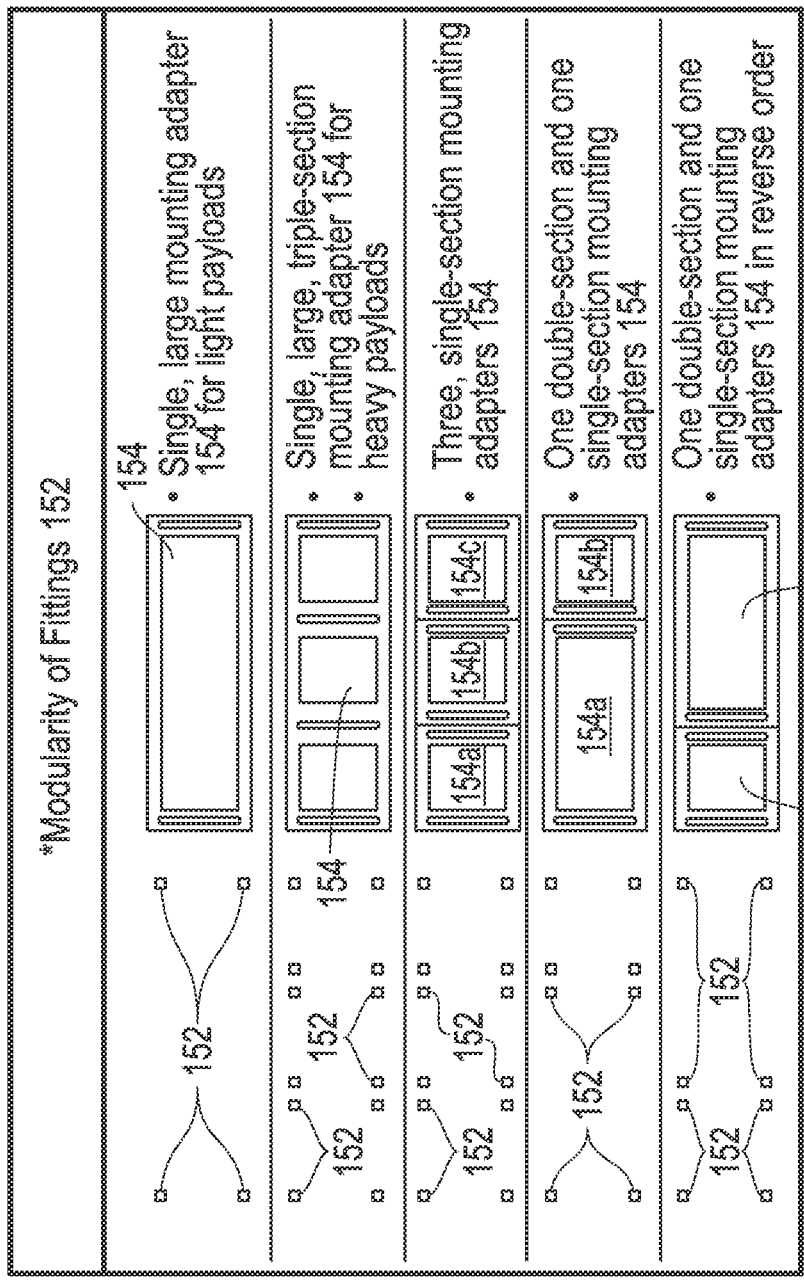
FIG. 11A illustrates design methodology flow according to one exemplary embodiment of the disclosed systems and methods.
FIG. 11B illustrates an example survey of different external payload configurations including fairings and external payloads according to one exemplary embodiment of the disclosed systems and methods.
FIG. 11C illustrates an example survey of different internal payload configurations according to one exemplary embodiment of the disclosed systems and methods.
FIG. 11D illustrates a simplified overhead view of an example RPS internal payload configuration for undefined roll-on and roll-off (RORO) equipment according to one exemplary embodiment of the disclosed systems and methods.
FIG. 11E illustrates a simplified perspective view of external RPS structural modifications according to one exemplary embodiment of the disclosed systems and methods.
FIG. 11F illustrates a simplified perspective view of internal RPS structural modifications according to one exemplary embodiment of the disclosed systems and methods.
FIG. 11G illustrates a RPS Interface Control Document (ICD) Weight/Balance Payload Configuration according to one exemplary embodiment of the disclosed systems and methods.

Once a particular RPS configuration is installed in place on an aircraft 150 (e.g., including payload rails 103 and fairing rails 102, or including fuselage fittings 152 and mounting adapter 154 with its payload rail/s 122 and/or hardpoints 119, etc.), its corresponding RPS loads envelope may be employed by an aircraft operator to assess different particular mission internal payload components, external payload components 850 and fairing components 101 (and/or combinations of such components together with mounting provisions for same), to ensure they are in compliance with the permissible loads envelope prior to installing a particular different combination of components on the aircraft 150 for a given mission. In one exemplary embodiment, an RPS ICD may contain simplified data charts and plots with data based on the RPS loads envelope to aid the aircraft operator in determining compliance to the RPS loads envelope limits, for example as illustrated in FIG. 11G and further described elsewhere herein. This process may be repeated for each mission where different payload component/s are installed and employed, e.g., user selecting different desired configuration of payload component/s, fairing component/s, and mounting provisions for same (including fuselage station and/or other location). In one exemplary embodiment, an RPS configured according to the enveloped design methodology of FIG. 9 may be approved under an STC and installed on an aircraft 150, and then employed to allow multiple different payload components 850 and combinations thereof to be installed and/or interchanged on the RPS-equipped aircraft without requiring a new STC as long as the combining of interior payload, exterior payload, and aerodynamic load under flight conditions does not exceed the permissible total load for a given location (e.g., fuselage station) of the loads enveloped according to the particular RPS.

Figure 10:
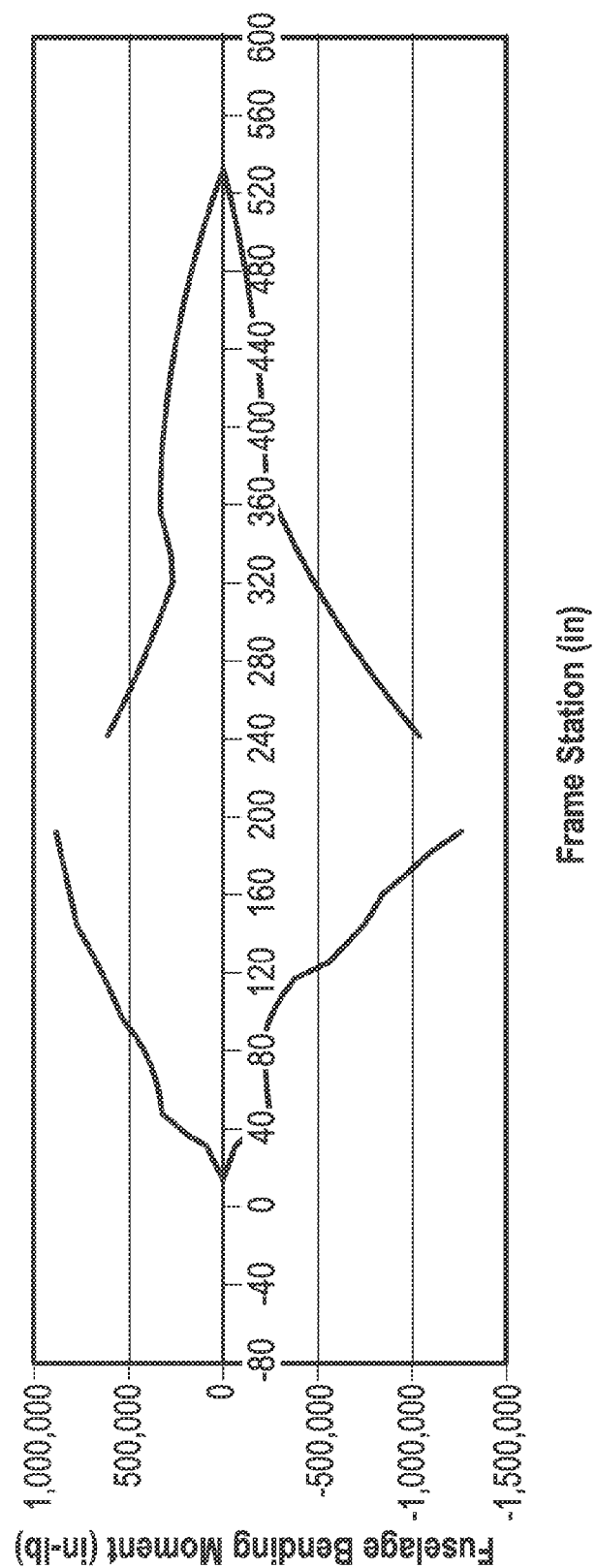
FIG. 10 illustrates moment envelope of aircraft from loads of the exemplary embodiment of FIG. 9.

FIG. 10 illustrates the hypothetical fuselage bending moment envelope of aircraft 150 from loads of the exemplary embodiment of FIG. 9. In one embodiment, the summation of payload weights by fuselage station as shown in FIG. 9 when added to basic, unmodified aircraft weight of each fuselage station may be multiplied by the respective inertia limit load factor of each fuselage station and added to the aerodynamic load for a total applied fuselage load. This total load may then be used to determine the overall fuselage bending envelope for an aircraft 150 as shown by FIG. 10. The resulting overall fuselage bending moment envelope of FIG. 10 which is derived from the inertial and aerodynamic loads of FIG. 9 may be compared to a similar original equipment manufacturer (OEM) limit moment envelope to determine if the envelope of FIG. 10 is equal to or within the similar OEM limit moment envelope. If such is not the case, then Stress engineers may determine the types of structures and associated load capacity requirements which must be added to the fuselage structure to reinforce the fuselage structure capability to endure the additional loads. In one embodiment, this analysis may be used to determine the modification required to the aircraft structure such as strengthened frames (e.g., doublers, caps, clips, etc.), intercostals, stringers and skin doublers. Data such as this may be generated for each point load solution, adjusted to account for future growth of the RPS, and combined to determine the envelope of loads that will define the RPS operational limits.

Figure 11A:
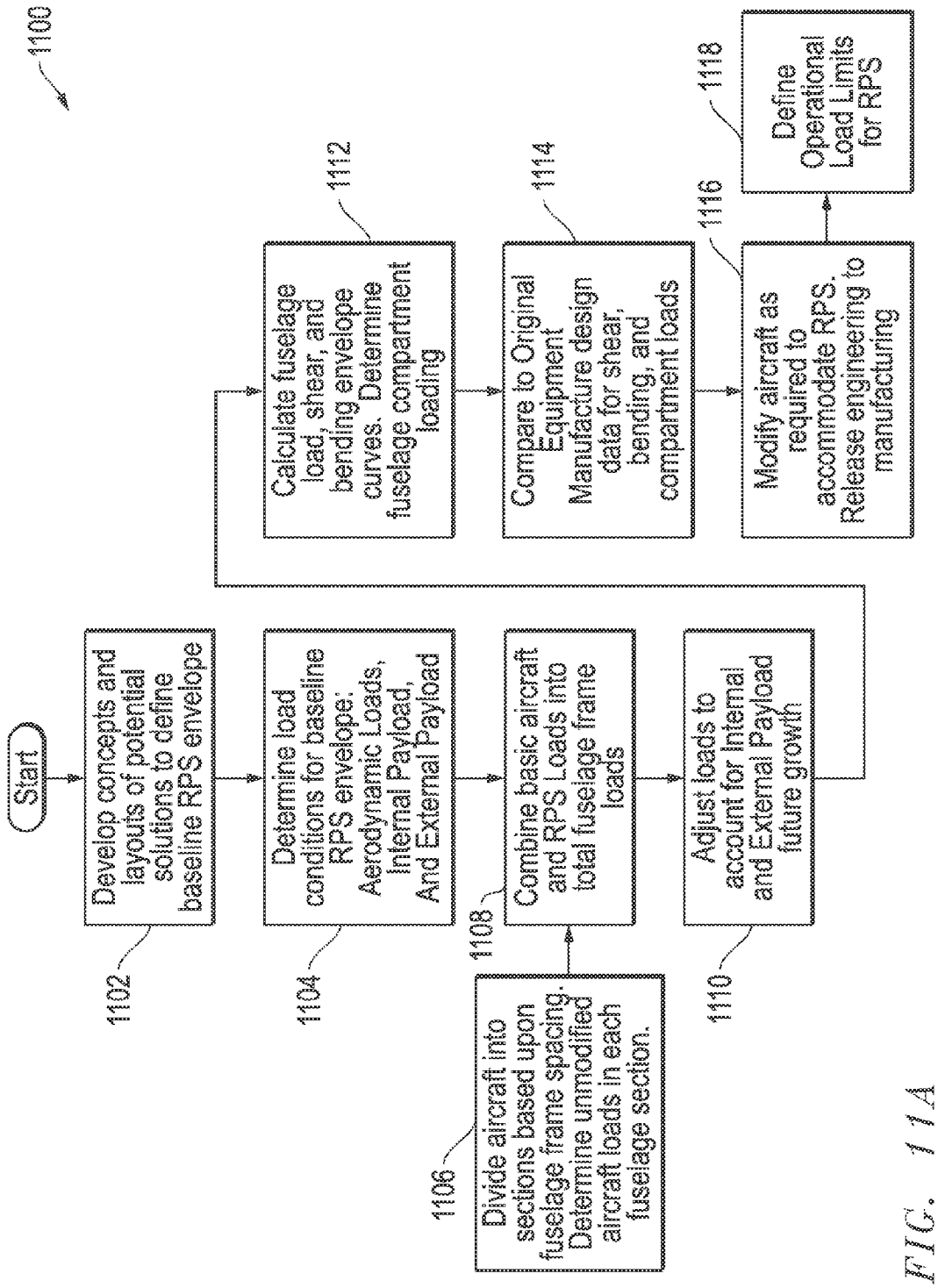

In this regard, design flow 1100 of FIG. 11A describes the general steps and sequences for establishing the baseline RPS loads envelope (e.g., such as the exemplary RPS loads envelope illustrated in FIG. 9) and resulting baseline aircraft modification design requirements. In step 1102, a survey (list) of payloads to include internal and external payloads that may be employed together for developing a RPS solution for a given aircraft 150 is completed. For example, FIG. 11B illustrates an example survey of six different external payload configurations 1150a-1150f with associated aerodynamic shapes (as defined by their corresponding outer mold line), and FIG. 11C illustrates an example survey of two different internal payload configurations 1160a and 1160b, it being understood the number of different external payload configurations 1150 surveyed may be more or less than six, and that the number of different internal payload configurations 1160 surveyed may be more than two.

Figure 11B:
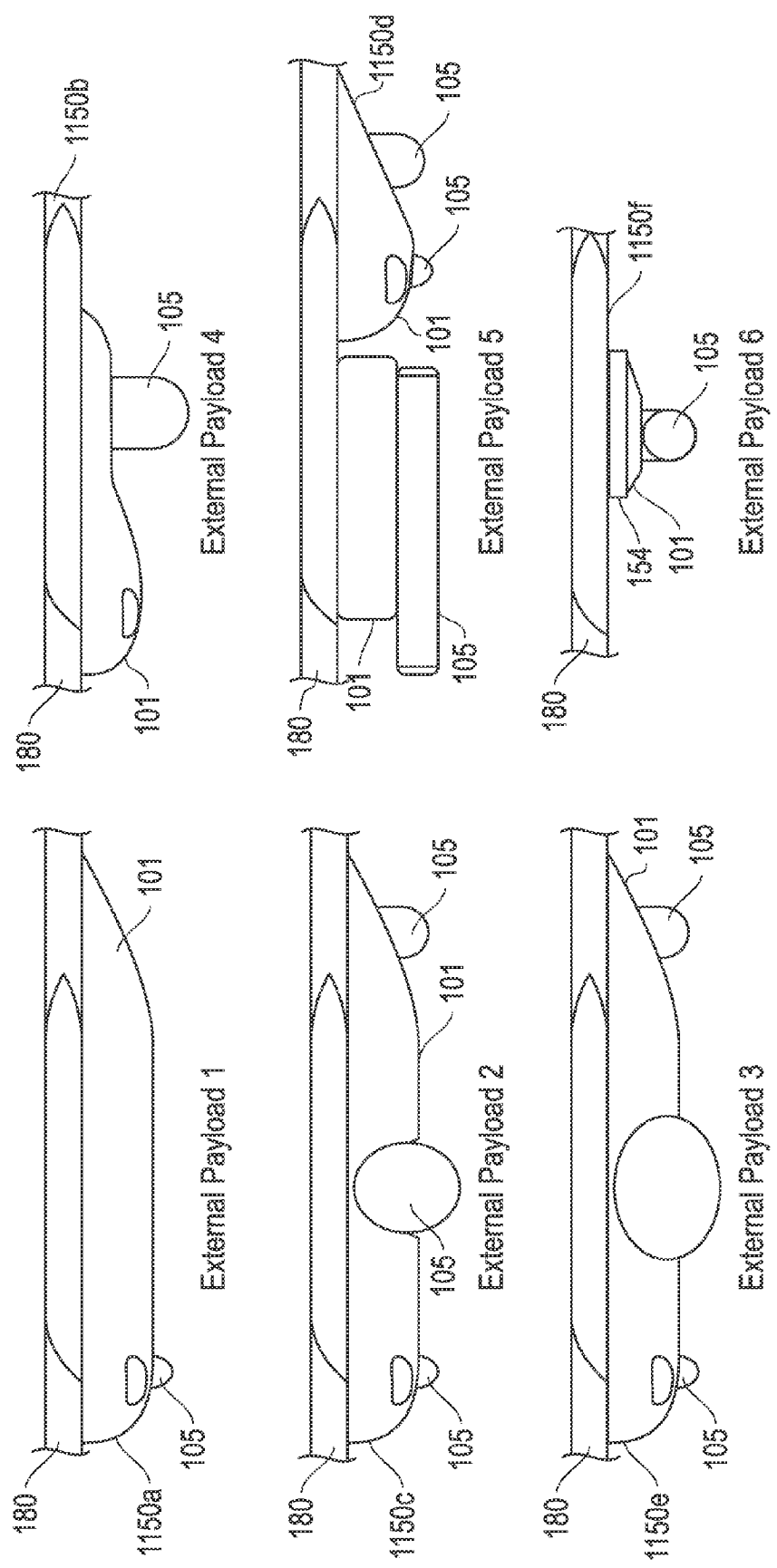

In FIG. 11B, the external payloads for each configuration 1150 are those associated with the particular combination of fairing 101, payload adapter 104, and/or swappable payload/s 105 as they may be present in that configuration. In this regard, the survey of payloads includes those payloads of interest that it is desired that the RPS accommodate in design and operation. In one exemplary embodiment, the external payloads may be those associated with the fairing 101, payload adapter 104, and/or swappable payload/s 105 together with associated harnesses, outer fairing rail 102 and the inner payload rail 103 of the embodiment of FIGS. 1A, 2A and 4A. In such an exemplary embodiment, payloads may in one embodiment be assigned notional installation locations on the outer fairing rail 102 and the inner payload rail 103 of the embodiment of FIGS. 1A, 2A and 4A. In another exemplary embodiment, the external payloads may be those associated with the fairing 101, payload adapter 104, and swappable payload/s 105 with associated harnesses, fittings 152, and mounting adapter section/s 154 of the embodiment of FIGS. 1B-1C1, 2B and 4B-4C. In such an exemplary embodiment, payloads may in one embodiment be assigned notional installation locations on payload rail/s 122 and/or hardpoints 119 of mounting adapter section/s 154 of the embodiment of FIGS. 1B-1C1, 2B and 4B-4C. In any case, the shapes of the outer mold line of each different external payload configuration 1150 of FIG. 11B is used to derive aerodynamic load during varying flight conditions for that given configuration 1150, e.g., using tools such as computer-based Computational Fluid Dynamics (CFD) executing on one or more processing devices of a computer work station or other suitable computing platform. Examples of such computer-based CFD include, but are not limited to, the Open Source Field Operation And Manipulation (OpenFOAM) CFD software package that has full Navier-Stokes capability, and that is available from the OpenFOAM Foundation.

Figure 11C:
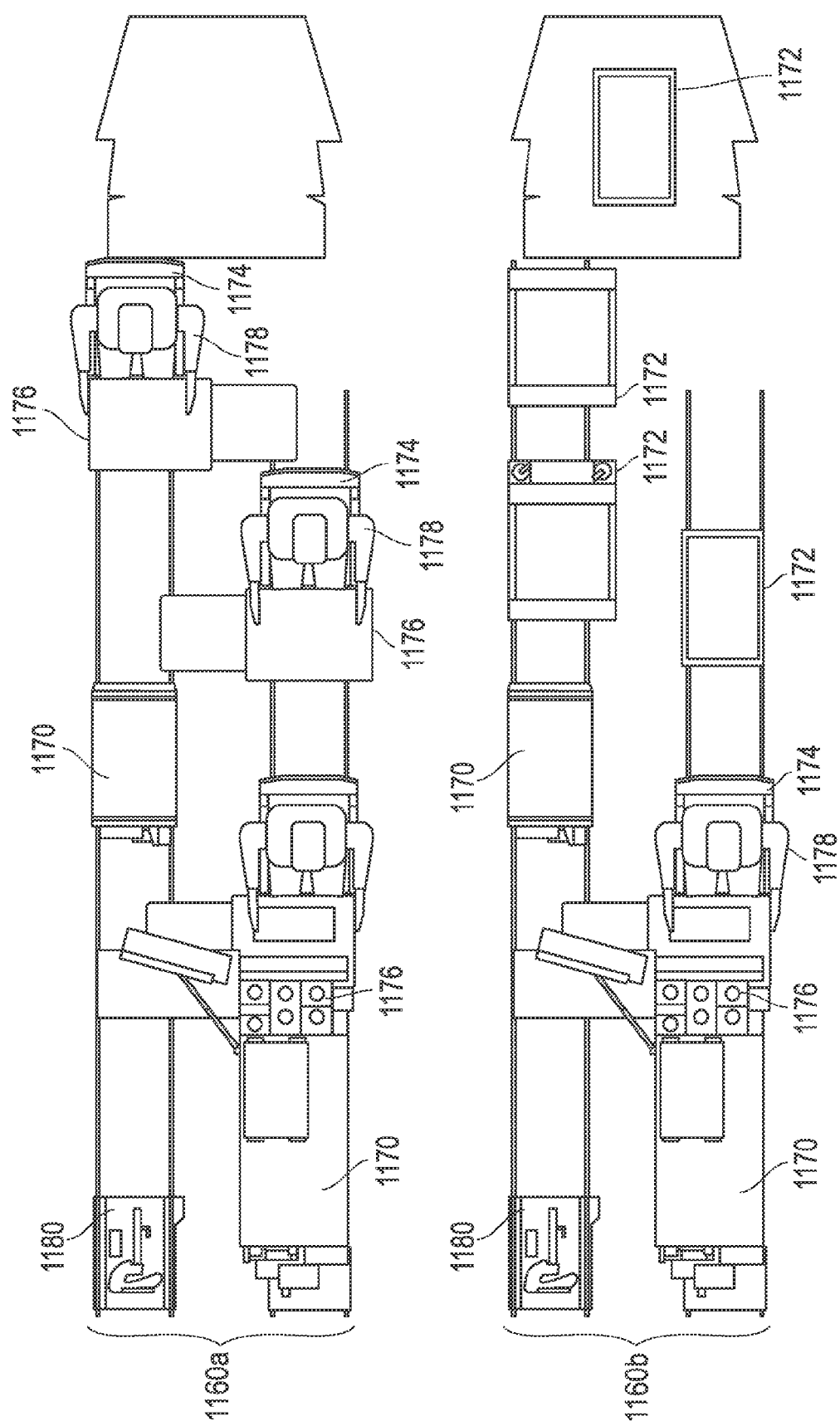
Figure 11D:
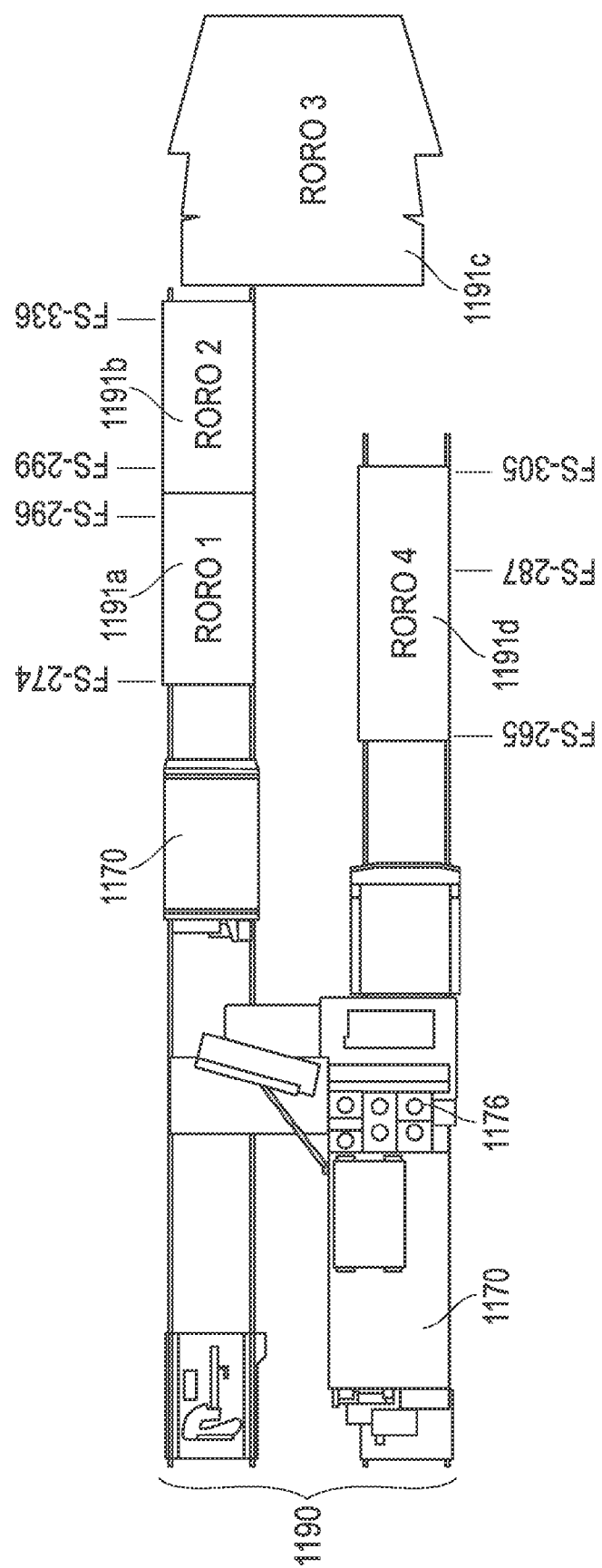

In step 1102, equipment and internal payload weight associated with swappable payloads 105 of FIG. 11B, but to be located interior to the fuselage 180, is also considered positionally such as shown in FIG. 11C. Examples of such equipment include, but are not limited to, internal fuselage payload components (e.g., such as mission equipment 1170 and associated wiring, rack structures 1172, seating 1174, workstations 1176, crew 1178, and generic cargo 1180) that are located positionally for each different configuration 1160a, 1160b, etc. (e.g., as needed or desired to meet customer requirements, operation workflow, and in consideration of aircraft Center-of-Gravity (CG) management and external payloads). In one exemplary embodiment, the interior fuselage payloads for an RPS configuration 1190 may be reserved for undefined equipment which may advantageously be rolled-on and rolled-off (RORO) as determined by mission requirements and on a mission-by-mission basis. In such a case, RORO areas 1191 shown in FIG. 11D may be defined by fuselage station and load limits. For example, 1191a could be designated in the ICD as RORO Area 1 with an associated payload weight limit of 200 lbs located between fuselage station FS-274 and FS-296. Items 1191b, 1191c and 1191d may be similarly designated with fuselage station locations and weight limits assigned in the ICD.

Step 1104 of FIG. 11A uses the results of step 1102 to determine load conditions for which the baseline RPS is expected to accommodate. In one embodiment, the results of step 1104 may be similar to that as shown in FIG. 9, except that the unmodified basic aircraft loads are not included in the data. Step 1106 determines the loads associated with the unmodified, basic aircraft. In this regard, the aerodynamic loads of step 1106 are usually much smaller compared to the aerodynamic loads of step 1104, the external inertial loads of step 1106 are usually very small compared to the external inertial loads of step 1104, and the internal inertial loads of step 1106 are often similar magnitude compared to the internal inertial loads of step 1104. As shown in FIG. 11A, the results of steps 1104 and 1106 are combined in step 1108. The result of step 1108 defines the overall loads associated with each fuselage station. The individual load components (aerodynamic, external payload inertial and internal payload inertial) may be summed by fuselage station to produce a result such as shown in FIG. 9.

Still referring to FIG. 11A, the results of step 1108 may be assessed by making iterative adjustments to the placement of payloads 105 in step 1110 (e.g., by using a processing device of a computer workstation (e.g., Apple based computer workstation or Windows (PC) based computer workstation) or other suitable computing device that is running iterative software and/or firmware to iteratively adjust and re-evaluate placement of payloads 105, and/or by design engineers that may make adjustments to the placement of payloads) until the results of 1110 are satisfactory.

For example, in one exemplary embodiment, results of step 1108 may be assessed by making iterative adjustments to the placement of payloads 105 in step 1110 until the payload placement results of step 1110 are found to meet coincidental requirements of desired internal and external payloads while at the same time remaining in compliance with structural and operational limits and requirements of the aircraft 150 given the ability to implement structural modifications for related sections of the aircraft in step 1116 to meet such limits and requirements. Such structural and operational limits/requirements include, for example, aircraft weight limits, aircraft center of gravity balance limits, basic aircraft compartmental loading design limits and fuel and crew payload requirements, as well as other requirements of a given application such as in consideration of human factors (e.g., clearances for egress, field of view, reach, etc.), in consideration of wire harness installations, maintenance access, etc. Future growth margin for the RSP loads envelope may be also be optionally considered in step 1110, e.g., by assessing the space, weight and weight distribution requirements of desired payload combinations against aircraft weight limits, aircraft center of gravity balance limits, and compartmental loading design limits to determine what excess margin of payload weight or space may exist that can be considered as payload growth margin.

In FIG. 11A, the design process continues to step 1112 where the 1G fuselage load cases (multiplied by flight condition factors for flight conditions e.g., gust flight loads, accelerated turning loads, etc.), shear, and bending moment envelope curves are calculated for the results of step 1110. The fuselage bending moment curve of FIG. 10 is an example result of step 1112. The curve of FIG. 10 is compared to a similar curve provided by the aircraft OEM in step 1114. The curve of FIG. 10 must be equal to or less than the similar aircraft OEM curve for there to be no additional fuselage 180 structural reinforcements required to sustain the loads of the RPS in combination with those of the basic aircraft. If the curve of FIG. 10 does not fall within the limits of the OEM curve in the comparison of step 1114, aircraft modifications may be developed using the analysis created by the design flow 1102 through steps 1114 to create aircraft modifications required to accommodate the RPS and the loads established RPS loads envelope in step 1116 (e.g., by using a processing device executing software and/or firmware logic to iteratively apply structural modifications to areas falling outside the OEM curve limits and/or by engineering team analysis of the analysis of steps 1102 to 1114 in view of the OEM curve limits). Although described herein in relation to OEM aircraft structural configuration, it will be understood that the methodology of FIG. 11 and other aspects of the disclosed systems and methods may be applied to any existing aircraft structural configuration (e.g., including existing non-OEM configurations) to provide a RPS with desired or needed RPS load envelope and payload carrying capabilities to the aircraft.

Figure 11E:
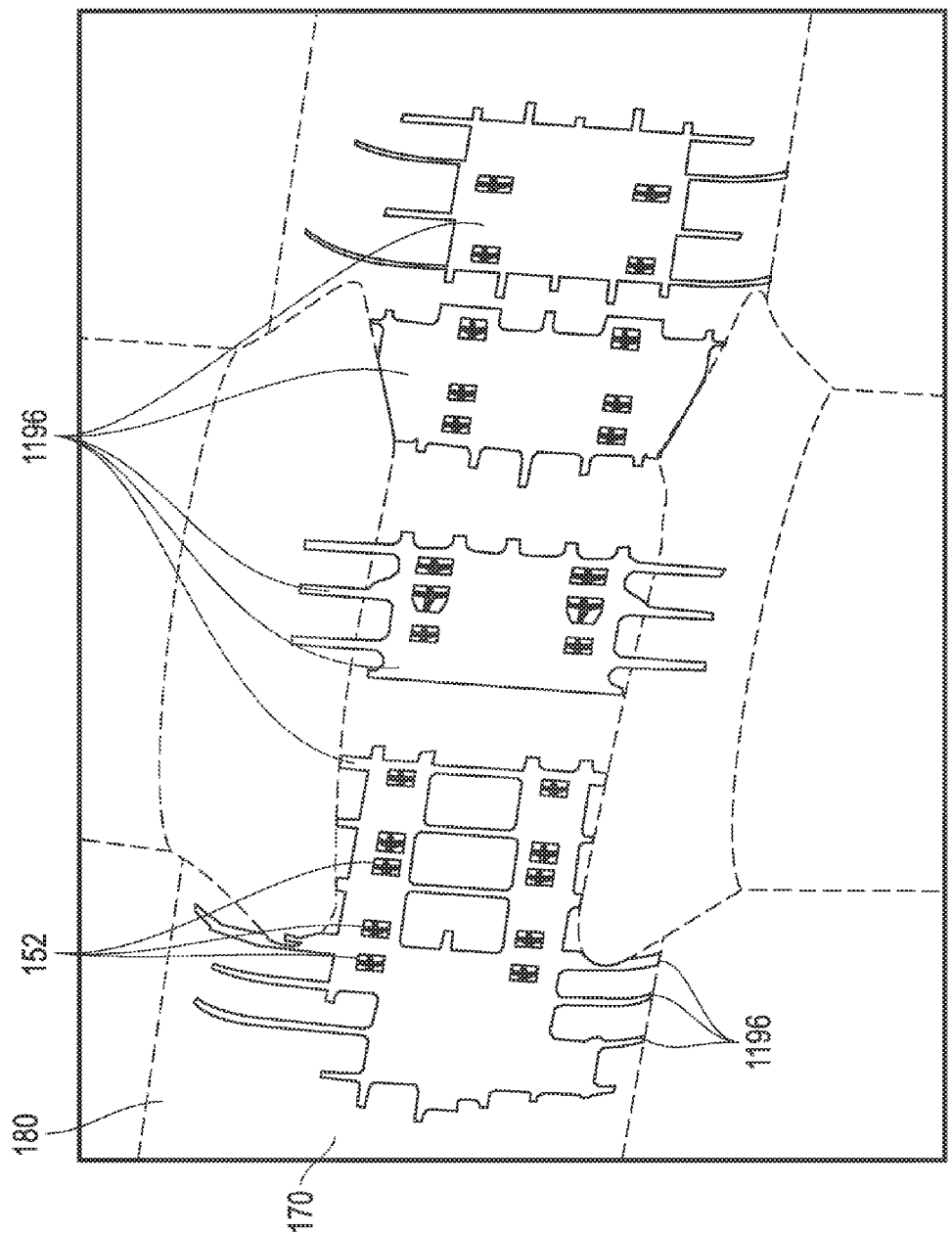
Figure 11H:
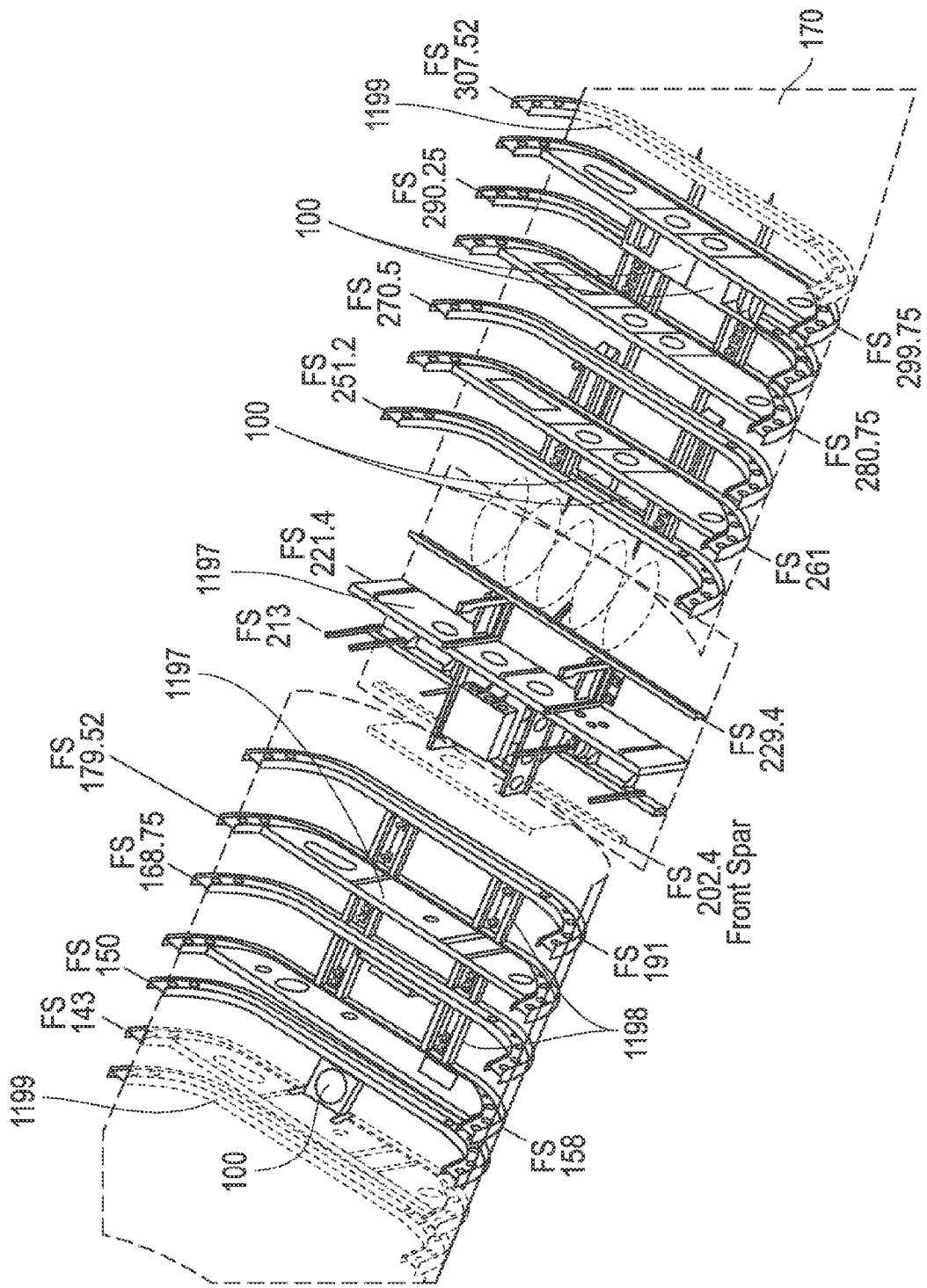
Figure 11G:
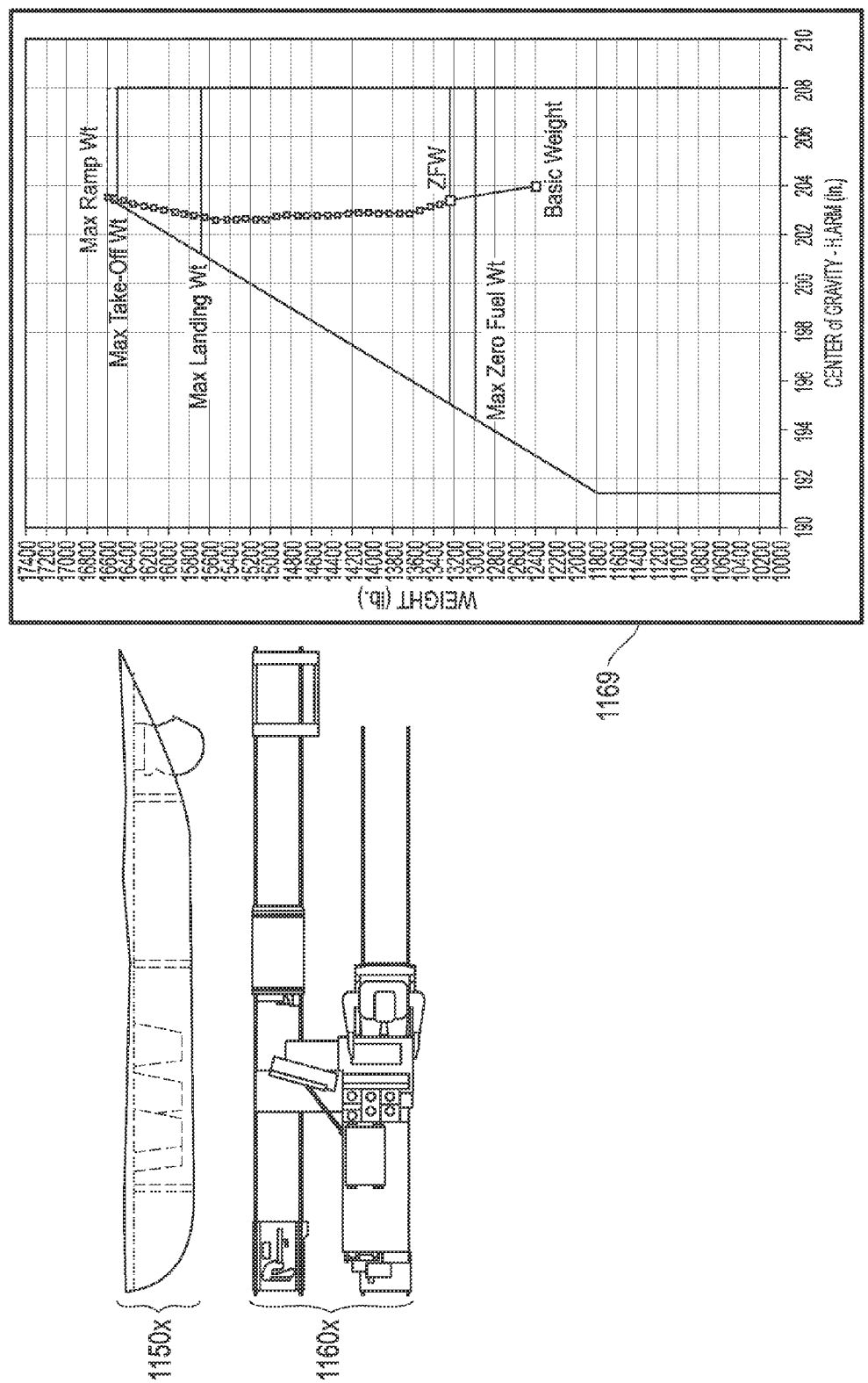

The aircraft modifications of step 1116 are structural in nature and may appear or be provided in one embodiment externally as external structural modifications 1196 made to the external OEM aircraft structure (e.g., added external structural modification components such as skin doublers, triplers, straps, etc.) such as shown in FIG. 11E, and/or internally as internal structural modifications made to the OEM aircraft internal structure, for example, in the form of added internal structural modification components such as strengthened frames 1197 (e.g., doublers, triplers, caps, etc.), intercostals 1198, clips, radius blocks, etc. (as shown in FIG. 11F together with unmodified OEM structural frame components 1199). In each of FIGS. 11E and 11F, unmodified existing structure of aircraft 150 is shown in dashed outline, with structural modifications of step 1116 shown in solid outline. Referring once again to FIG. 9, the difference in the RPS Loads Envelope and the Unmodified Aircraft Loads Envelope is the result of the interior and exterior structural modifications of FIGS. 11E and 11F. In this regard, the difference between the RPS Loads Envelope and the Unmodified Aircraft Loads Envelope curves of FIG. 9 represents the additional loads capacity added by the aircraft modifications of step 1116 to the basic, unmodified (e.g., OEM) aircraft. It will be understood that the methodology and structural modifications of FIGS. 11A-11F may be employed to design and implement a RPS using payload rails 103 of the embodiment of FIGS. 1A and 2A or using payload rails 122 and/or hardpoints 119 of the embodiment of FIGS. 1B, 1C1 and 2B. In this regard, although FIG. 11E illustrates one exemplary embodiment of structural modification made in combination with fuselage fittings 152, similar structural modifications 1196 may be made to support fairing rails 102 and/or payload rails 103 together with corresponding fasteners for attaching rails 102/103 to fuselage 180.

Once the aircraft has been modified according to the methodology of FIGS. 11A-11F and the RPS system is installed, the operational RPS load limits may be determined and published for the aircraft operator, e.g., in one exemplary embodiment as an Interface Control Document (ICD) discussed previously. In such an embodiment, an end-user may refer to such an ICD as discussed previously for determining how to operate the aircraft (i.e., with the RPS installed) while at the same time staying within the designed load limits combination of the aircraft, the installed RPS, and the payload in a similar manner as the aircraft Pilot Operating Handbook is used to calculate Gross Weight and Center-of-Gravity during common aircraft operations. This is shown by FIG. 11G which illustrates a RPS ICD Payload Configuration corresponding to one exemplary selected combination of particular external payload configuration 1150$x$ and integral payload configuration 1160$x$ for a given installed RPS configuration on an aircraft 150. In such an example, the RPS ICD may provide a simplified Weight and Balance diagram which takes into consideration the RPS external and internal payload configuration, with multiple such Weight and Balance diagrams begin provided that correspond to each of multiple possible combinations of external and internal payload configurations, e.g., such as various different combinations of selected external payload configurations 1150 of FIG. 11B together with internal payload configurations 1160 of FIG. 11C.

Figure 12:
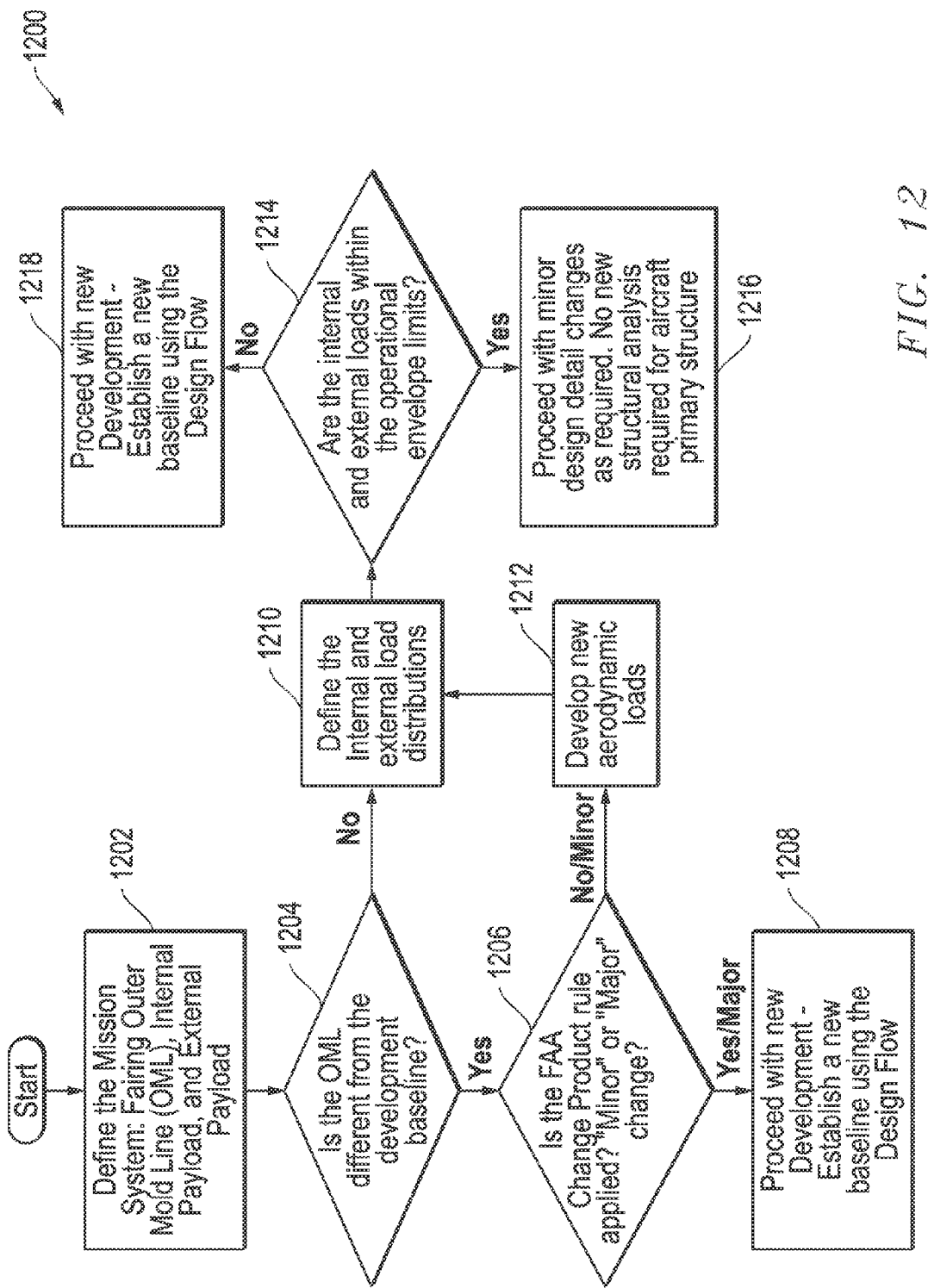
FIG. 12 illustrates operational methodology flow according to one exemplary embodiment of the disclosed systems and methods.

In one embodiment, the flow diagram 1200 of FIG. 12 is used to determine the RPS operational limits in consideration of the aircraft end-user, operator and/or RPS installer, including for evaluating proposed changes to outer mold line (OML) of fairing 101. The flow diagram 1200 of FIG. 12 is primarily used to evaluate custom RPS mission payload configurations (combinations of external and internal payload configurations) which have not been previously evaluated by a baseline RPS design process of the flow diagram 1100 of FIG. 11. In step 1202, the mission system configuration including a given fairing(s) 101, given internal payload/s, and given swappable payload/s 105 are defined as a configuration associated with a given aircraft mission capability requirement such as the complement of sensors to be operational during flight operations. The outer mold line (OML) associated with the given fairing 101 is considered and compared to the OML of the baseline RPS fairing 101. If the OML of the given fairing 101 is the same as that of the baseline RPS fairing 101, the flow diagram methodology proceeds to step 1210. If the OML of the given fairing 101 is not the same as that of the baseline RPS fairing 101, the flow diagram proceeds to step 1206. In step 1210, the given payload loads are located by RPS section and fuselage station. The results of step 1210 are compared to the established RPS loads envelope (from methodology 1100 of FIG. 11) in step 1214. If the given payload loads of step 1210 are determined to be within the established RPS loads envelope (RPS envelope such as illustrated in FIG. 9) in step 1214, the flow continues to step 1216. If any detail designs are required to operate the mission payloads such as a particular payload and/or electrical harness 114/112 are required or a particular payload adapter 104, such is manufactured, installed, and the aircraft is operational without requiring new structural analysis and modification for the aircraft primary structure.

If the loads of step 1210 are determined in step 1214 not to be within the established RPS loads envelope of step 1118 of FIG. 11A, the flow continues to step 1218 which requires a return to the design flow 1100 of FIG. 11A. It is the intent that the process of the exemplary design flow 1100 of FIG. 11A establishes a sufficient RPS loads envelope that the result of step 1214 which requires a return to the design flow 1100 is an unusual case. It is understood that the design flow 1100 must be completed at least once to establish an RPS loads envelope and supporting design for the RPS and modification to the primary aircraft structure as required. In the case that the OML of fairing 101 is determined to be different from the baseline OML fairing 101 in step 1204, the OML difference is considered in step 1206.

In order to make the RPS maximally usable in accommodating differing payloads 105 which may require differing fairings 101, it is allowed to consider the differences in the fairings 101 and assess the differences as either minor or major such as defined in the FAA Change Product rule. If the assessment of step 1206 is determined to be a minor change, the aerodynamic loads for the differing fairing 101 are determined in step 1212 if required. A slight change in the shape of the fairing 101 OML may have no significant bearing on aerodynamic loads and step 1212 is skipped. The operational flow continues with step 1210 as described elsewhere. A change in the shape of the fairing 101 OML which is considered to be minor may have significant differing aerodynamic loads in which case new aerodynamic loads associated with the fairing 101 are established in step 1212. The results of step 1212, if not skipped, are then considered in step 1210. If the change of the fairing 101 OML when compared to the baseline fairing 101 OML is determined to be categorized as major according to the FAA Change Product rule, the design flow 1100 of FIG. 11A is once again invoked in step 1208. It is the intent to establish a baseline fairing 101 OML which produces aerodynamic loads to encompass the anticipated of aerodynamic loads of fairings 101 associated with the baseline RPS payloads established in steps 1102 and 1104 of design flow 1100 in FIG. 11A such that the baseline RPS loads envelope provides maximum utility to the aircraft operator.

In one embodiment, steps of methodology 1200 of FIG. 12 may be used to assess new end-user requirements (including changes to the OML of fairing 101 and/or the loads associated with fairing 101) in a manner that considers internal and external loads in order to determine if the combinatorial loads fall within the established RPS loads envelope (e.g., such as established by methodology 1100 of FIG. 1I). If so, then much stress analysis and design work may be bypassed as noted in relation to step 1216. Thus, even when changes associated with an existing RPS-equipped aircraft are desired or required (e.g., such as associated with a change/s to the OML of fairing 101) the combination of methodology 1200 of FIG. 12 with an existing RPS installation configured as described herein may be advantageously implemented in a manner that eliminates or significantly reduces the required scope of engineering and design detail changes (if any are required), while at the same time doing so without impacting the established FAA STC(s) associated with an existing RPS installation. This capability may be further implemented in a manner that provides quick reaction capability to evolving needs of an operator end-user with minimized non-recurring engineering (NRE) required.

It will be understood that other payload acceptability considerations may apply in the practice of the disclosed systems and methods, e.g., such as overall external payload dimensions versus aircraft location (e.g., to avoid dragging equipment on rotation during takeoff or flaring during landing), total payload mass at given fuselage station (e.g., minimum internal fuselage weight contribution to the loads envelope may be fixed at a given station and thus limiting the maximum acceptable external payload and/or aerodynamic load contribution), etc.

It will be understood that other payload acceptability considerations may apply in the practice of the disclosed systems and methods, e.g., such as overall external payload dimensions versus aircraft location (e.g., to avoid dragging equipment on rotation during takeoff or flaring during landing), total payload mass at given fuselage station (e.g., minimum internal fuselage weight contribution to the loads envelope may be fixed at a given station and thus limiting the maximum acceptable external payload and/or aerodynamic load contribution), etc.

It will also be understood that one or more of the tasks, functions, or methodologies described herein (e.g., including those described and illustrated in relation to FIGS. 11A-11G and FIG. 12) may be implemented by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a processing device of such as CPU, controller, microcontroller, processor, microprocessor, FPGA, ASIC, PAL, PLA, CPLD, or other suitable processing device) to perform one or more steps of the methodologies disclosed herein. A computer program of instructions may be stored in or on the non-transitory computer-readable medium residing on or accessible by one or more processing devices for instructing a given system to execute the computer program of instructions. The computer program of instructions may include an ordered listing of executable instructions for implementing logical functions in the device. The executable instructions may comprise a plurality of code segments operable to instruct the system to perform the methodology disclosed herein. It will also be understood that one or more steps of the present methodologies may be employed in one or more code segments of the computer program. For example, a code segment executed by the system may include one or more steps of the disclosed methodologies.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A reconfigurable payload system (RPS), comprising one or more external payload attachment features mechanically coupled to extend across a given section of a fuselage of an aircraft, the one or more external payload attachment features being configured to be attached to external payload components, external fairings, or a combination thereof, where the external payload attachment features comprise at least one mounting adapter section mechanically coupled to the aircraft fuselage across the given section of the aircraft fuselage; where the mounting adapter section includes at least one of:
  one or more payload rails having multiple regularly-spaced rail fastener locations provided on each rail that are configured to align with and be selectably attached to mating payload fastener locations of an interchangeable external payload component that has a payload fastener location spacing that is complementary to the regular spacing of the rail fastener locations; or
  multiple payload hardpoints having regularly-spaced hardpoint fastener locations provided on each payload hardpoint that are configured to align with and be selectably attached to mating payload fastener locations of an interchangeable external payload component that has a payload fastener location spacing that is complementary to the regular spacing of the hardpoint fastener locations; and
  where the mounting adapter section is mechanically coupled to extend across the given section of the aircraft fuselage such that:
    the rail fastener location spacing remains regular across the payload rail of the mounting adapter section so as to allow the mating payload fastener locations of the interchangeable external payload component to align with and simultaneously attach to mating regularly-spaced rail fastener locations on the mounting adapter section to mechanically couple the interchangeable external payload component to the aircraft fuselage with the mounting adapter positioned between the aircraft fuselage and the interchangeable external payload component and with the rails of the mounting adapter supporting the interchangeable external payload component in a position spaced apart from the aircraft fuselage, or
    the hardpoint fastener location spacing remains regular across the payload hardpoints of the mounting adapter section so as to allow the mating payload fastener locations of the interchangeable external payload component to align with and simultaneously attach to mating regularly-spaced hardpoint fastener locations on the mounting adapter section to mechanically couple the interchangeable external payload component to the aircraft fuselage with the mounting adapter positioned between the aircraft fuselage and the interchangeable external payload component and with the hard points of the mounting adapter supporting the interchangeable external payload component in a position spaced apart from the aircraft fuselage; and
  comprising a RPS disconnect panel assembly mechanically attached to the interior of the aircraft.

2. The RPS of claim 1, where the mounting adapter section includes two or more parallel payload rails configured to be selectably attached to multiple different types of interchangeable external payload components, each of the payload rails being configured with multiple regularly-spaced rail fastener locations.

3. The RPS of claim 1, where the mounting adapter section includes multiple payload hardpoints configured to be selectably attached to multiple different types of interchangeable external payload components, each of the payload hardpoints being configured with a hardpoint fastener location and the payload hardpoints being spaced apart from each other such that the spacing between the hardpoint fastener locations is regularly spaced.

4. The RPS of claim 1, where the mounting adapter section is mechanically coupled to extend across a given section of a bottom side of the aircraft fuselage to at least one of:
  allow the mating payload fastener locations of the interchangeable external payload component to align with and simultaneously attach to the mating regularly-spaced rail fastener locations on the mounting adapter section to mechanically couple the interchangeable external payload component to the bottom side of the aircraft fuselage with the mounting adapter positioned between the bottom side of aircraft fuselage and the interchangeable external payload component and with the rails of the mounting adapter supporting the interchangeable external payload component in a position underneath the aircraft that is spaced apart from the bottom side of the aircraft fuselage, or
  allow the mating payload fastener locations of the interchangeable external payload component to align with and simultaneously attach to mating regularly-spaced hardpoint fastener locations on the mounting adapter section to mechanically couple the interchangeable external payload component to the bottom side of the aircraft fuselage with the mounting adapter positioned between the bottom side of the aircraft fuselage and the interchangeable external payload component and with the hard points of the mounting adapter supporting the interchangeable external payload component in a position underneath the aircraft that is spaced apart from the bottom side of the aircraft fuselage.

5. The RPS of claim 1, where the mounting adapter section is mechanically coupled to the aircraft fuselage by fuselage fittings, the fuselage fittings being positioned between the aircraft fuselage and the mounting adapter section with the fuselage fittings supporting the mounting adapter in a position spaced apart from the aircraft fuselage.

6. The RPS of claim 1, where the external payload attachment features comprise multiple separate mounting adapter sections mechanically coupled to the aircraft fuselage in adjacent end-to-end manner to extend longitudinally across the given section of the aircraft fuselage; where each of the multiple separate mounting adapter sections includes at least one of:
  one or more payload rails having multiple regularly-spaced rail fastener locations provided on each rail that are configured to align with and be selectably attached to mating payload fastener locations of an interchangeable external payload component that has a payload fastener location spacing that is complementary to the regular spacing of the rail fastener locations; or
  multiple payload hardpoints that are each configured with a hardpoint fastener location with the payload hardpoints being spaced apart from each other such that the spacing between the hardpoint fastener locations is regularly spaced and configured to align with and be selectably attached to mating payload fastener locations of an interchangeable external payload component that has a payload fastener location spacing that is complementary to the regular spacing of the hardpoint fastener locations; and where the multiple mounting adapter sections are mechanically coupled to extend across the given section of the aircraft fuselage such that such that:

the rail fastener location spacing remains regular across the payload rails of the different mounting adapter sections so as to allow the mating payload fastener locations of the interchangeable external payload component to align with and simultaneously attach to mating regularly-spaced rail fastener locations on two or more of the multiple separate mounting adapter sections to mechanically couple the interchangeable external payload component to the aircraft fuselage, or the hardpoint fastener location spacing remains regular across the payload hardpoints of the different mounting adapter sections so as to allow the mating payload fastener locations of the interchangeable external payload component to align with and simultaneously attach to mating regularly-spaced hardpoint fastener locations on two or more of the multiple separate mounting adapter sections to mechanically couple the interchangeable external payload component to the aircraft fuselage.

7. The RPS of claim 6, where each of the multiple separate mounting adapter sections includes:

one or more payload rails having multiple regularly-spaced rail fastener locations provided on each rail that are configured to align with and be selectably attached to mating payload fastener locations of an interchangeable external payload component that has a payload fastener location spacing that is complementary to the regular spacing of the rail fastener locations; and where the multiple mounting adapter sections are mechanically coupled to extend across the given section of the aircraft fuselage such that such that the rail fastener location spacing remains regular across the payload rails of the different mounting adapter sections so as to allow the mating payload fastener locations of the interchangeable external payload component to align with and simultaneously attach to mating regularly-spaced rail fastener locations on two or more of the multiple separate mounting adapter sections to mechanically couple the interchangeable external payload component to the aircraft fuselage.

8. The RPS of claim 6, where each of the multiple separate mounting adapter sections includes:

multiple payload hardpoints that are each configured with a hardpoint fastener location with the payload hardpoints being spaced apart from each other such that the spacing between the hardpoint fastener locations is regularly spaced and configured to align with and be selectably attached to mating payload fastener locations of an interchangeable external payload component that has a payload fastener location spacing that is complementary to the regular spacing of the hardpoint fastener locations; and where the multiple mounting adapter sections are mechanically coupled to extend across the given section of the aircraft fuselage such that such that the hardpoint fastener location spacing remains regular across the payload hardpoints of the different mounting adapter sections so as to allow the mating payload fastener locations of the interchangeable external payload component to align with and simultaneously attach to mating regularly-spaced hardpoint fastener locations on two or more of the multiple separate mounting adapter sections to mechanically couple the interchangeable external payload component to the aircraft fuselage.

9. The RPS of claim 6, where the multiple separate mounting adapter sections are longitudinally aligned in end-to-end relation; and where a spacing and a periodicity of the regularly-spaced rail fastener locations or hard point fastener locations of the different modular mounting adapter sections is the same.

10. The RPS of claim 6, where the multiple separate mounting adapter sections are longitudinally aligned in end-to-end relation with a gap between the mounting adapter sections; where a spacing and a periodicity of the regularly-spaced rail fastener locations or hard point fastener locations of the different modular mounting adapter sections is the same; and where the gap dimension between the sections is selected to maintain the periodicity of the rail fastener locations or hardpoint fastener locations across the multiple mounting adapter sections of the RPS.

11. The method of claim 6, where the step of providing further comprises mechanically coupling the multiple separate mounting adapter sections to the aircraft fuselage in longitudinally aligned end-to-end relation with a gap between the mounting adapter section so that a spacing and a periodicity of the regularly-spaced rail fastener locations or hard point fastener locations of the different modular mounting adapter sections is the same and so that the gap dimension between the sections is selected to maintain the periodicity of the rail fastener locations or hardpoint fastener locations across the multiple mounting adapter sections.

12. A method of operating an aircraft, comprising:

providing one or more external payload attachment features mechanically coupled to extend across a given section of a fuselage of the aircraft; and attaching external payload components, external fairings, or a combination thereof to the one or more external payload attachment features;

where the external payload attachment features comprise at least one mounting adapter section mechanically coupled to the aircraft fuselage across the given section of the aircraft fuselage, the mounting adapter section including at least one of:

one or more payload rails having multiple regularly-spaced rail fastener locations provided on each rail that are configured to align with and be selectably attached to mating payload fastener locations of an interchangeable external payload component that has a payload fastener location spacing that is complementary to the regular spacing of the rail fastener locations and the method further comprising aligning the mating payload fastener locations with the rail fastener locations and attaching the mating payload fastener locations to the aligned rail fastener locations, or multiple payload hardpoints having regularly-spaced hardpoint fastener locations provided on each payload hardpoint that are configured to align with and be selectably attached to mating payload fastener locations of an interchangeable external payload component that has a payload fastener location spacing that is complementary to the regular spacing of the hardpoint fastener locations and the method further comprising aligning the mating payload fastener locations with the hardpoint fastener locations and attaching the mating payload fastener locations to the aligned hardpoint fastener locations; and where the mounting adapter section is mechanically coupled to extend across the given section of the aircraft fuselage such that such that:

the rail fastener location spacing remains regular across the payload rail of the mounting adapter section so as to allow the mating payload fastener locations of the interchangeable external payload component to align with and simultaneously attach to mating regularly-spaced rail fastener locations on the mounting adapter section to mechanically couple the interchangeable external payload component to the aircraft fuselage with the mounting adapter positioned between the aircraft fuselage and the interchangeable external payload component and with the rails of the mounting adapter supporting the interchangeable external payload component in a position spaced apart from the aircraft fuselage, or the hardpoint fastener location spacing remains regular across the payload hardpoints of the mounting adapter section so as to allow the mating payload fastener locations of the interchangeable external payload component to align with and simultaneously attach to mating regularly-spaced hardpoint fastener locations on the mounting adapter section to mechanically couple the interchangeable external payload component to the aircraft fuselage with the mounting adapter positioned between the aircraft fuselage and the interchangeable external payload component and with the hard points of the mounting adapter supporting the interchangeable external payload component in a position spaced apart from the aircraft fuselage; and coupling a reconfigurable payload system disconnect panel assembly to the interior of the aircraft fuselage adjacent a location of the external payload attachment features.

13. The method of claim 12, where the mounting adapter section includes two or more parallel payload rails, each of the payload rails being configured with multiple regularly-spaced rail fastener locations; and where the method further comprising selectably attaching multiple different types of interchangeable external payload components to at least a portion of the multiple regularly-spaced rail fastener locations of the payload rails.

14. The method of claim 12, where the mounting adapter section includes multiple payload hardpoints, each of the payload hardpoints being configured with a hardpoint fastener location and the payload hardpoints being spaced apart from each other such that the spacing between the hardpoint fastener locations is regularly spaced; and where the method further comprises selectably attaching multiple different types of interchangeable external payload components to at least portion of the regularly-spaced hardpoint fastener locations.

15. The method of claim 12, further comprising:

aligning and attaching payload fastener locations of one or more interchangeable external payload components simultaneously to multiple regularly-spaced rail fastener locations and/or regularly-spaced hardpoint fastener locations of a first set of one or more modular mounting adapter sections that are mechanically coupled to extend across a given section of the fuselage of the aircraft by at least a portion of a defined pattern of fuselage fittings attached to the aircraft, each of the modular mounting adapter sections having a given length and being configured to mechanically couple the interchangeable external payload components to the aircraft fuselage;

then using the aircraft to fly a first mission with the one or more external payload components mechanically coupled to the first set of modular mounting adapter sections;

then removing the interchangeable external payload components from the first set of modular mounting adapter sections and removing the first set of modular mounting adapter sections from the fuselage fittings;

then using at least a portion of the same defined pattern of fuselage fittings to mechanically couple a second set of one or more modular mounting adapter sections to extend across at least a portion of the same given section of the fuselage of the aircraft, each of the second set of modular mounting adapter sections having a length and being configured to mechanically couple the interchangeable external payload components to the aircraft fuselage on the aircraft, the second set of modular mounting adapter sections including a different number of modular mounting adapter sections than the first set of modular mounting adapter sections and/or including one or more modular mounting adapter sections having a length that is different than any of the modular mounting adapter sections of the first set of modular mounting adapter sections;

then aligning and attaching payload fastener locations of one or more interchangeable external payload components simultaneously to multiple regularly-spaced rail fastener locations and/or regularly-spaced hardpoint fastener locations of the second set of modular mounting adapter sections to mechanically couple the interchangeable external payload components to the aircraft fuselage; and then using the same aircraft to fly a second mission with the one or more external payload components mechanically coupled to the second set of modular mounting adapter sections;

where a spacing and periodicity of the regularly-spaced rail fastener locations of the second set of modular mounting adapter sections is the same as a spacing and periodicity of the regularly-spaced rail fastener locations of the first set of modular mounting adapter sections and/or where a spacing and periodicity of the regularly-spaced hardpoint fastener locations of the second set of modular mounting adapter sections is the same as a spacing and periodicity of the regularly-spaced hardpoint fastener locations of the first set of modular mounting adapter sections such that the same configuration and spacing of payload fastener location pattern that is complementary to and configured to align and mate with the regularly-spaced rail fastener locations and/or regularly-spaced hardpoint fastener locations of the second set of modular mounting adapter sections is also complementary to and configured to align and mate with the regularly-spaced rail fastener locations and/or regularly-spaced hardpoint fastener locations of the first set of modular mounting adapter sections.

16. The method of claim 12, further comprising:

aligning and attaching payload fastener locations of a first interchangeable external payload component simultaneously to multiple regularly-spaced rail fastener locations and/or regularly-spaced hardpoint fastener locations of a set of one or more modular mounting adapter sections that are mechanically coupled to extend across a given section of the fuselage of the aircraft;

then using the aircraft to fly a first mission with the first interchangeable external payload component mechanically coupled to the set of modular mounting adapter sections.

17. The method of claim 12, further comprising:

aligning and attaching payload fastener locations of s interchangeable external payload components simultaneously to mating regularly-spaced rail fastener locations and/or regularly-spaced hardpoint fastener locations of a first set of one or more modular mounting adapter sections that are mechanically coupled to extend across a given section of the fuselage of the aircraft by at least a portion of a defined pattern of fuselage fittings attached to the aircraft, each of the modular mounting adapter sections having a given length and being configured to mechanically couple the interchangeable external payload components to the aircraft fuselage;

then using the aircraft to fly a first mission with the one or more external payload components mechanically coupled to the first set of modular mounting adapter sections;

then removing the first set of modular mounting adapter sections from the fuselage fittings and using at least a portion of the same defined pattern of fuselage fittings to mechanically couple a second set of one or more modular mounting adapter sections to extend across at least a portion of the same given section of the fuselage of the aircraft, each of the second set of modular mounting adapter sections having a length and being configured to mechanically couple the interchangeable external payload components to the aircraft fuselage on the aircraft, the second set of modular mounting adapter sections including a different number of modular mounting adapter sections than the first set of modular mounting adapter sections and/or including one or more modular mounting adapter sections having a length that is different than any of the modular mounting adapter sections of the first set of modular mounting adapter sections;

then aligning and attaching payload fastener locations of one or more interchangeable external payload components simultaneously to mating regularly-spaced rail fastener locations and/or regularly-spaced hardpoint fastener locations of the second set of modular mounting adapter sections to mechanically couple the interchangeable external payload components to the aircraft fuselage; and then using the same aircraft to fly a second mission with the mechanically coupled one or more external payload components mechanically coupled to the second set of two or more of the multiple separate mounting adapter sections;

where a spacing and periodicity of the regularly-spaced rail fastener locations of the second set of modular mounting adapter sections is the same as a spacing and periodicity of the regularly-spaced rail fastener locations of the first set of modular mounting adapter sections and/or where a spacing and periodicity of the regularly-spaced hardpoint fastener locations of the second set of modular mounting adapter sections is the same as a spacing and periodicity of the regularly-spaced hardpoint fastener locations of the first set of modular mounting adapter sections such that the same configuration and spacing of payload fastener locations that is complementary to and configured to align and mate with the regularly-spaced rail fastener locations and/or regularly-spaced hardpoint fastener locations of the second set of modular mounting adapter sections is also complementary to and configured to align and mate with the regularly-spaced rail fastener locations and/or regularly-spaced hardpoint fastener locations of the first set of modular mounting adapter sections.

18. The method of claim 12, where the method further comprises:

providing the one or more external payload attachment features mechanically coupled to extend across a given section of a bottoms side of the fuselage of the aircraft; and attaching external payload components, external fairings, or a combination thereof to the one or more external payload attachment features in a position underneath the aircraft;

where the external payload attachment features comprise at least one mounting adapter section mechanically coupled underneath the aircraft fuselage across a given section of the bottom side of the aircraft fuselage; and where the mounting adapter section is mechanically coupled to extend across the given section of the bottom side of the aircraft fuselage and the method further comprises at least one of:

aligning and simultaneously attaching the mating payload fastener locations of the interchangeable external payload component to the mating regularly-spaced rail fastener locations on the mounting adapter section to mechanically couple the interchangeable external payload component to the bottom side of the aircraft fuselage with the mounting adapter positioned between the bottom side of aircraft fuselage and the interchangeable external payload component and with the rails of the mounting adapter supporting the interchangeable external payload component in a position underneath the aircraft that is spaced apart from the bottom side of the aircraft fuselage, or aligning and simultaneously attaching the mating payload fastener locations of the interchangeable external payload component to the mating regularly-spaced hardpoint fastener locations on the mounting adapter section to mechanically couple the interchangeable external payload component to the bottom side of the aircraft fuselage with the mounting adapter positioned between the bottom side of the aircraft fuselage and the interchangeable external payload component and with the hard points of the mounting adapter supporting the interchangeable external payload component in a position underneath the aircraft that is spaced apart from the bottom side of the aircraft fuselage.

19. The method of claim 12, where the step of providing further comprises mechanically coupling the mounting adapter section to the fuselage fittings of the aircraft fuselage so that the fuselage fittings are positioned between the aircraft fuselage and the mounting adapter section with the fuselage fittings supporting the mounting adapter in a position spaced apart from the aircraft fuselage.

20. The method of claim 12, where the external payload attachment features comprise multiple separate mounting adapter sections mechanically coupled to the aircraft fuselage in adjacent end-to-end manner to extend longitudinally across the given section of the aircraft fuselage; where each of the multiple separate mounting adapter sections includes at least one of:
- one or more payload rails having multiple regularly-spaced rail fastener locations provided on each rail that are configured to align with and be selectably attached to mating payload fastener locations of an interchangeable external payload component that has a payload fastener location spacing that is complementary to the regular spacing of the rail fastener locations; or
- multiple payload hardpoints that are each configured with a hardpoint fastener location with the payload hardpoints being spaced apart from each other such that the spacing between the hardpoint fastener locations is regularly spaced and configured to align with and be selectably attached to mating payload fastener locations of an interchangeable external payload component that has a payload fastener location spacing that is complementary to the regular spacing of the hardpoint fastener locations; and
- where the multiple mounting adapter sections are mechanically coupled to extend across the given section of the aircraft fuselage such that such that:
  - the rail fastener location spacing remains regular across the payload rails of the different mounting adapter sections so as to allow the mating payload fastener locations of the interchangeable external payload component to align with and simultaneously attach to mating regularly-spaced rail fastener locations on two or more of the multiple separate mounting adapter sections to mechanically couple the interchangeable external payload component to the aircraft fuselage, or
  - the hardpoint fastener location spacing remains regular across the payload hardpoints of the different mounting adapter sections so as to allow the mating payload fastener locations of the interchangeable external payload component to align with and simultaneously attach to mating regularly-spaced hardpoint fastener locations on two or more of the multiple separate mounting adapter sections to mechanically couple the interchangeable external payload component to the aircraft fuselage; and where the method further comprises:
- aligning and attaching payload fastener locations of an interchangeable external payload component simultaneously to mating regularly-spaced rail fastener locations on two or more of the multiple separate mounting adapter sections to mechanically couple the interchangeable external payload component to the aircraft fuselage, or
- aligning and attaching payload fastener locations of an interchangeable external payload component simultaneously to mating regularly-spaced hardpoint fastener locations on two or more of the multiple separate mounting adapter sections to mechanically couple the interchangeable external payload component to the aircraft fuselage.

21. The method of claim 20, where each of the multiple separate mounting adapter sections includes one or more payload rails having multiple regularly-spaced rail fastener locations provided on each rail that are configured to align with and be selectably attached to mating payload fastener locations of an interchangeable external payload component that has a payload fastener location spacing that is complementary to the regular spacing of the rail fastener locations, the multiple mounting adapter sections being mechanically coupled to extend across the given section of the aircraft fuselage such that the rail fastener location spacing remains regular across the payload rails of the different mounting adapter sections; and where the method further comprises:
- aligning and attaching payload fastener locations of an interchangeable external payload component simultaneously to mating regularly-spaced rail fastener locations on two or more of the multiple separate mounting adapter sections to mechanically couple the interchangeable external payload component to the aircraft fuselage.

22. The method of claim 20, where each of the multiple separate mounting adapter sections includes multiple payload hardpoints that are each configured with a hardpoint fastener location with the payload hardpoints being spaced apart from each other such that the spacing between the hardpoint fastener locations is regularly spaced and configured to align with and be selectably attached to mating payload fastener locations of an interchangeable external payload component that has a payload fastener location spacing that is complementary to the regular spacing of the hardpoint fastener locations, the multiple mounting adapter sections being mechanically coupled to extend across the given section of the aircraft fuselage such that such that the hardpoint fastener location spacing remains regular across the payload hardpoints of the different mounting adapter sections; and where the method further comprises:
- aligning and attaching payload fastener locations of an interchangeable external payload component simultaneously to mating regularly-spaced hardpoint fastener locations on two or more of the multiple separate mounting adapter sections to mechanically couple the interchangeable external payload component to the aircraft fuselage.

23. The method of claim 20, where the external payload attachment features comprise multiple separate mounting adapter sections; where the step of providing comprises mechanically coupling the multiple separate mounting adapter sections to the aircraft fuselage in adjacent end-to-end manner to extend longitudinally across the given section of the aircraft fuselage; and where each of the multiple separate mounting adapter sections includes at least one of:
- one or more payload rails having multiple regularly-spaced rail fastener locations provided on each rail that are configured to align with and be selectably attached to mating payload fastener locations of an interchangeable external payload component that has a payload fastener location spacing that is complementary to the regular spacing of the rail fastener locations; or
- multiple payload hardpoints having regularly-spaced hardpoint fastener locations provided on each payload hardpoint that are configured to align with and be selectably attached to mating payload fastener locations of an interchangeable external payload component that has a payload fastener location spacing that is complementary to the regular spacing of the hardpoint fastener locations; and
- where the method further comprises mechanically coupling the multiple mounting adapter sections to extend across the given section of the aircraft fuselage such that such that:
  - the rail fastener location spacing remains regular across the payload rails of the different mounting adapter sections so as to allow the mating payload fastener locations of the interchangeable external payload component to align with and simultaneously attach to mating regularly-spaced rail fastener locations on two or more of the multiple separate mounting adapter sections to mechanically couple the interchangeable external payload component to the aircraft fuselage, or the hardpoint fastener location spacing remains regular across the payload rails of the different mounting adapter sections so as to allow the mating payload fastener locations of the interchangeable external payload component to align with and simultaneously attach to mating regularly-spaced hardpoint fastener locations on two or more of the multiple separate mounting adapter sections to mechanically couple the interchangeable external payload component to the aircraft fuselage.

24. The method of claim 20, where the step of providing further comprises mechanically coupling the multiple separate mounting adapter sections to the aircraft fuselage in longitudinally aligned end-to-end relation so that a spacing and a periodicity of the regularly-spaced rail fastener locations or hard point fastener locations of the different modular mounting adapter sections is the same.

25. The method of claim 20, further comprising:
selecting a first set of one or more interchangeable external payload components;
aligning and attaching payload fastener locations of the first set of interchangeable external payload components simultaneously to mating regularly-spaced rail fastener locations on two or more of the multiple separate mounting adapter sections to mechanically couple the first set of interchangeable external payload components to the aircraft fuselage, or aligning and attaching payload fastener locations of the first set of interchangeable external payload components simultaneously to mating regularly-spaced hardpoint fastener locations on two or more of the multiple separate mounting adapter sections to mechanically couple the first set of interchangeable external payload component to the aircraft fuselage; and
then using the aircraft to fly a first mission with the mechanically coupled first set of one or more external payload components.

26. The method of claim 25, further comprising:
then selecting a second and different set of one or more external payload components;
aligning and attaching payload fastener locations of the second set of interchangeable external payload components simultaneously to mating regularly-spaced rail fastener locations on two or more of the multiple separate mounting adapter sections to mechanically couple the second set of interchangeable external payload components to the aircraft fuselage, or aligning and attaching payload fastener locations of the second set of interchangeable external payload components simultaneously to mating regularly-spaced hardpoint fastener locations on two or more of the multiple separate mounting adapter sections to mechanically couple the second set of interchangeable external payload component to the aircraft fuselage; and
then using the same aircraft to fly a second mission with the mechanically coupled second set of one or more external payload components after flying the first mission.

27. The method of claim 26, where the components of the second set of payload components have different dimensions and different weight than the components of the first set of payload components; where the aircraft has a longitudinal axis; and where each of the components of the first and second sets of payload components have the same configuration and spacing of payload fastener location pattern that is complementary to and configured to align and mate with different combinations of the regularly-spaced rail fastener locations and/or regularly-spaced hardpoint fastener locations of the multiple separate mounting adapter sections to allow each of the individual payload components of each of the first and second sets of payload components to be selectably positioned and repositioned on the multiple separate mounting adapter sections in any one of multiple different longitudinal positions relative to the longitudinal axis of the aircraft.

28. The method of claim 25, further comprising:
then removing the first set of one or more external payload components from aircraft after flying the first mission;
aligning and attaching payload fastener locations of the first set of interchangeable external payload components simultaneously to mating regularly-spaced rail fastener locations on two or more multiple separate mounting adapter sections mounted on a second and different aircraft to mechanically couple the first set of interchangeable external payload components to a fuselage of the second aircraft, or aligning and attaching payload fastener locations of the first set of interchangeable external payload components simultaneously to mating regularly-spaced hardpoint fastener locations on two or more multiple separate mounting adapter sections mounted on the second and different aircraft to mechanically couple the second set of interchangeable external payload components to the fuselage of the second aircraft; and
then using the second and different aircraft to fly a second mission with the mechanically coupled first set of one or more external payload components after flying the first mission.

29. The method of claim 28, where at least the number or length of the multiple separate mounting adapter sections mounted on the second and different aircraft is different than the number or length of the multiple separate mounting adapter sections mounted on a first aircraft of the first mission; and where:
the rail fastener location spacing remains regular across the payload rail of the mounting adapter sections of the fuselage of each of the first and second aircraft so as to allow the same mating payload fastener locations of the interchangeable external payload component to align with and simultaneously attach to mating regularly-spaced rail fastener locations on the mounting adapter sections of each of the first and second aircraft to mechanically couple the same interchangeable external payload component to the aircraft fuselage of each of the first and second aircraft, or
the hardpoint fastener location spacing remains regular across the payload hardpoints of the mounting adapter sections of the fuselage of each of the first and second aircraft so as to allow the same mating payload fastener locations of the interchangeable external payload component to align with and simultaneously attach to mating regularly-spaced hardpoint fastener locations on the mounting adapter sections of each of the first and second aircraft to mechanically couple the same interchangeable external payload component to the aircraft fuselage of each of the first and second aircraft.

* * * * *

UNITED STATES PATENT AND TRADEMARK OFFICE
CERTIFICATE OF CORRECTION

PATENT NO. : 9,676,482 B2
APPLICATION NO. : 14/604618
DATED : June 13, 2017
INVENTOR(S) : Hodge et al.

Page 1 of 1

It is certified that error appears in the above-identified patent and that said Letters Patent is hereby corrected as shown below:

In the Claims

In Claim 6, Column 45, Line 7, delete "such that such that" and insert -- such that --

In Claim 7, Column 45, Line 39, delete "such that such that" and insert -- such that --

In Claim 8, Column 45, Line 63, delete "such that such that" and insert -- such that --

In Claim 12, Column 47, Line 5, delete "such that such that" and insert -- such that --

In Claim 20, Column 51, Line 23, delete "such that such that" and insert -- such that --

In Claim 22, Column 52, Line 24, delete "such that such that" and insert -- such that --

In Claim 23, Column 52, Lines 60-61, delete "such that such that" and insert -- such that --

Signed and Sealed this
Twenty-fourth Day of October, 2017

Joseph Matal
*Performing the Functions and Duties of the
Under Secretary of Commerce for Intellectual Property and
Director of the United States Patent and Trademark Office*